United States Patent [19]
Suzuki et al.

[11] Patent Number: 5,495,299
[45] Date of Patent: Feb. 27, 1996

[54] NOISE REDUCER

[75] Inventors: Hidekazu Suzuki, Yamatokoriyama; Masashi Kubota, Kobe; Kazuo Kobo, Sakai, all of Japan

[73] Assignee: Matsushita Electric Industrial Co., Ltd., Osaka, Japan

[21] Appl. No.: 359,924

[22] Filed: Dec. 20, 1994

[30] Foreign Application Priority Data

| Dec. 20, 1993 | [JP] | Japan | 5-319500 |
| Dec. 21, 1993 | [JP] | Japan | 5-321677 |
| Mar. 10, 1994 | [JP] | Japan | 6-039742 |
| Jun. 27, 1994 | [JP] | Japan | 6-144840 |

[51] Int. Cl.$^6$ .................................................. H04N 5/21
[52] U.S. Cl. ..................... 348/620; 348/622; 348/701; 348/404
[58] Field of Search .................................... 348/607, 618, 348/619, 620, 622, 701, 404, 403; H04N 5/208, 5/21, 5/213

[56] References Cited

U.S. PATENT DOCUMENTS

| 4,242,705 | 12/1980 | Ebihara ............................... 348/620 |
| 5,043,815 | 8/1991 | Yoshimura et al. ................. 348/620 |
| 5,404,179 | 4/1995 | Hamasaki ............................ 348/620 |

OTHER PUBLICATIONS

N. Ebihara et al., "Noise Reducer for Television Signals Using Hadamard Transform", *The Journal of the Institute of Television Engineers of Japan*, vol. 37, No. 12, pp. 56–62 (1983).

Primary Examiner—Victor R. Kostak
Assistant Examiner—Jeffrey S. Murrell
Attorney, Agent, or Firm—Ratner & Prestia

[57] ABSTRACT

A noise reducer for outputting a noise-reduced signal by extracting noise included in an input video signal so as to produce a noise signal and by subtracting the noise signal from the input video signal is provided. The noise reducer includes: a signal processing portion which includes: a delay means for delaying the noise-reduced signal by a predetermined time period thereby outputting a delayed signal; a first subtracter for subtracting the delayed signal from the input video signal thereby outputting a differential signal; an orthogonal transformer for conducting orthogonal transformation on the differential signal, each pixel block of the differential signal being transformed as a unit, thereby outputting an orthogonally transformed signal; a nonlinear processing portion for conducting nonlinear processing on the orthogonally transformed signal based on a predetermined threshold thereby outputting a nonlinear processed signal; an orthogonal inverse transformer for conducting an inverse transformation of the orthogonal transformation on the nonlinear processed signal thereby outputting an inversely transformed signal; an attenuator for attenuating the inversely transformed signal by a predetermined coefficient thereby outputting the noise signal; a second subtracter for subtracting the noise signal from the input video signal thereby outputting the noise-reduced signal; and an adaptive control portion for controlling at least one of the predetermined threshold and the predetermined coefficient based on at least one of the differential signal and the orthogonally transformed signal.

22 Claims, 41 Drawing Sheets

T: Sample period

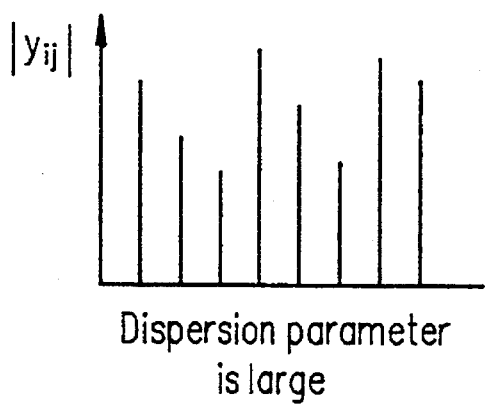 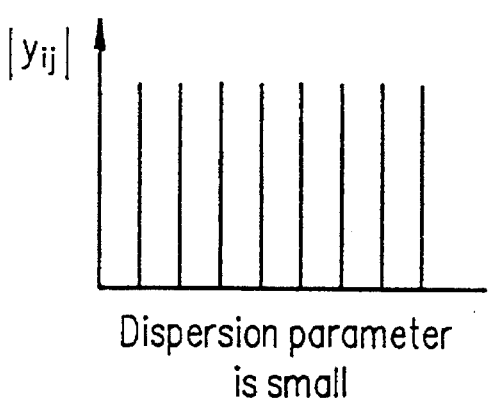
FIG.16A — Dispersion parameter is large
FIG.16B — Dispersion parameter is small T : 1 sample period

PRIOR ART

NOISE REDUCER

BACKGROUND OF THE INVENTION

1. Field of the Invention

The present invention relates to a device for reducing noise included in a video signal, and more specifically, to a noise reducer capable of reducing noise effectively by controlling parameters for noise reduction.

2. Description of the Related Art

With the recent progress in the field of semiconductor memories, inexpensive frame memories have become available. Using such frame memories, three-dimensional processing of video signals has been realized in various applications. As for noise reducers for home VTRs and TV receivers, many types using frame memories have been proposed. As one of such noise reducers, a frame recursive type noise reducer employing Hadamard transformation, which uses an orthogonal transformation, has been proposed, where the difference in the three-dimensional statistical characteristic between a video signal and random noise is utilized (The Journal of the Institute of Television Engineers of JAPAN, Vol. 37, No. 12, 1983, pp. 56–62).

A video signal without noise has large correlations in all of the horizontal, vertical, and temporal directions, while random noise has little correlation in any of the three directions. The noise reducer employing the Hadamard transformation utilizes this difference in the three-dimensional correlations between a video signal and random noise more effectively to reduce noise. The frame recursive type noise reducer employing the Hadamard transformation is advantageous over a simple frame recursive type noise reducer without using the Hadamard transformation in that the resolution of the motion picture portion of the transmission is less deteriorated under the condition where the improvement in the S/N ratio is the same.

A conventional frame recursive type noise reducer employing the Hadamard transformation will be described with reference to FIG. 48. A noise reducer 900 includes a noise extract portion 9 which extracts noise included in an input video signal S1, and a second subtracter 8 which subtracts an extracted noise signal S2 from the input video signal S1, so as to obtain an output signal S3 with reduced noise.

Referring to FIG. 48, the noise extract portion 9 includes a first subtracter 1, a frame memory 2, a serial/parallel converter 3, an Hadamard transformer 4, nonlinear processing portions 5-1 to 5-k (hereinafter, collectively referred to as a nonlinear processor 5, to avoid causing misunderstanding), an Hadamard inverse transformer 6, and parallel/serial converter 7. The frame memory 2 receives the output signal S3 with reduced noise obtained by subtracting the noise signal S2 extracted in the noise extract portion 9 from the input video signal S1 as described above, and outputs a delayed signal S4 by delaying the output signal S3 by one frame or several frames. The first subtracter 1 subtracts the delayed signal S4 from the input video signal S1 so as to obtain a frame differential signal S5. The serial/parallel converter 3 converts a temporally serial data series (S5) into a temporally parallel data series P1 corresponding to the order of the Hadamard transformation. The Hadamard transformer 4 conducts the Hadamard transformation on the parallel data series P1 so as to obtain a data series P2. The nonlinear processor 5 conducts nonlinear processing on the Hadamard-transformed data series P2 so as to obtain data P3. The Hadamard inverse transformer 6 conducts an Hadamard inverse transformation, i.e., an operation inverse to that conducted by the Hadamard transformer 4, on the data P3 so as to obtain a parallel data series P4. The parallel/serial converter 7 converts the parallel data series P4 into a serial data series. The output from the parallel/serial converter 7 is the extracted noise signal S2 output from the noise extract portion 9. The second subtracter 8 subtracts the noise signal S2 from the input video signal S1, so as to obtain the output signal S3 with reduced noise.

The operation of the noise reducer 900 with the above configuration will be described in detail.

First, the first subtracter 1 calculates the difference between the input video signal S1 and the delayed signal S4 with reduced noise delayed by N frame(s) (N=1, 2, . . . ) by the frame memory 2. Since random noise and a motion component included in the video signal have small correlation in the temporal direction, they are extracted by this differential operation and are output as the frame differential signal S5 corresponding to the amplitude of the noise and the motion component. The serial/parallel converter 3 converts the temporally serial frame differential data (S5) into the temporally parallel data series P1 composed of m sample points in the horizontal direction and n lines in the vertical direction (m, n=natural numbers). The serial/parallel converter 3 includes n−1 line memory or memories and (m−1)×n latch or latches.

Hereinbelow, the case where one pixel block is composed of m=4 samples in the horizontal direction and n=2 lines in the vertical direction will be described. A temporally parallel block (a pixel block composed of temporally parallel data) produced by the serial/parallel converter 3 is expressed in the form of matrix by formula (1):

$$\begin{bmatrix} X_{00} \, X_{01} \, X_{02} \, X_{03} \\ X_{10} \, X_{11} \, X_{12} \, X_{13} \end{bmatrix} \quad (1)$$

The block data composed of $x_{00}$ to $x_{03}$ and $x_{10}$ to $x_{13}$ will be described. When $x_{00}$ is considered as the reference, $x_{01}$, $x_{02}$, and $x_{03}$ are data located right of the reference by one sample, two samples, and three samples, respectively. Likewise, when $x_{10}$ is considered as the reference, $x_{11}$, $x_{12}$, and $x_{13}$ are data located right of the reference by one sample, two samples, and three samples, respectively. The data $x_{10}$ to $x_{13}$ are located below the data $x_{00}$ to $x_{03}$ by one line.

The Hadamard transformer 4 conducts the Hadamard transformation expressed by formula (2) below on the temporally parallel block data of four samples in the horizontal direction and two lines in the vertical direction, so as to obtain 4 (samples)×2 (lines)=8 frequency components in the Hadamard space.

$$\begin{aligned}
y_{00} &= X_{00} + X_{01} + X_{02} + X_{03} + X_{10} + X_{11} + X_{12} + X_{13} \\
y_{01} &= X_{00} - X_{01} + X_{02} - X_{03} + X_{10} - X_{11} + X_{12} - X_{13} \\
y_{02} &= X_{00} + X_{01} - X_{02} - X_{03} + X_{10} + X_{11} - X_{12} - X_{13} \\
y_{03} &= X_{00} - X_{01} - X_{02} + X_{03} + X_{10} - X_{11} - X_{12} + X_{13} \\
y_{10} &= X_{00} + X_{01} + X_{02} + X_{03} - X_{10} - X_{11} - X_{12} - X_{13} \\
y_{11} &= X_{00} - X_{01} + X_{02} - X_{03} - X_{10} + X_{11} - X_{12} + X_{13} \\
y_{12} &= X_{00} + X_{01} - X_{02} - X_{03} - X_{10} - X_{11} + X_{12} + X_{13} \\
y_{13} &= X_{00} - X_{01} - X_{02} + X_{03} - X_{10} + X_{11} + X_{12} - X_{13}
\end{aligned} \quad (2)$$

wherein $y_{ij}$ ($0 \leq i \leq 1$, $0 \leq j \leq 3$) represents the Hadamard-transformed data.

Since random noise has less correlation among data, it is uniformly distributed to the respective frequency components $y_{ij}$ in the Hadamard space expressed by formula (2). The absolute value of each frequency component $y_{ij}$ is input into the nonlinear processor 5, which then extracts noise uniformly distributed to the respective frequency components $y_{ij}$. The relationship between the input and output of the nonlinear processor 5 is shown in FIG. 49, where the X-axis represents the input and the Y-axis represents the output. As is observed from FIG. 49, when the frequency component $y_{ij}$ whose absolute value is equal to or more than a predetermined threshold A is input, the output is zero.

Thereafter, the noise component extracted by the nonlinear processor 5 is inverse-operated as expressed by formula (3) below by the Hadamard inverse transformer 6, so as to return the data to the component in real space.

$$X_{00}' = (y_{00}' + y_{01}' + y_{02}' + y_{03}' + y_{10}' + y_{11}' + y_{12}' + y_{13}')/8 \quad (3)$$
$$X_{01}' = (y_{00}' - y_{01}' + y_{02}' - y_{03}' + y_{10}' - y_{11}' + y_{12}' - y_{13}')/8$$
$$X_{02}' = (y_{00}' + y_{01}' - y_{02}' - y_{03}' + y_{10}' + y_{11}' - y_{12}' - y_{13}')/8$$
$$X_{03}' = (y_{00}' - y_{01}' - y_{02}' + y_{03}' + y_{10}' - y_{11}' - y_{12}' + y_{13}')/8$$
$$X_{10}' = (y_{00}' + y_{01}' + y_{02}' + y_{03}' - y_{10}' - y_{11}' - y_{12}' - y_{13}')/8$$
$$X_{11}' = (y_{00}' - y_{01}' + y_{02}' - y_{03}' - y_{10}' + y_{11}' - y_{12}' + y_{13}')/8$$
$$X_{12}' = (y_{00}' + y_{01}' - y_{02}' - y_{03}' - y_{10}' - y_{11}' + y_{12}' + y_{13}')/8$$
$$X_{13}' = (y_{00}' - y_{01}' - y_{02}' + y_{03}' - y_{10}' + y_{11}' + y_{12}' - y_{13}')/8$$

wherein $x'_{ij}$ represents each component of the noise signal returned to the real space.

The noise component $x'_{ij}$ is then converted into the temporally serial noise signal S2 by the parallel/serial converter 7. Thereafter, the second subtracter 8 subtracts the noise signal S2 from the input video signal S1 including noise. Thus, the noise is reduced by the conventional noise reducer 900.

In the conventional noise reducer 900, the threshold A for the input/output characteristic of the nonlinear processor 5 is fixed to a predetermined value as shown in FIG. 49. Accordingly, when the absolute value of a motion component included in the input video signal S1 is comparatively small, i.e., equal to or less than the threshold A, the nonlinear processor 5 extracts the motion component as noise, causing a phenomenon such as lag and trailing on the moving picture displayed. On the contrary, when the amplitude of noise is considerably large, since the portion of such noise of which absolute value exceeds the threshold A is not extracted, the noise signal S2 returned from the nonlinear processor 5 is smaller than the original noise included in the input video signal S1. As a result, a sufficient noise reduction effect is not obtained. Further, when the input video signal S1 includes little noise or the noise has a small amplitude, the motion component of the video signal is extracted and subtracted from the input video signal and this results in causing a phenomenon such as lag and trailing in the displayed motion picture more prominent because the influence of the noise itself is smaller.

SUMMARY OF THE INVENTION

The noise reducer for outputting a noise-reduced signal by extracting noise included in an input video signal so as to produce a noise signal and by subtracting the noise signal from the input video signal is provided. The noise reducer of this invention includes: a signal processing portion including: a delay circuit for delaying the noise-reduced signal by a predetermined time period so as to output a delayed signal; a first subtracter for subtracting the delayed signal from the input video signal so as to output a differential signal; an orthogonal transformer for receiving the differential signal and conducting an orthogonal transformation on the differential signal, each of the pixel blocks of the differential signal being transformed as a unit, so as to output an orthogonally transformed signal; a nonlinear processing portion for receiving the orthogonally transformed signal and conducting nonlinear processing on the orthogonally transformed signal based on a predetermined threshold so as to output a nonlinear processed signal; an orthogonal inverse transformer for receiving the nonlinear processed signal and conducting an inverse transformation of the orthogonal transformation on the nonlinear processed signal so as to output an inversely transformed signal; and an attenuator for receiving the inversely transformed signal and attenuating the inversely transformed signal by a predetermined coefficient so as to output the noise signal; a second subtracter for subtracting the noise signal from the input video signal so as to output the noise-reduced signal; and an adaptive control portion for controlling at least one of the predetermined threshold and the predetermined coefficient based on at least one of the differential signal and the orthogonally transformed signal.

In one embodiment of the invention, the input video signal is composed of serial data, and the signal processing portion further includes: a serial/parallel converter for converting the differential signal into a parallel signal and outputting the parallel signal to the orthogonal transformer, each of the pixel blocks being output as a unit; and an averaging portion for averaging the inversely transformed signal based on the predetermined time period so as to convert the inversely transformed signal into serial data and outputting the serial data of the inversely transformed signal to the attenuator.

In another embodiment of the invention, the adaptive control portion includes: a motion amount determination portion for determining at least the amount of motion of the input video signal in the predetermined time period based on the differential signal and/or the orthogonally transformed signal; and a parameter control portion for controlling at least one of the predetermined threshold and the predetermined coefficient based on the amount of motion.

In another embodiment of the invention, the motion amount determination portion includes an absolute value calculation circuit for receiving the differential signal for each of the pixel blocks composed of m samples in a horizontal direction and n lines in a vertical direction (m, n=natural numbers) and calculating the absolute value of data of the differential signal at each sample point of the pixel block, and an average calculator for calculating the average of the absolute values, and the parameter control portion which includes a first control portion for controlling the predetermined threshold for the nonlinear processing portion based on an output from the average calculator, and a second control portion for controlling the predetermined coefficient for the attenuator based on the output from the average calculator.

In another embodiment of the invention, the motion amount determination portion includes an absolute value calculation circuit for receiving the orthogonally transformed signal and calculating the absolute value of each component of the orthogonally transformed signal, and a dispersion parameter calculator for calculating a dispersion parameter representing the degree of dispersion of the absolute value, and the parameter control portion which includes a first control portion for controlling the predetermined threshold for the nonlinear processing portion based on an output from the dispersion parameter calculator, and a second control portion for controlling the predetermined coefficient for the attenuator based on the output from the dispersion parameter calculator.

In another embodiment of the invention, the motion amount determination portion includes an absolute value calculation circuit for receiving the orthogonally transformed signal and calculating the absolute values of k components (k=natural number) of the orthogonally transformed signal, and the parameter control portion which includes a first control portion for controlling the predetermined threshold for the nonlinear processing portion based on at least one of the outputs from the k absolute value calculation circuit, and a second control portion for controlling the predetermined coefficient for the attenuator based on at least one of the outputs from the k absolute calculation circuit.

In another embodiment of the invention, the motion amount determination portion includes an isolated-point removal circuit for receiving the orthogonally transformed signal and removing isolated points from the i components among the k components (i=natural number less than k, k=natural number equal to or more than 2) of the orthogonally transformed signal, a first absolute value calculation circuit for calculating absolute values of the i components output from the isolated-point removal portion, and a second absolute value calculation circuit for calculating absolute values of the (k–i) components on which isolated-point removal is not conducted, and the parameter control portion which includes a first control portion for controlling the predetermined threshold for the nonlinear processing portion based on an output from the first absolute value calculation circuit and/or the second absolute value calculation circuit, and a second control portion for controlling the predetermined coefficient for the attenuator based on the output from the first absolute value calculation circuit and/or the second absolute value calculation circuit.

In another embodiment of the invention, the isolated-point removal portion includes a filter for determining whether or not each of the i components of the orthogonally transformed signal is isolated in at least one of three directions corresponding to a horizontal direction, a vertical direction, and a temporal direction of the pixel block, and outputting a modified value for the component when the component is determined as being isolated.

In another embodiment of the invention, the noise reducer further includes an additional control portion for receiving the differential signal, detecting the amplitude of noise included in the differential signal, and outputting the amplitude of the noise to the adaptive control portion as an additional control signal for further adjusting the predetermined threshold and/or the predetermined coefficient.

In another embodiment of the invention, the noise reducer further includes an additional control portion for receiving the input video signal, extracting a predetermined parameter from the input video signal, and outputting the extracted parameter to the adaptive control portion as an additional control signal for further adjusting at least one of the predetermined threshold and the predetermined coefficient.

In another embodiment of the invention, the parameter extracted by the additional control portion is one of the type, amplitude, or level of the input video signal.

According to another aspect of the invention, the noise reducer for outputting noise-reduced signal by extracting noise included in an input video signal so as to produce a noise signal and by subtracting the noise signal from the input video signal, the noise reducer includes: a signal processing portion which includes: a first delay circuit for delaying the noise-reduced signal by a predetermined time period so as to output a first delayed signal; a first subtracter for subtracting the first delayed signal from the input video signal to output a differentials signal; an orthogonal transformer for receiving the differential signal and a second delayed signal and conducting an orthogonal transformation on the differential signal and the second delayed signal, each of the pixel blocks of the differential signal and the second delayed signal being transformed as a unit, so as to output an orthogonally transformed signal; a nonlinear processing portion for receiving the orthogonally transformed signal and conducting nonlinear processing on the orthogonally transformed signal based on a predetermined threshold so as to output a nonlinear processed signal; an orthogonal inverse transformer for receiving the nonlinearly processed signal and conducting an inverse transformation of the orthogonal transformation on the nonlinearly processed signal so as to output an inversely transformed signal; an attenuator for receiving the inversely transformed signal and attenuating the inversely transformed signal by a predetermined coefficient to output the noise signal; and a second delay circuit for delaying the inversely transformed signal by another predetermined time period to output the second delayed signal; a second subtracter for subtracting the noise signal from the input video signal to output the noise-reduced signal; and an adaptive control portion for controlling the predetermined threshold and/or the predetermined coefficient based on the differential signal and/or the orthogonally transformed signal.

In one embodiment of the invention, the input video signal and the second delayed signal are serial data, and the signal processing portion further includes: a serial/parallel converter for converting the differential signal and the second delayed signal into a parallel signal and outputting the parallel signal to the orthogonal transformer, each of the pixel blocks being output as a unit; and an averaging portion for averaging the inversely transformed signal based on the predetermined time period to convert the inversely transformed signal into serial data and outputting the serial data of the inversely transformed signal to the attenuator and the second delay circuit.

In another embodiment of the invention, the adaptive control portion includes: a motion amount determination portion for determining at least the amount of motion of the input video signal in the predetermined time period based on at least one of the combination of the differential signal and the second delayed signal and the orthogonally transformed signal; and a parameter control portion for controlling at least one of the predetermined threshold and the predetermined coefficient based on the amount of motion.

In another embodiment of the invention, the motion amount determination portion includes an absolute value calculation circuit for receiving the differential signal and the second delayed signal for each of the pixel blocks composed of m samples in a horizontal direction and n lines in a vertical direction (m, n=natural numbers) and calculating the absolute value of data of the differential signal at each sample point of the pixel block, and an average calculator for calculating the average of the absolute values, and the parameter control portion includes a first control portion for controlling the predetermined threshold for the nonlinear processing portion based on an output from the average calculator, and a second control portion for controlling the predetermined coefficient for the attenuator based on the output from the average calculator.

In another embodiment of the invention, the motion amount determination portion includes an absolute value calculation circuit for receiving the orthogonally transformed signal and calculating the absolute value of each component of the orthogonally transformed signal, and a dispersion parameter calculator for calculating a dispersion parameter representing the degree of dispersion of the absolute value, and the parameter control portion includes a first control portion for controlling the predetermined threshold for the nonlinear processing portion based on an output from the dispersion parameter calculator, and a second control portion for controlling the predetermined coefficient for the attenuator based on the output from the dispersion parameter calculator.

In another embodiment of the invention, the motion amount determination portion includes an absolute value calculation circuit (k=natural number) for receiving the orthogonally transformed signal and calculating the absolute values of the k components of the orthogonally transformed signal, and the parameter control portion includes a first control portion for controlling the predetermined threshold for the nonlinear processing portion based on at least one of outputs from the k absolute value calculation circuit, and a second control portion for controlling the predetermined coefficient for the attenuator based on at least one of the outputs from the k absolute calculation circuit.

In another embodiment of the invention, the motion amount determination portion includes an isolated-point removal portion for receiving the orthogonally transformed signal and removing isolated points from the i components among the k components (i=natural number less than k, k=natural number equal to or greater than 2) of the orthogonally transformed signal, a first absolute value calculation circuit for calculating absolute values of the i components output from the isolated-point removal portion, and a second absolute value calculation circuit for calculating absolute values of the (k–i) components on which isolated-point removal is not conducted, and the parameter control portion includes a first control portion for controlling the predetermined threshold for the nonlinear processing portion based on an output from the first absolute value calculation circuit and/or the second absolute value calculation circuit, and a second control portion for controlling the predetermined coefficient for the attenuator based on the output from the first absolute value calculation circuit and/or the second absolute value calculation circuit.

In another embodiment of the invention, the isolated-point removal portion includes a filter for controlling whether or not each i component of the orthogonally transformed signal is isolated in at least one of three directions corresponding to a horizontal direction, a vertical direction, and a temporal direction of the pixel block, and outputting a modified value for the component when the component is determined as being isolated.

In another embodiment of the invention, the noise reducer further includes a control portion for receiving the differential signal, detecting the amplitude of noise included in the differential signal, and outputting the amplitude of the noise to the adaptive control portion as an additional control signal for further adjusting at least one of the predetermined threshold and the predetermined coefficient.

In another embodiment of the invention, the noise reducer further includes an additional control portion for receiving the input video signal, extracting a predetermined parameter from the input video signal, and outputting the extracted parameter to the adaptive control portion as an additional control signal for further adjusting at least one of the predetermined threshold and the predetermined coefficient.

In another embodiment of the present invention, the parameter extracted by the additional control portion is one of the type, amplitude, and level of the input video signal.

Thus, the invention described herein makes possible the advantages of (1) providing a noise reducer capable of reducing the deterioration in the quality of the moving picture portion of an image and also reducing noise effectively in both the moving picture portion and the still picture portion of the image by controlling at least one of the threshold for a nonlinear processor and the amount of attenuation at an attenuator according to the motion amount of a video signal and thus adjusting a feedback noise signal, and (2) providing a noise reducer where the threshold and the amount of attenuation is further controlled according to the amount of noise included in the video signal and the characteristic and type of the video signal.

These and other advantages of the present invention will become apparent to those skilled in the art upon reading and understanding the following detailed description with reference to the accompanying figures.

BRIEF DESCRIPTION OF THE DRAWINGS

FIGS. 16A and 16B show the relationship between the degree of dispersion and the dispersion parameter according to the second example.

DESCRIPTION OF THE PREFERRED EMBODIMENTS

The noise reducer of the present invention will be described by way of examples with reference to the accompanying drawings as follows.

Figure 1:
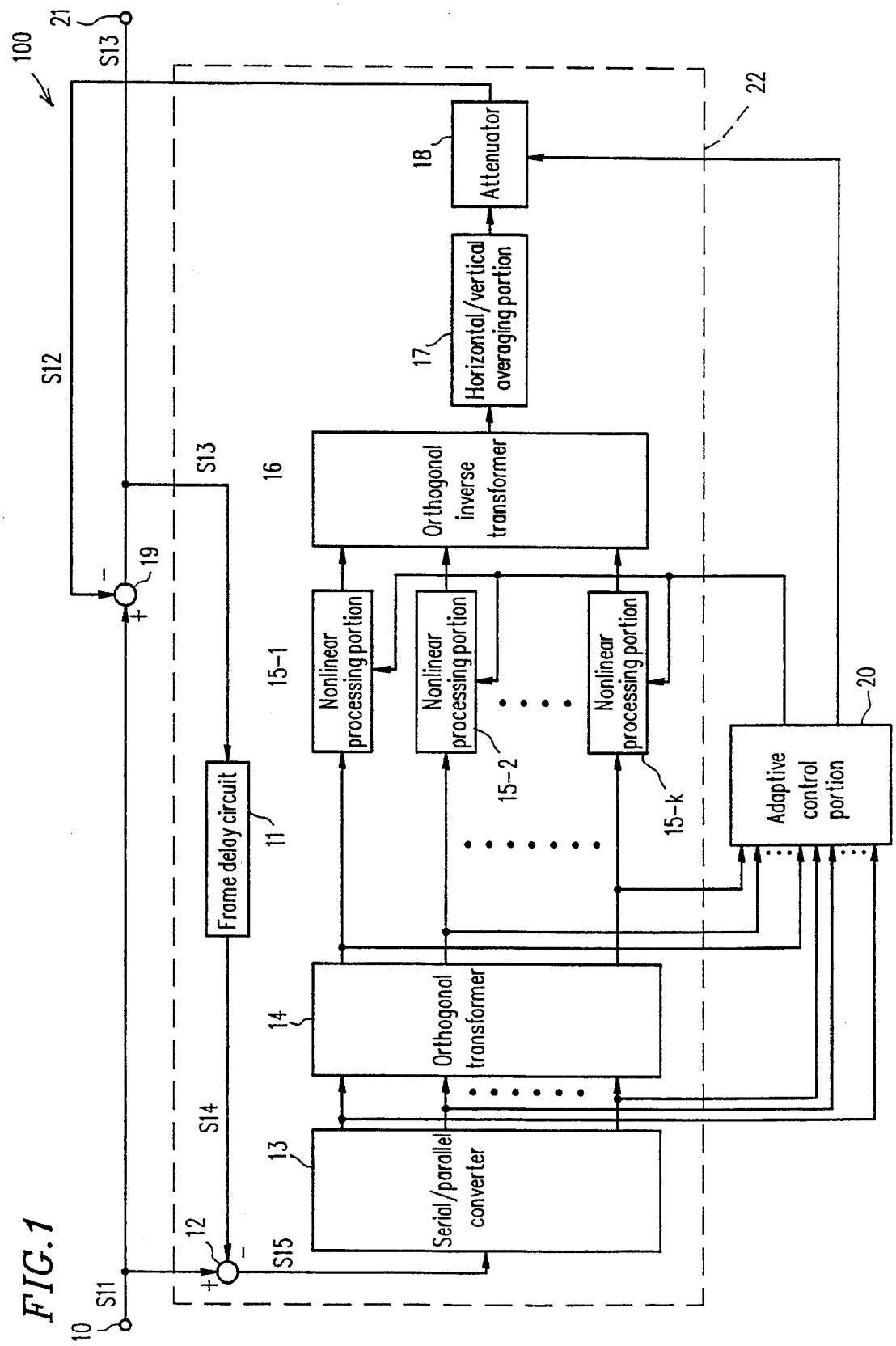
FIG. 1 is a block diagram of the noise reducer according to the present invention.

FIG. 1 is a block diagram of a noise reducer 100 which inclusively shows noise reducers of Examples 1 to 8. Referring to FIG. 1, the noise reducer 100 of the present invention includes a signal processing portion 22 which extracts noise included in an input video signal S11, and a second subtracter 19 which subtracts an extracted noise signal S12 from the input video signal S11, so as to obtain a noise-reduced output signal S13. The noise reducer 100 further includes an adaptive control portion 20 which controls at least a parameter used for noise reduction according to the amount of a motion component included in the input video signal S11.

Figure 2:
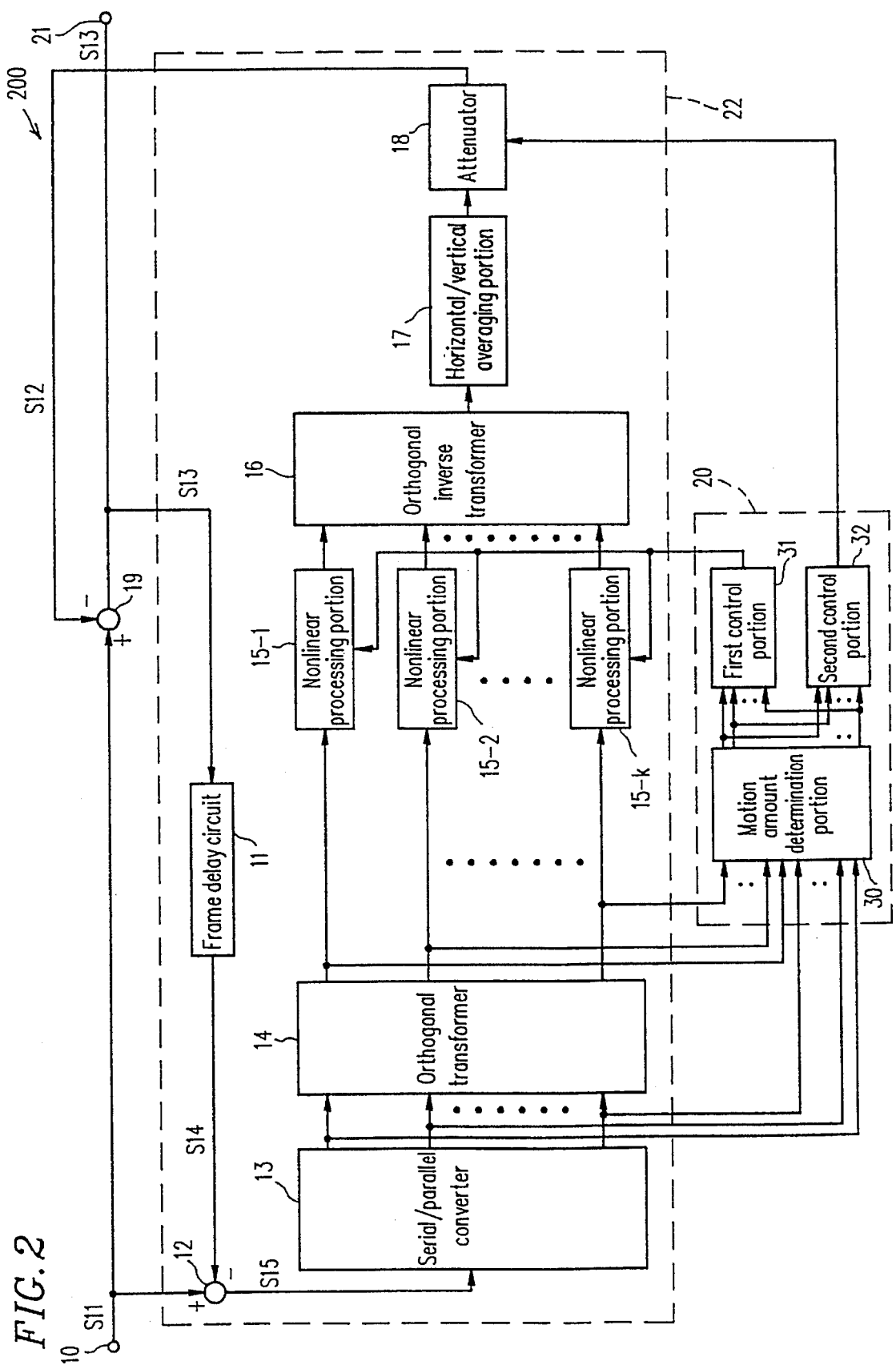
FIG. 2 is a block diagram of the noise reducer according to the present invention shown in more detail.

FIG. 2 shows a noise reducer 200 where the adaptive control portion 20 in FIG. 1 is shown more specifically. The basic configurations of the noise reducers of Examples 1 to 4 are the same as the noise reducer 200 of FIG. 2. The noise reducer of the present invention may be provided with an additional control system for adjusting the parameter for noise reduction so as to achieve more effective and precise noise reduction. Such an additional control system will be described in Examples 5 to 9.

The configuration and the operation of the components of the noise reducer 200 which are common to Examples 1 to 4 will now be described. Referring to FIG. 2, the noise reducer 200 includes the signal processing portion 22 having a frame delay circuit 11, a first subtracter 12, a serial/parallel converter 13, an orthogonal transformer 14, nonlinear processing portions 15-1 to 15-k (hereinafter, collectively referred to as a nonlinear processor 15, unless this causes misunderstanding), an orthogonal inverse transformer 16, a horizontal/vertical averaging portion 17, and an attenuator 18; and the adaptive control portion 20 having a motion amount determination portion 30, a first control portion 31, and a second control portion 32.

As shown in FIG. 2, the input video signal S11 is input from an input terminal 10. The signal processing portion 22 extracts a noise component included in the input video signal S11 and outputs the noise signal S12. The second subtracter 19 subtracts the noise signal S12 from the input video signal S11 and outputs the noise-reduced output signal S13.

The frame delay circuit 11 which is connected to the second subtracter 19 receives the noise-reduced output signal S13 from the second subtracter 19, and outputs a delayed signal S14 by delaying the output signal S13 by N frame(s) (N=1, 2, ... ). The first subtracter 12 which is connected to the input terminal 10 and the frame delay circuit 11 subtracts the delayed signal S14 from the input video signal S11 so as to obtain a frame differential signal S15.

Figure 3:
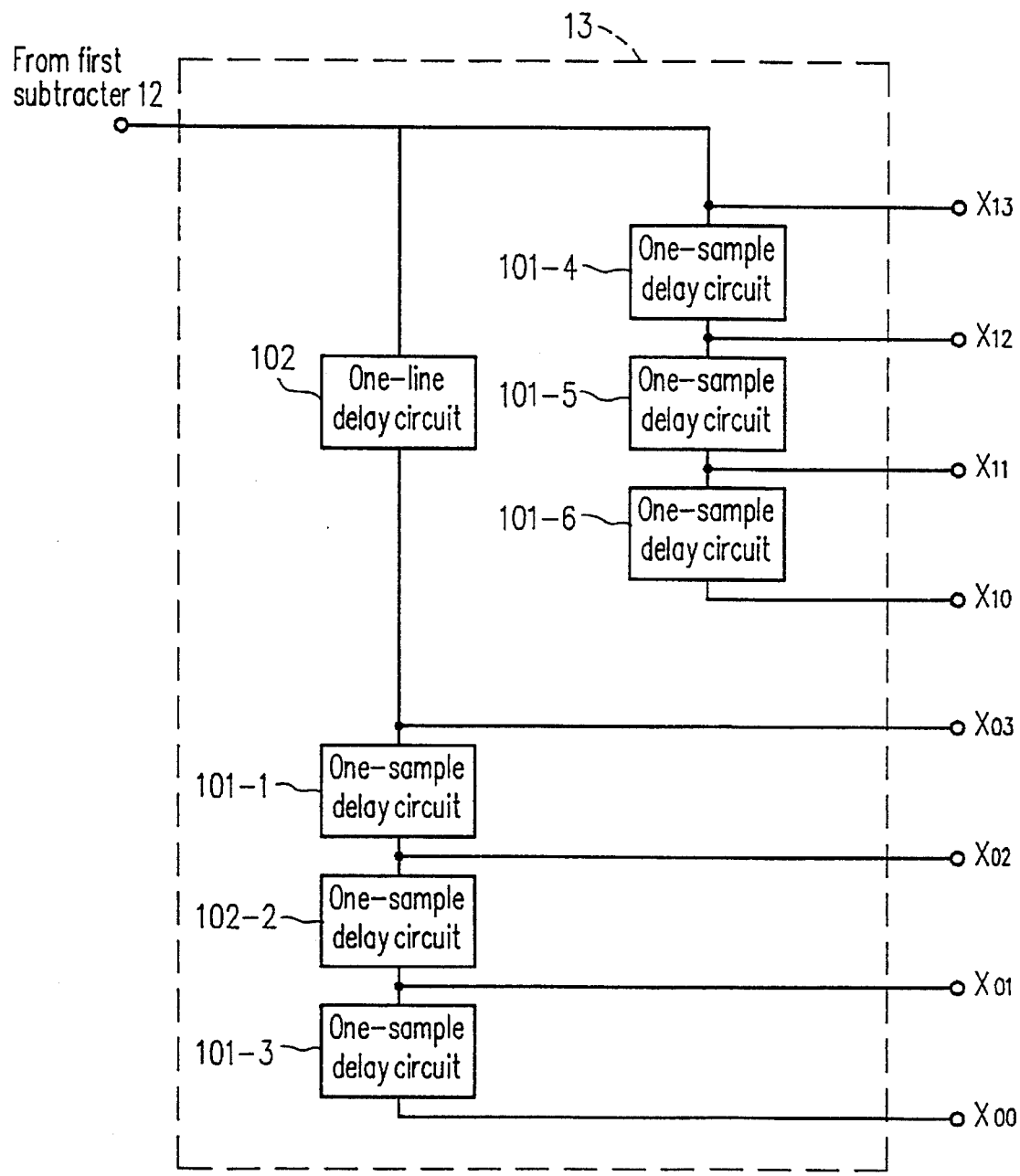
FIG. 3 is a block diagram of a serial/parallel converter of the noise reducer according to the present invention.
Figure 4:
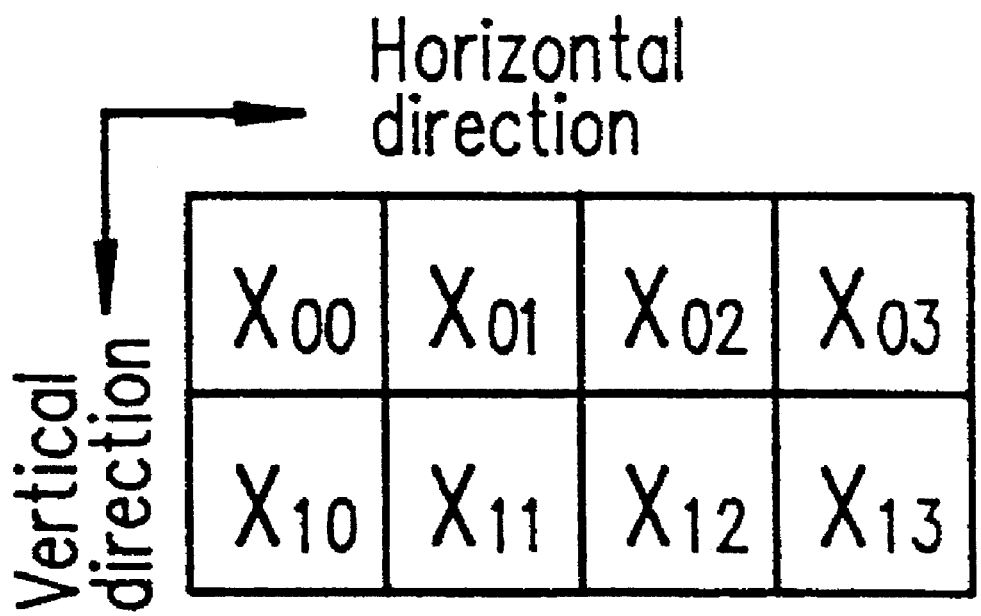
FIG. 4 explains a concept of the data from a pixel block on a screen.

The serial/parallel converter 13 which is connected to the first subtracter 12 converts a temporally serial data series of the frame differential signal S15 into a temporally parallel data series so as to produce a pixel block of data for the orthogonal transformation. One pixel block is composed of m samples in the horizontal direction and n lines in the vertical direction (m, n=natural numbers). In this example, the case where one pixel block is composed of m=4 samples in the horizontal direction and n=2 lines in the vertical direction will be described, though the size of the pixel block is not limited to the above case. FIG. 3 shows an example of the configuration of the serial/parallel converter 13. The serial/parallel converter 13 includes six one-sample delay circuits 101-1 to 101-6 and a one-line delay circuit 102. The pixel block produced by the serial/parallel converter 13 is shown in FIG. 4, which will be described later in detail.

Referring to FIG. 2 again, the orthogonal transformer 14 which is connected to the serial/parallel converter 13 conducts orthogonal transformation on the data of the pixel block produced by the serial/parallel converter 13. In this example, the Hadamard transformation is employed as the orthogonal transformation conducted by the orthogonal transformer 14. The Hadamard transformation is advantageous in that the transformation can be implemented with a simple circuit and the circuit can be used for both the transformation and the inverse transformation. Other types of orthogonal transformation such as discrete cosine transformation (DCT) and Harr transformation can also be used.

The nonlinear processor 15 is composed of k (k=m×n) nonlinear processing portions 15-1 to 15-k corresponding to the respective data of the pixel block, and connected to the orthogonal transformer 14. The nonlinear processor 15 conducts nonlinear processing on the orthogonal-transformed data so as to extract a noise component. The orthogonal inverse transformer 16 which is connected to the nonlinear processor 15 conducts an orthogonal inverse transformation on the data extracted as the noise component.

Figure 5:
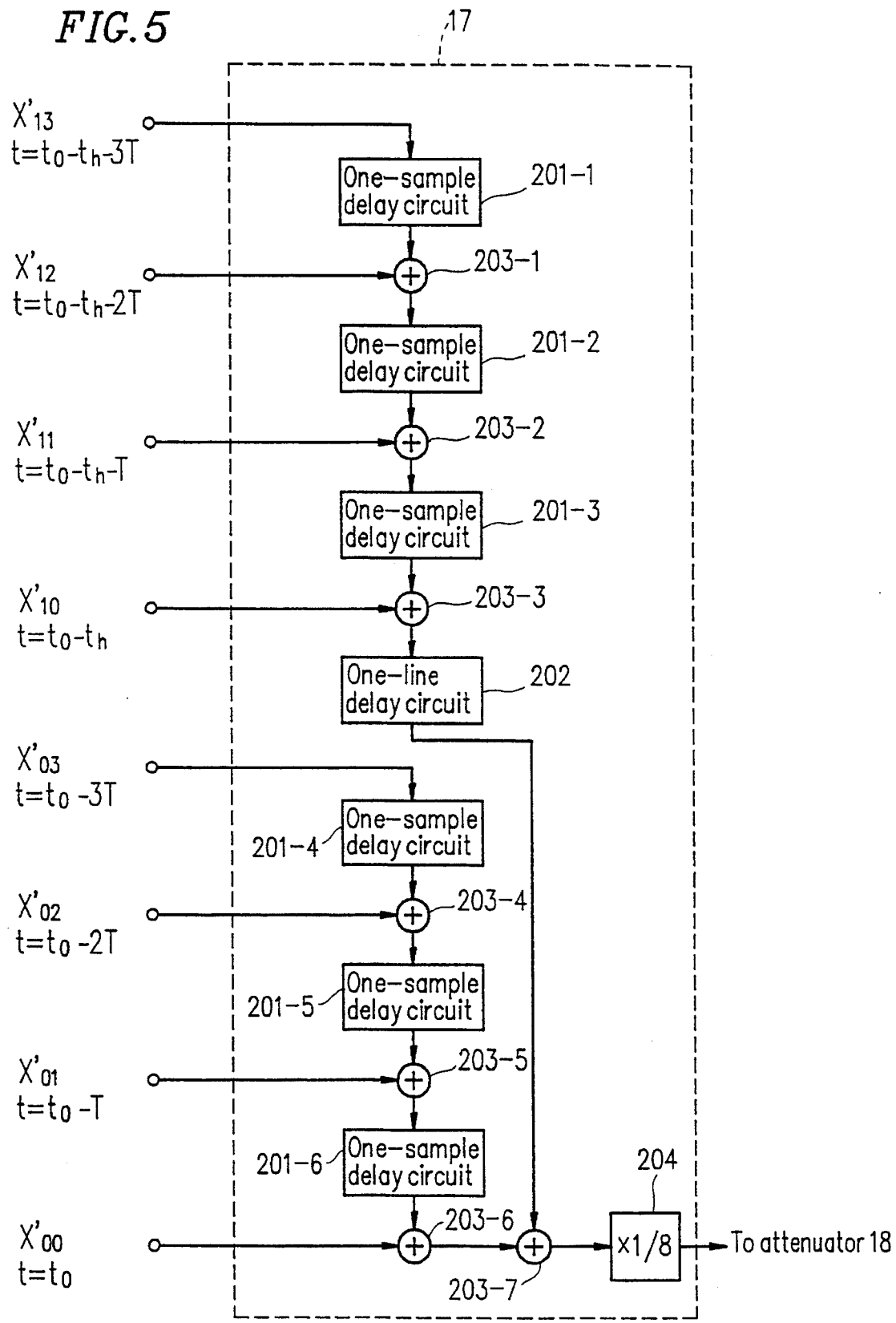
FIG. 5 is a block diagram of a horizontal/vertical averaging portion according to the present invention.

The horizontal/vertical averaging portion 17 which is connected to the orthogonal inverse transformer 16 receives the temporally parallel data series (pixel block of data) composed of m samples horizontally in n lines vertically which has been subjected to the orthogonal transformation. The horizontal/vertical averaging portion 17 averages the data corresponding to an identical pixel position on the screen and included in different pixel blocks, so that the received parallel data of the pixel block is converted into temporally serial data. FIG. 5 shows an example of the configuration of the horizontal/vertical averaging portion 17, which includes one-sample delay circuits 201-1 to 201-6, a one-line delay circuit 202, adders 203-1 to 203-7, and a multiplier 204 which multiplies the output from the adder 203-7 by ⅛. The operation thereof will be described later in detail.

Referring back to FIG. 2 again, the attenuator 18 which is connected to the horizontal/vertical averaging portion 17 lowers the gain of the output from the horizontal/vertical averaging portion 17. The second subtracter 19 which is connected to the input terminal 10, the attenuator 18, and the frame delay circuit 11 subtracts the noise signal S12 (the output from the attenuator 18) from the input video signal S11 so as to reduce a noise component of the input video signal S11. The output signal S13 with reduced noise is supplied to the frame delay circuit 11, as well as being output to an output terminal 21.

The motion amount determination portion 30 of the adaptive control portion 20 which is connected to the serial/parallel converter 13 and the orthogonal transformer 14 determines the amount of the motion component (motion amount) of the input video signal S11 based on at least one of the signals supplied from the serial/parallel converter 13 and the orthogonal transformer 14. The first and second control portions 31 and 32 control parameters for the nonlinear processor 15 and the attenuator 18, respectively, based on the output from the motion amount determination portion 30. In FIG. 2, the first and second control portions 31 and 32 are shown as separated portions. However, they may be constructed as one circuit.

The operation of the noise reducer 200 common to Examples 1 to 4 will be described in more detail.

The input video signal S11 including noise is input from the input terminal 10. The first subtracter 12 calculates the difference between the input video signal S11 and the delayed signal S14 delayed by N frame(s) (N=1, 2, . . . ) by the frame delay circuit 11, and outputs random noise and a motion component included in the input video signal S11 as the frame differential signal S15. This differential operation is possible because the random noise and the motion component have small correlations among frames (i.e., along the temporal axis). The frame differential signal S15 is generated according to the amplitudes of the noise and the motion component. Accordingly, the output from the first subtracter 12 is zero when the input video signal is in the still picture portion without noise.

The output from the first subtracter 12 (the frame differential signal S15) is temporally serial data including the noise and the motion component. The serial/parallel converter 13 converts the serial data into temporally parallel data composed of m sample points horizontally in n lines vertically (m, n=natural numbers). The serial/parallel converter 13 includes n−1 one-line delay circuit(s) and (m−1)×n one-sample delay circuit(s). Hereinbelow, the case where one pixel block is composed of m=4 samples horizontally in n=2 lines vertically will be described. A temporally parallel block produced by the serial/parallel converter 13 is expressed in the form of a matrix by formula (4):

$$\begin{bmatrix} x_{00}\, x_{01}\, x_{02}\, x_{03} \\ x_{10}\, x_{11}\, x_{12}\, x_{13} \end{bmatrix} \quad (4)$$

Referring to FIG. 4, the pixel block composed of data $x_{00}$ to $x_{03}$ and $x_{10}$ to $x_{13}$ will be described. FIG. 4 shows the pixel block composed of four samples and two lines. When $x_{00}$ is considered as the reference, $x_{01}$, $x_{02}$, and $x_{03}$ are data located right of the reference by one sample, two samples, and three samples, respectively. Likewise, when $x_{10}$ is considered as the reference, $x_{11}$, $x_{12}$, and $x_{13}$ are data located right of the reference by one sample, two samples, and three samples, respectively. The data $x_{10}$ to $x_{13}$ are located below the data $x_{00}$ to $x_{03}$ by one line.

The parallel converted 4×2 data $y_{ij}$ ($0 \leq i \leq 1$, $0 \leq j \leq 3$) of the pixel block is then subjected to the Hadamard transformation by the orthogonal transformer 14. The Hadamard-transformed data (signal components in the Hadamard space) $y_{ij}$ ($0 \leq i \leq 1$, $0 \leq j \leq 3$) are expressed by formula (5):

$$\begin{aligned} y_{00} &= X_{00} + X_{01} + X_{02} + X_{03} + X_{10} + X_{11} + X_{12} + X_{13} \\ y_{01} &= X_{00} - X_{01} + X_{02} - X_{03} + X_{10} - X_{11} + X_{12} - X_{13} \\ y_{02} &= X_{00} + X_{01} - X_{02} - X_{03} + X_{10} + X_{11} - X_{12} - X_{13} \\ y_{03} &= X_{00} - X_{01} - X_{02} + X_{03} + X_{10} - X_{11} - X_{12} + X_{13} \\ y_{10} &= X_{00} + X_{01} + X_{02} + X_{03} - X_{10} - X_{11} - X_{12} - X_{13} \\ y_{11} &= X_{00} - X_{01} + X_{02} - X_{03} - X_{10} + X_{11} - X_{12} + X_{13} \\ y_{12} &= X_{00} + X_{01} - X_{02} - X_{03} - X_{10} - X_{11} + X_{12} + X_{13} \\ y_{13} &= X_{00} - X_{01} - X_{02} + X_{03} - X_{10} + X_{11} + X_{12} - X_{13} \end{aligned} \quad (5)$$

The random noise component which has small correlation in the horizontal and vertical directions (for example, a white noise is flat in its frequency characteristic) is substantially evenly distributed to the respective data $y_{00}$ to $y_{03}$ and $y_{10}$ to $y_{13}$ of formula (5). On the other hand, the motion component of the output video signal has a specific frequency characteristic. Accordingly, the motion components subjected to the Hadamard transformation are mainly found in certain signal components (one component to four components) among the components $y_{00}$ to $y_{03}$ and $y_{10}$ to $y_{13}$ of formula (5).

Figure 6A:
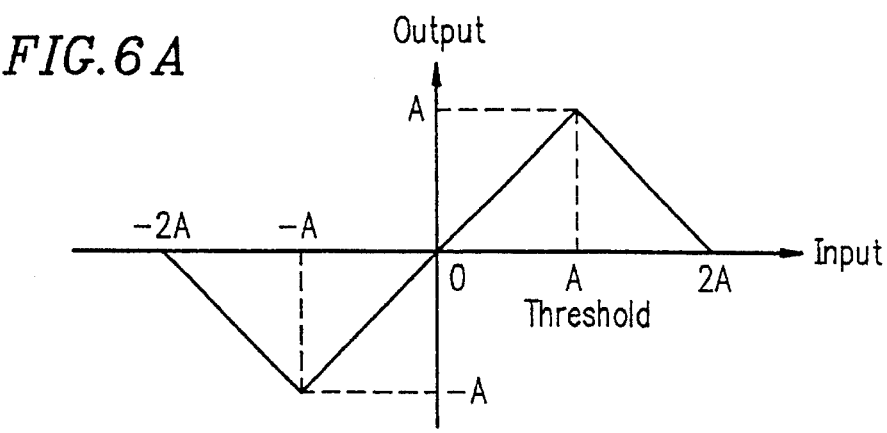
FIGS. 6A to 6D show the input/output characteristics of a nonlinear processor according to the present invention.

Thereafter, the orthogonally transformed data $y_{00}$ to $y_{03}$ and $y_{10}$ to $y_{13}$ are output into the nonlinear processor 15 so as to extract noise components from the data. FIG. 6A shows the input/output characteristic of the nonlinear processor 15. As shown in FIG. 6A, the output from the nonlinear processor 15 is maximum when the absolute value of the signal component |$y_{ij}$| is a predetermined value A, while the output is zero when the absolute value of the signal component |$y_{ij}$| is equal to or more than the predetermined threshold 2A. The latter corresponds to the case where, when the input is equal to or more than the threshold 2A, the frame differential signal S15 is judged as a motion component signal and therefore no noise signal is extracted. Hereinafter, the value A is referred to as the threshold for the nonlinear processor 15.

Figure 6B:
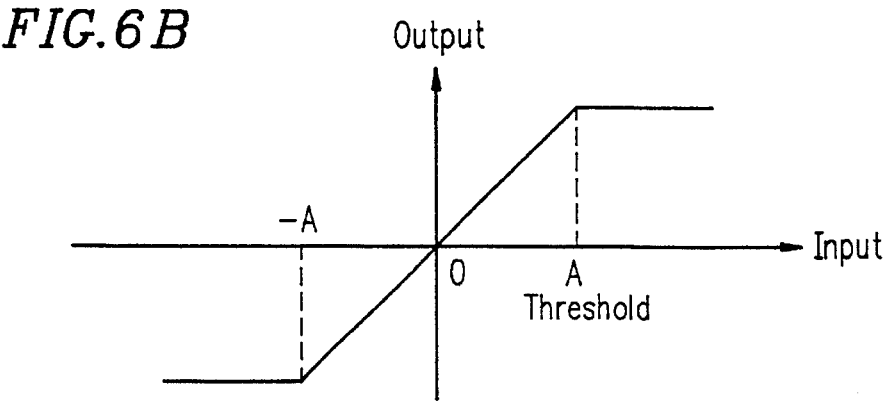
Figure 6C:
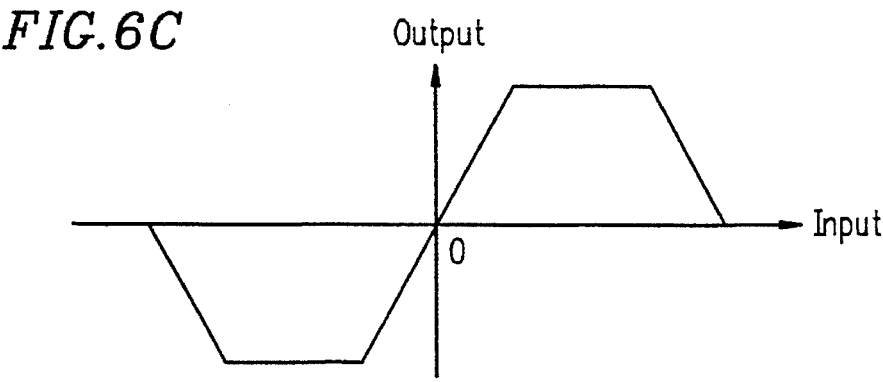
Figure 6D:
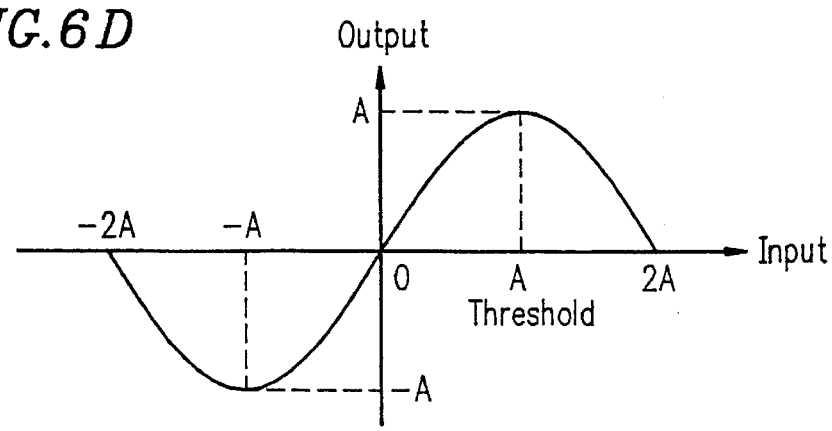

The input/output characteristic of the nonlinear processor 15 may be set as shown in FIGS. 6B to 6D. It is also possible to determine an appropriate input/output characteristic by simulation, or depending on the type of the input video signal.

The threshold A of the nonlinear processor 15 is determined by the first control portion 31 based on the motion amount included in the input video signal S11 determined by the motion amount determination portion 30. Thus, how the motion amount determination portion 30 determines the motion amount is an important point of the present invention. The detailed configurations and operations of the motion amount determination portion 30, the first control portion 31, and the second control portion 32 will be described in the respective examples.

Figure 7:
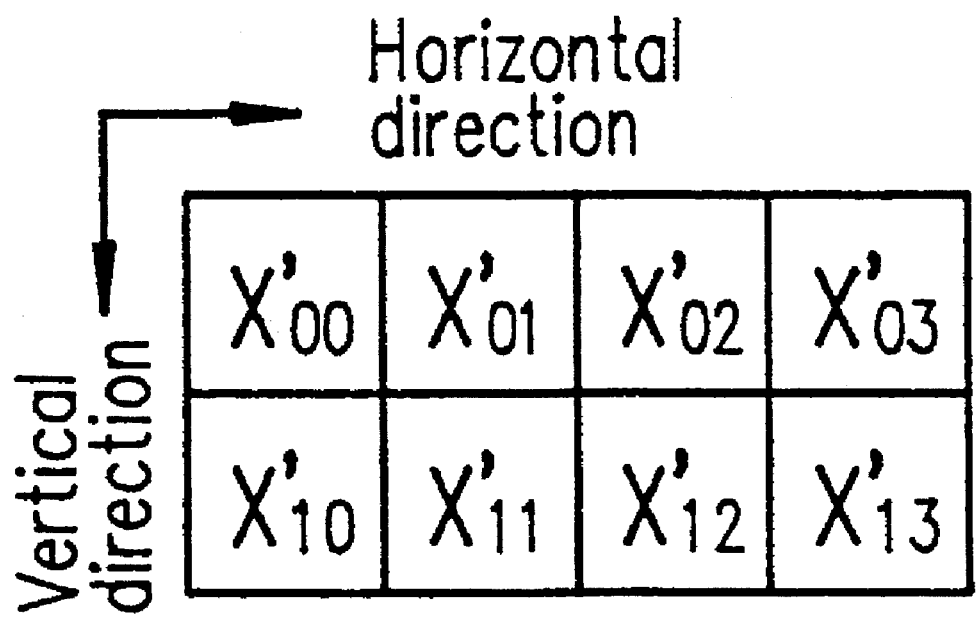
FIG. 7 shows pixel block data output from an orthogonal inverse transformer according to the present invention.

A signal component $y'_{ij}$ corresponding to the signal component $y_{ij}$ is output from the nonlinear processor 15. The orthogonal inverse transformer 16 conducts on each component $y'_{ij}$ the (4×2)th order Hadamard inverse transformation as expressed by formula (6):

$$
\begin{aligned}
x_{00}' &= (y_{00}' + y_{01}' + y_{02}' + y_{03}' + y_{10}' + y_{11}' + y_{12}' + y_{13}')/8 \\
x_{01}' &= (y_{00}' - y_{01}' + y_{02}' - y_{03}' + y_{10}' - y_{11}' + y_{12}' - y_{13}')/8 \\
x_{02}' &= (y_{00}' + y_{01}' - y_{02}' - y_{03}' + y_{10}' + y_{11}' - y_{12}' - y_{13}')/8 \\
x_{03}' &= (y_{00}' - y_{01}' - y_{02}' + y_{03}' + y_{10}' - y_{11}' - y_{12}' + y_{13}')/8 \\
x_{10}' &= (y_{00}' + y_{01}' + y_{02}' + y_{03}' - y_{10}' - y_{11}' - y_{12}' - y_{13}')/8 \\
x_{11}' &= (y_{00}' - y_{01}' + y_{02}' - y_{03}' - y_{10}' + y_{11}' - y_{12}' + y_{13}')/8 \\
x_{12}' &= (y_{00}' + y_{01}' - y_{02}' - y_{03}' - y_{10}' - y_{11}' + y_{12}' + y_{13}')/8 \\
x_{13}' &= (y_{00}' - y_{01}' - y_{02}' + y_{03}' - y_{10}' + y_{11}' + y_{12}' - y_{13}')/8
\end{aligned}
\quad (6)
$$

wherein $x'_{ij}$ represents the signal component output from the orthogonal inverse transformer 16. As will be easily observed, the Hadamard inverse transformation formula (6) has the same form as the Hadamard transformation formula (5) except for the existence of the coefficient ⅛. The pixel block after the Hadamard inverse transformation is shown in FIG. 7.

Figure 8:
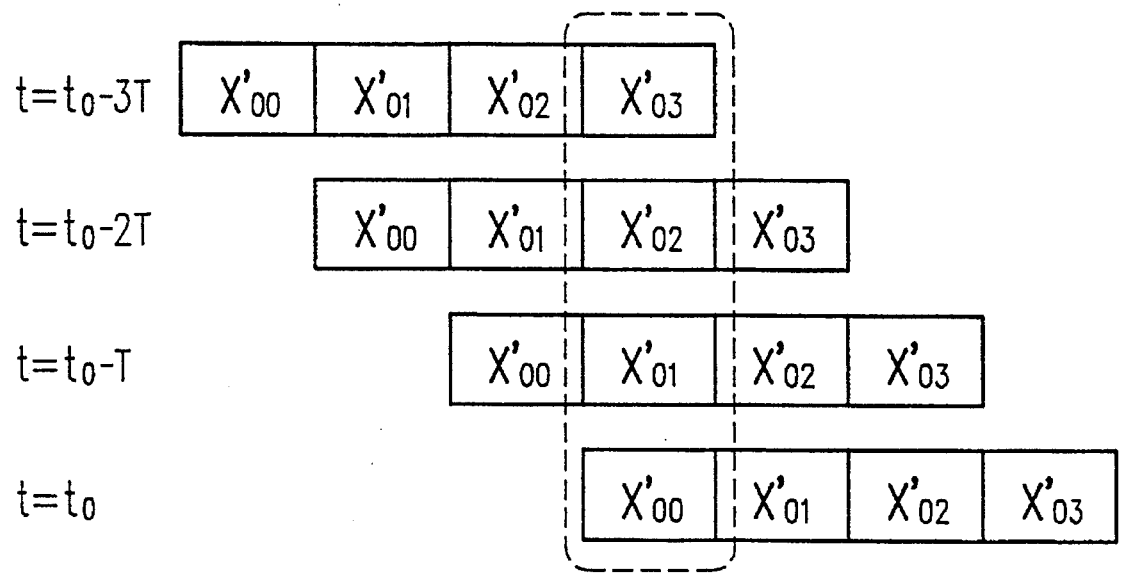
FIG. 8 describes the horizontal averaging operation.

The pixel block of 4×2 data subjected to the Hadamard inverse transformation are output from the orthogonal inverse transformer 16 every sample timing T. As shown in FIG. 8, in the horizontal direction, the data $x'_{00}$ at a time $t=t_0$, the data $x'_{01}$ at a time $t=t_0-T$ (1T behind the time $t_0$) the data $x'_{02}$ at a time $t=t_0-2T$ (2T behind the time $t_0$), and the data $x'_{03}$ at a time $t=t_0-3T$ (3T behind the time $t_0$) are on the physically identical position on the screen. Likewise in the vertical direction the data $x'_{00}$ at a time $t=t_0$, the data $x'_{10}$ at a time $t=t_0-t_h$ (1 line period $t_h$ behind the time $t_0$), the data $x'_{11}$ at a time $t=t_0-t_h-T$ (($t_h+T$) behind the time $t_0$), the data $x'_{12}$ at a time $t=t_0-t_h-2T$ (($t_h+2T$) behind the time $t_0$) and the data $x'_{13}$ at a time $t=t_0-t_h-3T$ (($t_h+3T$) behind the time $t_0$) are on the physically identical position on the screen. In other words, eight different outputs of orthogonally inverse-transformed data in the horizontal and vertical directions are obtained for one pixel position. The horizontal/vertical averaging portion 17 averages these eight outputs for one pixel position. By this averaging operation, ringing of horizontal and vertical motion components can be minimized.

Then, in the attenuator 18, the output from the horizontal/vertical averaging portion 17 is multiplied by a feedback coefficient a ($0 \leq a < 1$). The feedback coefficient a is determined by the second control portion 32 based on the motion amount determined by the motion amount determination portion 30. The detailed configurations and operations of the motion amount determination portion 30 and the second control portion 32 will be described in the respective examples.

Finally, the second subtracter 19 subtracts the attenuated noise signal S12 output from the attenuator 18 from the input video signal S11, so as to obtain the output video signal S13 with reduced noise. The thus noise-reduced video signal S13 is output from the output terminal 21.

Hereinbelow, Examples 1 to 4 will be described centering the motion amount determination portion 30, the first control portion 31, and the second control portion 32.

EXAMPLE 1

Figure 9:
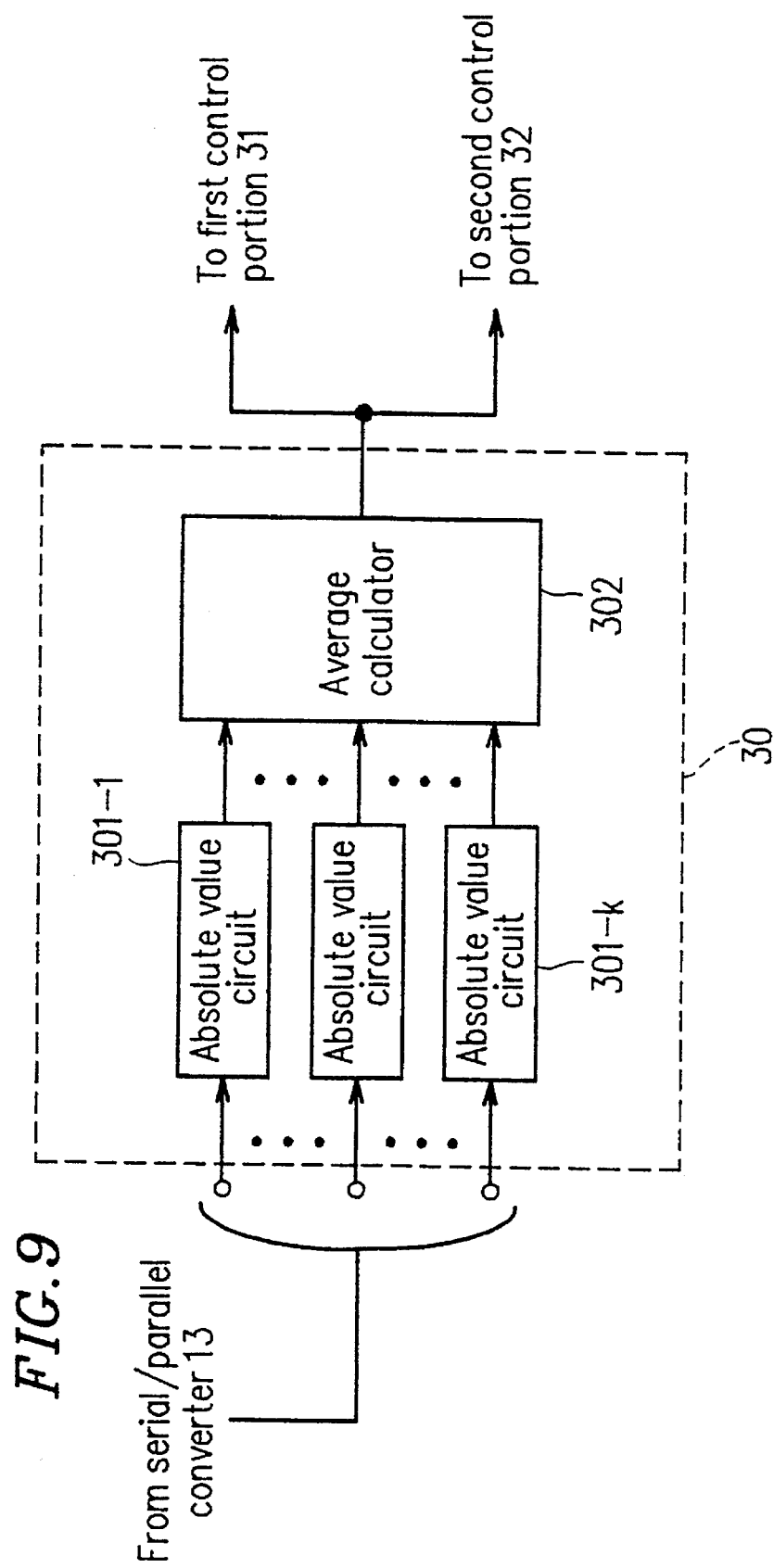
FIG. 9 is a block diagram of a motion amount determination portion of a noise reducer of the first example according to the present invention.

FIG. 9 shows the configuration of the motion amount determination portion 30 of the first example according to the present invention. In example 1, the average of the absolute values of the data $x_{00}$ to $x_{03}$ and $x_{10}$ to $x_{13}$ in the 4×2 pixel block is used as the motion amount.

Referring to FIG. 9, the motion amount determination portion 30 includes absolute value circuits 301-1 to 301-k (k=m×n, m=the number of samples in the horizontal direction in a pixel block, n=the number of lines in the vertical direction in the pixel block) and an average value calculator 302. The k absolute value circuits 301-1 to 301-k are connected to the serial/parallel converter 13. The average value calculator 302 receives outputs from the absolute value circuits 301-1 to 301-k and calculates the average of the outputs.

Figure 10:
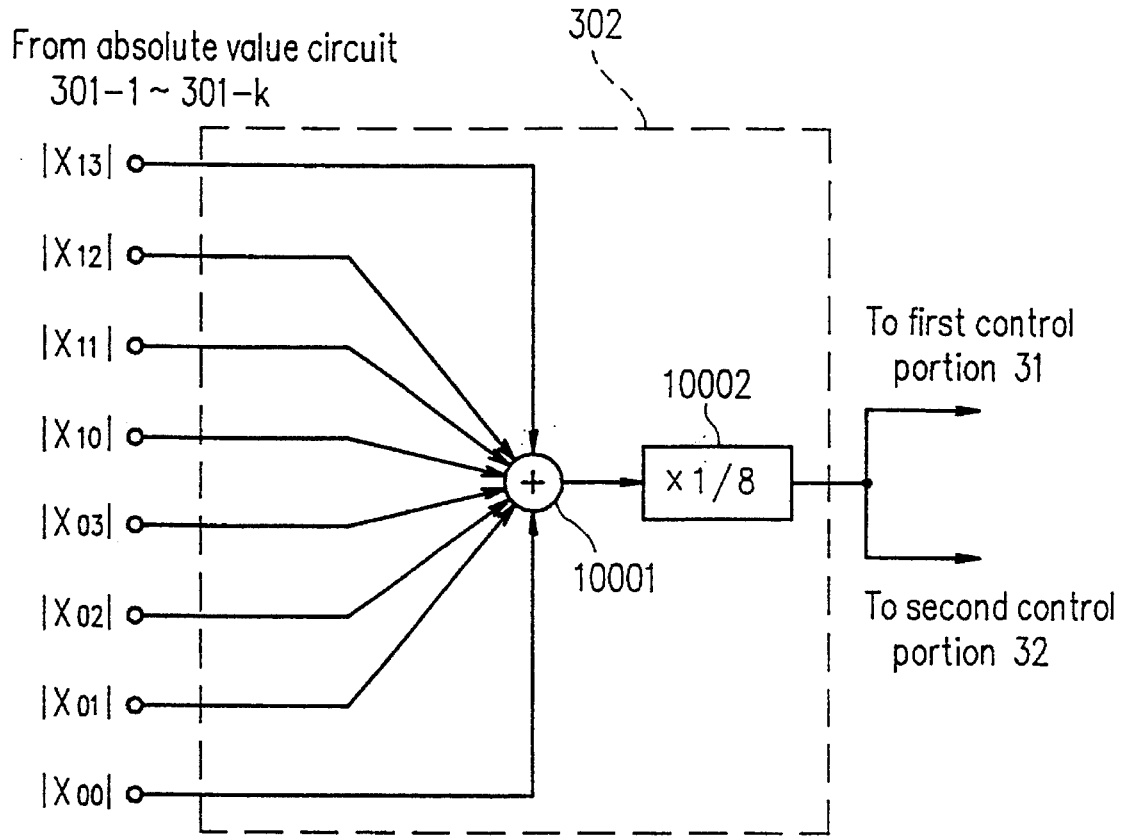
FIG. 10 is a block diagram of an average value calculator according to the first example.

FIG. 10 shows an exemplified configuration of the average value calculator 302. Referring to FIG. 10, the reference numeral 10001 denotes an adder, and the reference numeral 10002 denotes a circuit for multiplying the output from the adder 10001 by ⅛.

The operation of the adaptive control portion 20 of the noise reducer of Example 1 with the above configuration will be described.

The motion amount determination portion 30 receives the data $x_{00}$ to $x_{03}$ and $x_{10}$ to $x_{13}$ of the pixel block output from the serial/parallel converter 13. In the motion amount determination portion 30, the absolute values of the respective data $x_{00}$ to $x_{03}$ and $x_{10}$ to $x_{13}$ are calculated by the absolute value circuits 301-1 to 301-k (k=8 in this example), and the average of these absolute values is calculated by the average calculator 302. The first control portion 31 shown in FIG. 2 controls the threshold A for the nonlinear processor 15 based on the output from the average calculator 302 (i.e., the average of the absolute values of the 4×2 data of the pixel block). The second control portion 32 shown in FIG. 2 controls the feedback coefficient a for the attenuator 18 based on the output from the average calculator 302.

Figure 11:
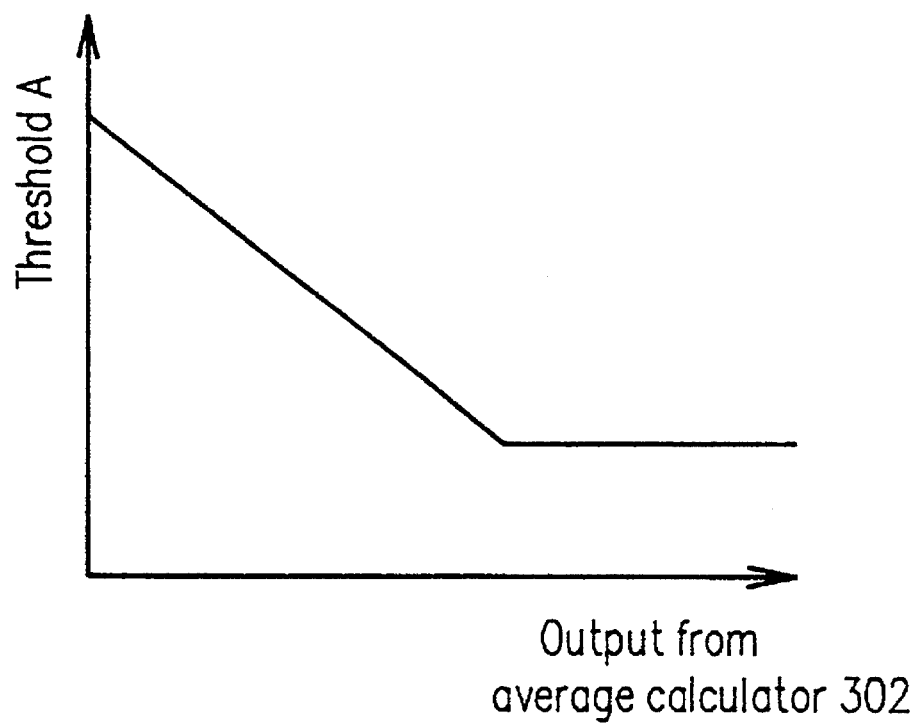
FIG. 11 shows the control characteristic of a first control portion according to the first example.
Figure 12:
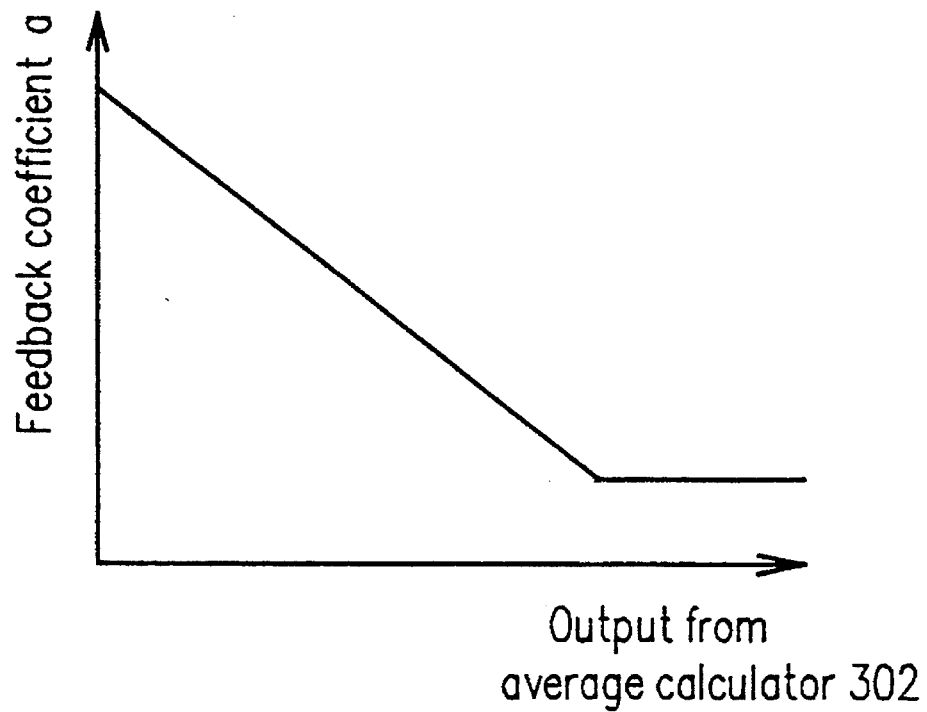
FIG. 12 shows the control characteristic of a second control portion according to the first example.

FIGS. 11 and 12 are examples of the control characteristics of the first and second control portions 31 and 32, respectively. As is apparent from FIGS. 11 and 12, when the output from the average calculator 302 (i.e., the motion amount of the video signal) is large, the first and second control portions 31 and 32 judge the frame differential signal S15 as the motion component and lowers the threshold A and the feedback coefficient a so as to reduce the feedback amount of the noise signal S12. By, this adjustment, the motion component is prevented from being subtracted from the video signal, and thus deterioration in the quality of the motion picture portion is prevented. On the contrary, when the output from the average calculator 302 (i.e., the motion amount of the video signal) is small, the first and second control portions 31 and 32 judge the frame differential signal S15 as the noise component and raise the threshold A and the feedback coefficient a so as to increase the feedback amount of the noise signal S12. By this adjustment, noise in the portion of small motion and the static picture portion can be effectively reduced.

Thus, according to the noise reducer of this example, where the motion amount determination portion 30 is composed of the absolute value circuits 301-1 to 301-k and the average calculator 302, the deterioration in the quality of the motion picture portion can be prevented and noise in the static picture portion and the small motion can be effectively reduced.

EXAMPLE 2

Figure 13:
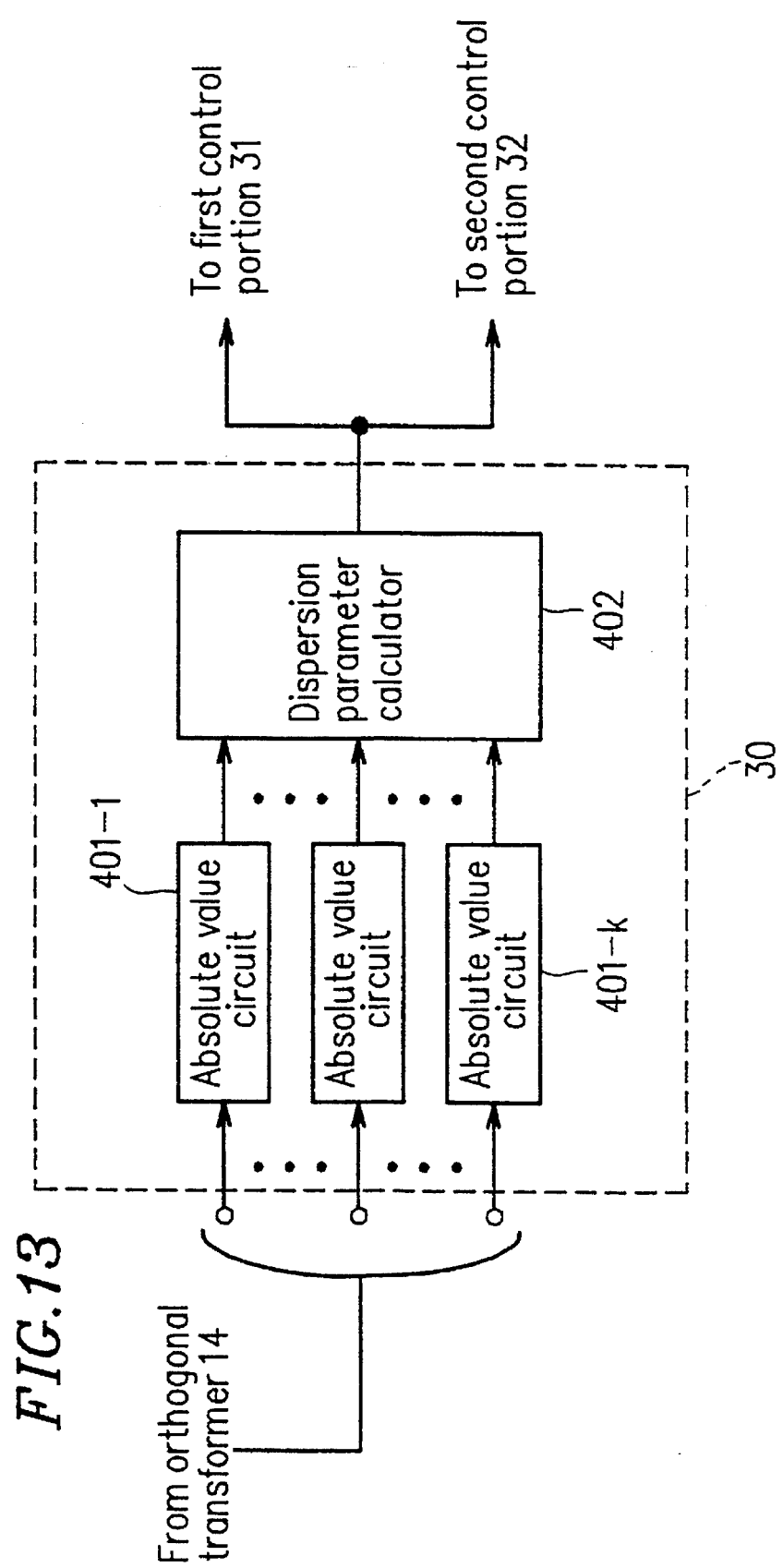
FIG. 13 is a block diagram of a motion amount determination portion of a noise reducer of the second example according to the present invention.

FIG. 13 shows the configuration of the motion amount determination portion 30 of the second example according to the present invention. In Example 2, the degree of variation (dispersion parameter) of the absolute values $|y_{ij}|$ of the data $y_{ij}$ is used as the motion amount. As described above, the data $y_{ij}$ is obtained by the Hadamard transformation of the pixel block of 4×2 data $x_{ij}$ shown in FIG. 4.

Referring to FIG. 13, the motion amount determination portion 30 includes k absolute value circuits 401-1 to 401-k and a dispersion parameter calculator 402. Two examples of the dispersion parameter calculator 402 are shown in FIGS. 14 and 15.

Figure 14:
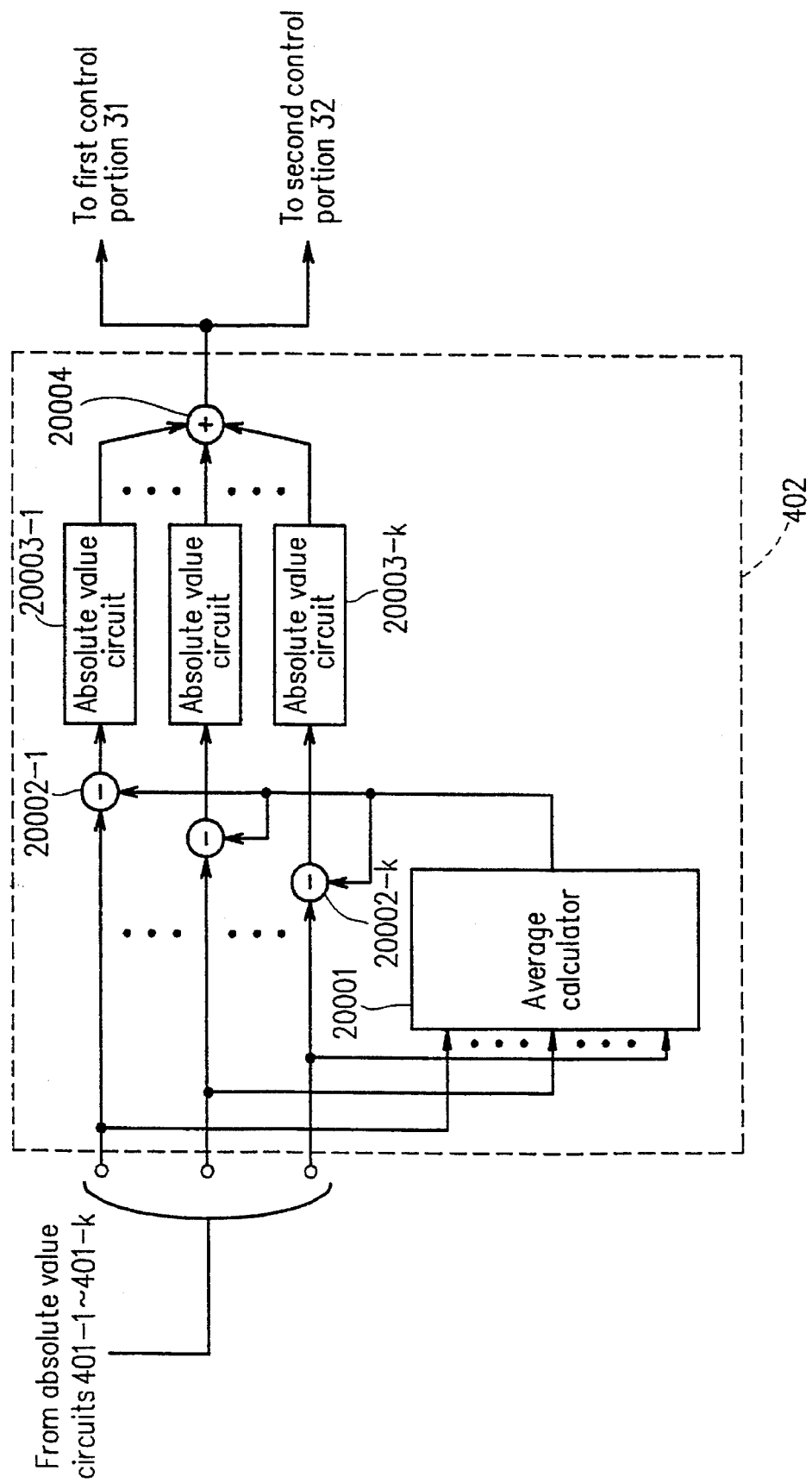
FIG. 14 is a block diagram of a dispersion parameter calculator according to the second example.
Figure 15:
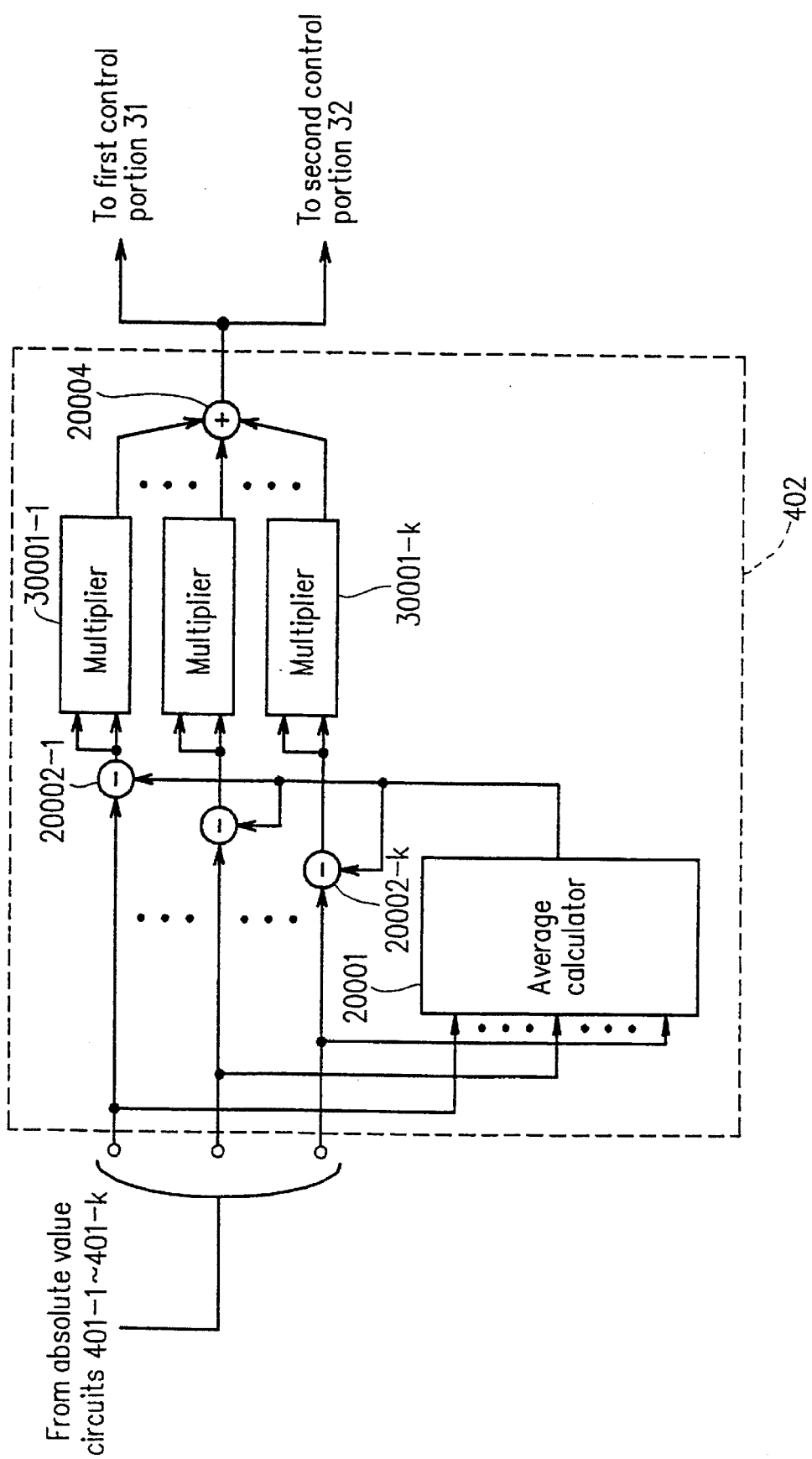
FIG. 15 is a block diagram of another dispersion parameter calculator according to the second example.

One example of the dispersion parameter calculator 402 shown in FIG. 14 includes an average calculator 20001 connected to the absolute value circuits 401-1 to 401-k, k subtracters 20002-1 to 20002-k connected to the absolute value circuits 401-1 to 401-k and the average calculator 20001, k absolute value circuits 20003-1 to 20003-k connected to the k subtracters 20002-1 to 20002-k, and an adder 20004 connected to the absolute value circuits 20003-1 to 20003-k. The average calculator 20001 has the same configuration as the average calculator 302 shown in FIG. 10. The dispersion parameter calculator 402 of FIG. 14 calculates a dispersion parameter $\sigma_1$ expressed by formula (7):

$$\sigma_1 = \sum_{\substack{0 \le i \le n \\ 0 \le j \le m}} ||y_{ij}| - y_{ave}| \quad (7)$$

wherein, $$y_{ave} = \left( \sum_{\substack{0 \le i \le n \\ 0 \le j \le m}} |y_{ij}| \right) / (m \times n) \quad (8)$$

The other example of the dispersion parameter calculator 402 shown in FIG. 15 is different from that shown in FIG. 14 in that multipliers 30001-1 to 30001-k are disposed, in place of the absolute value circuits 20003-1 to 20003-k, so that each of the outputs from the subtracters 20002-1 to 20002-k is multiplied by itself before being input into the adder 20004. The dispersion parameter calculator 402 of FIG. 15 calculates a dispersion parameter $\sigma_2$ expressed by formula (9):

$$\sigma_2 = \sum_{\substack{0 \le i \le n \\ 0 \le j \le m}} (|y_{ij}| - y_{ave})^2 \quad (9)$$

The dispersion parameter $\sigma_2$ corresponds to the power sum of the frame differential signal S15 and is considered to indicate the motion amount more precisely. However, the circuit configuration of the dispersion parameter calculator 402 of FIG. 15 is more complicated than that of FIG. 14.

FIGS. 16A and 16B show the distributions of the absolute values of the orthogonally transformed data $y_{ij}$ (eight components) in the case where the frame differential signal S15 is the motion component signal and the noise component signal, respectively. In FIG. 16A which shows the case of the motion component signal, the output from the orthogonal transformer 14 largely varies with the absolute values $|y_{ij}|$ of certain components being larger than the remaining components. Accordingly, the dispersion parameter is large. In FIG. 16B which shows the case of the noise component signal, the absolute values $|y_{ij}|$ of all the components are substantially the same. Accordingly, since the degree of variation is small, the dispersion parameter is small. As a result, whether the output from the first subtracter 12 is the motion component signal or the noise component signal can be identified by the level of the dispersion parameter.

The operation of the adaptive control portion 20 of the noise reducer of Example 2 will be described.

Referring to FIG. 13, the absolute value circuits 401-1 to 401-k calculate the absolute values of k data $y_{ij}$ output from the orthogonal transformer 14. The dispersion parameter calculator 402 calculates the sum of the absolute values of the deviations of the k absolute values $|y_{ij}|$ from the average (FIG. 14), or the sum of the squares of the deviations of the k absolute values $|y_{ij}|$ from the average (FIG. 15).

The first control portion 31 controls the threshold A for the nonlinear processor 15 based on the output from the dispersion parameter calculator 402. The second control portion 32 controls the feedback coefficient a for the attenuator 181 based on the output from the dispersion parameter calculator 402.

Figure 17:
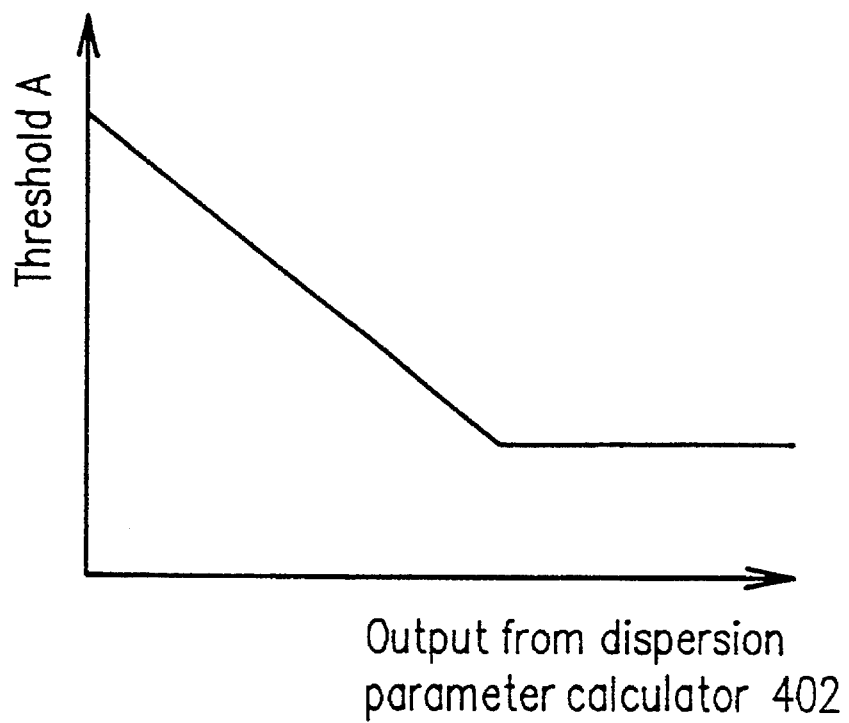
FIG. 17 shows the control characteristic of a first control portions according to the second example.
Figure 18:
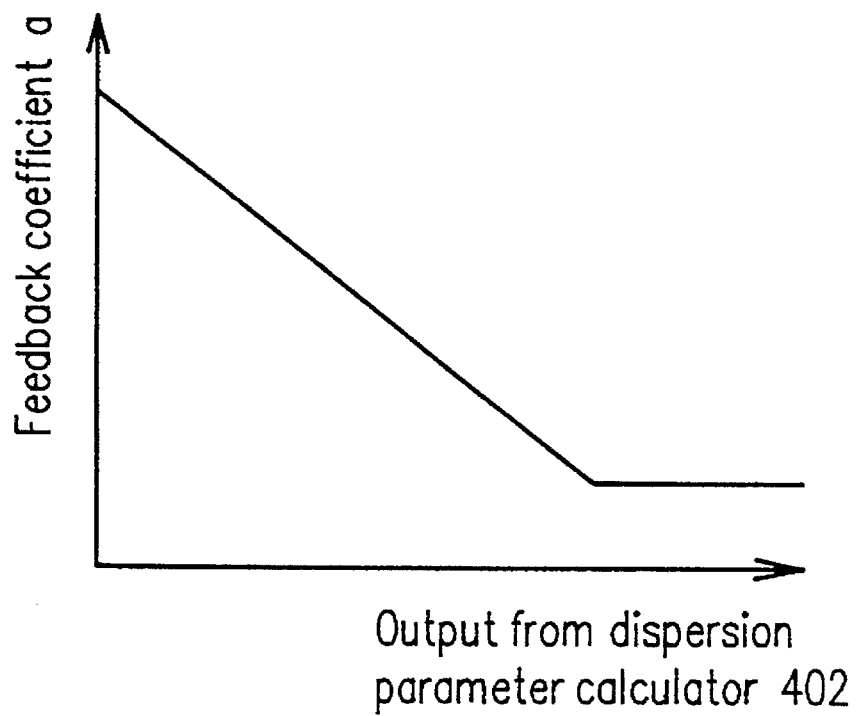
FIG. 18 shows the control characteristic of a second control portion according to the second example.

FIGS. 17 and 18 are examples of the control characteristics of the first and second control portions 31 and 32 in Example 2, respectively. As is apparent from FIGS. 17 and 18, when the output from the dispersion parameter calculator 402 (i.e., the motion amount of the video signal) is large, the first and second control portions 31 and 32 judge the frame differential signal S15 as the motion component and lower the threshold A and the feedback coefficient a so as to reduce the feedback amount of the noise signal S12. By this adjustment, deterioration in the quality of the motion picture portion is prevented. On the contrary, when the output from the dispersion parameter calculator 402 (i.e., the motion amount of the video signal) is small, the first and second control portions 31 and 32 judge the frame differential signal S15 as the noise component and raise the threshold A and the feedback coefficient a so as to increase the feedback amount of the noise signal S12. By this adjustment, noise in the picture portion with small motion and the static picture portion can be effectively reduced.

Thus, according to the noise reducer of this example, where the motion amount determination portion 30 is composed of the absolute value circuits 401-1 to 401-k and the dispersion parameter calculator 402, the deterioration in the quality of the motion picture portion can be prevented, and noise in the static picture portion and the picture portion with small motion can be effectively reduced.

EXAMPLE 3

Figure 19:
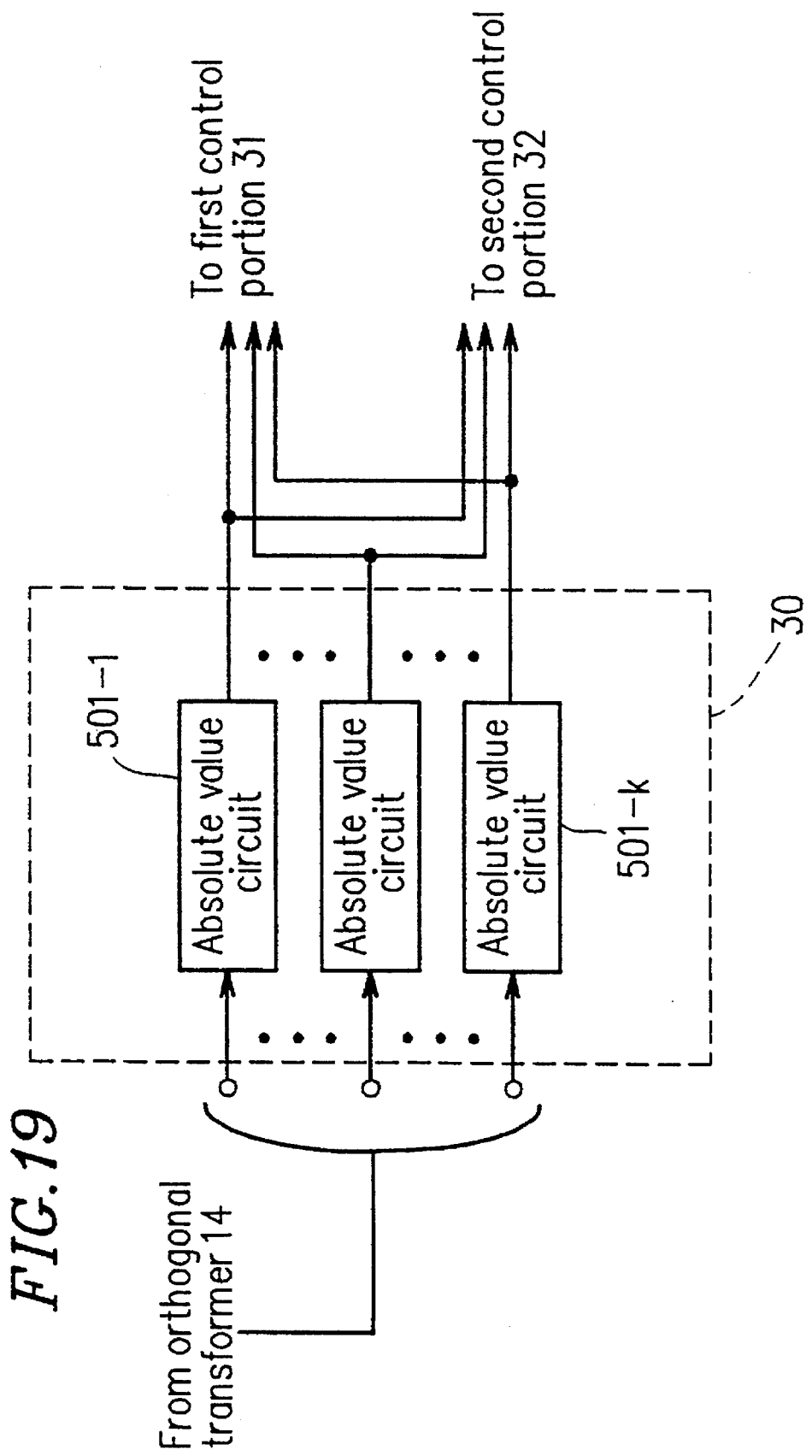
FIG. 19 is a block diagram of a motion amount determination portion of a noise reducer of the third example according to the present invention.

FIG. 19 shows the configuration of the motion amount determination portion 30 of the third example according to the present invention. In Example 3, the absolute value $|y_{ij}|$ of the data $y_{ij}$ output from the orthogonal transformer 14 are used as the motion amount.

Referring to FIG. 19, the motion amount determination portion 30 includes k absolute value circuits 501-1 to 501-k.

When the Hadamard transformation is used for the orthogonal transformation, the Hadamard transformed data $y_{ij}$, $y_{00}$ includes a comparatively large motion component, $y_{02}$ and $y_{03}$ includes a comparatively large horizontal edge component, $y_{10}$ includes a comparatively large vertical edge component, and $y_{12}$ and $y_{13}$ include a comparatively large slant edge component. The absolute values of the six components $|y_{00}|$, $|y_{02}|$, $|y_{03}|$, $|y_{10}|$, $|y_{12}|$, and $|y_{13}|$ among the eight components of the (4×2)th order Hadamard transformed outputs, for example, are used as the motion amount. Herein, as an example, the first control portion 31 controls the threshold A for the nonlinear processor 15 by using the absolute value of the motion component $|y_{00}|$, while the second control portion 32 controls the feedback coefficient a for the attenuator 18 by using the maximum of the absolute values of the edge components $|y_{02}|$, $|y_{03}|$, $|y_{10}|$, $|y_{12}|$, and $|y_{13}|$.

Figure 20:
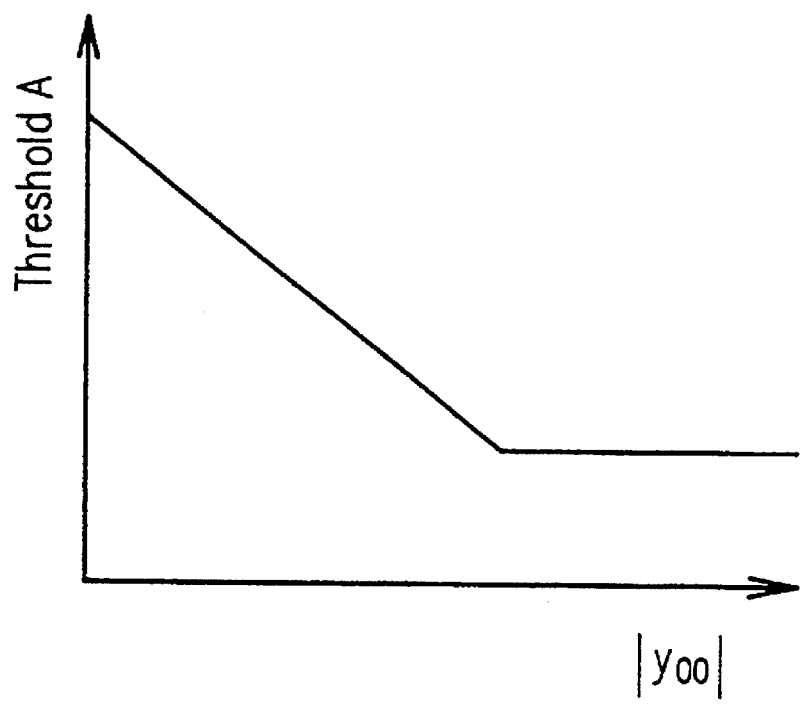
FIG. 20 shows the control characteristic of a first control portion according to the third example.
Figure 21:
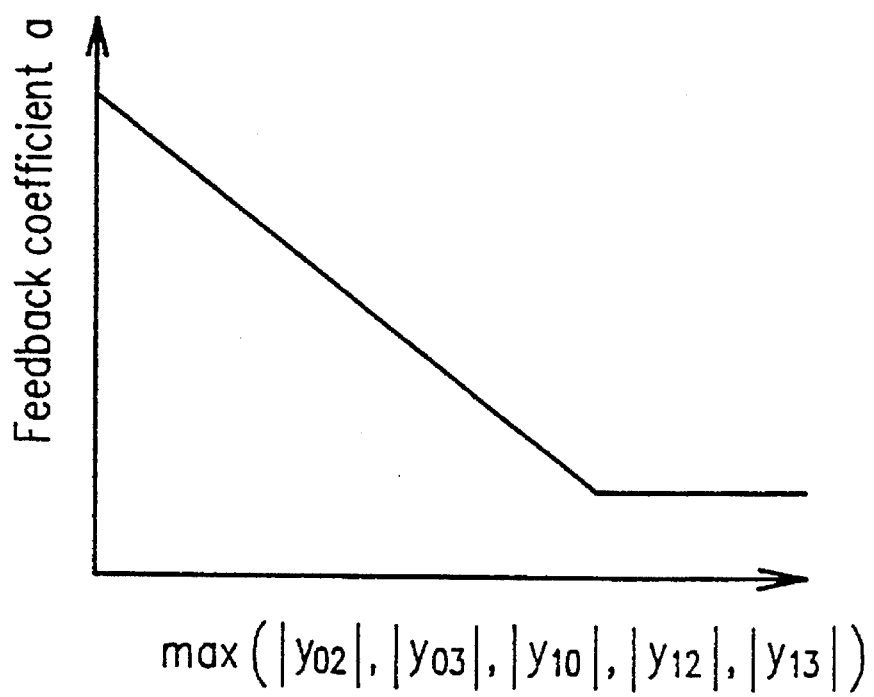
FIG. 21 shows the control characteristic of a second control portion according to the third example.

FIGS. 20 and 21 are examples of the control characteristics of the first and second control portions 31 and 32 in Example 3, respectively. As is apparent from FIGS. 20 and 21, the first control portion 31 lowers the threshold A when $|y_{00}|$ is large, and the second control portion 32 lowers the feedback coefficient a when the maximum of $|y_{02}|$, $|y_{03}|$, $|y_{10}|$, $|y_{12}|$, and $|y_{13}|$ is large, so as to reduce the feedback amount. By this adjustment, deterioration in the quality of the motion picture portion is prevented. On the contrary, when $|y_{00}|$ and the maximum of $|y_{02}|$, $|y_{03}|$, $|y_{10}|$, $|y_{12}|$, and $|y_{13}|$ are small, the threshold A and the feedback coefficient a are raised so as to increase the feedback amount. By this adjustment, noise in the picture portion with small motion and the static picture portion can be effectively reduced.

Thus, according to the noise reducer of this example, where the motion amount determination portion 30 is composed of the absolute value circuits 501-1 to 501-k, the deterioration in the quality of the motion picture portion can be prevented, and noise in the static picture portion and the picture portion with small motion can be effectively reduced. Further, the circuit configuration of the motion amount determination portion 30 of Example 3 can be simpler than those of Examples 1, 2, and 4.

In Example 3, only $|y_{00}|$ was used for the control of the threshold A for the nonlinear processor 15. However, any other Hadamard transformed component other than $y_{00}$ may be used. Alternatively, the maximum of the absolute values of n components (n=natural number equal to or less than 8) among the eight Hadamard transformed components may be used. For the control of the feedback coefficient a for the attenuator 18, the maximum of the absolute values of n components (n=natural number equal to or less than 8) other than six components used in Example 3 among the eight Hadamard transformed components may also be used.

EXAMPLE 4

Figure 22:
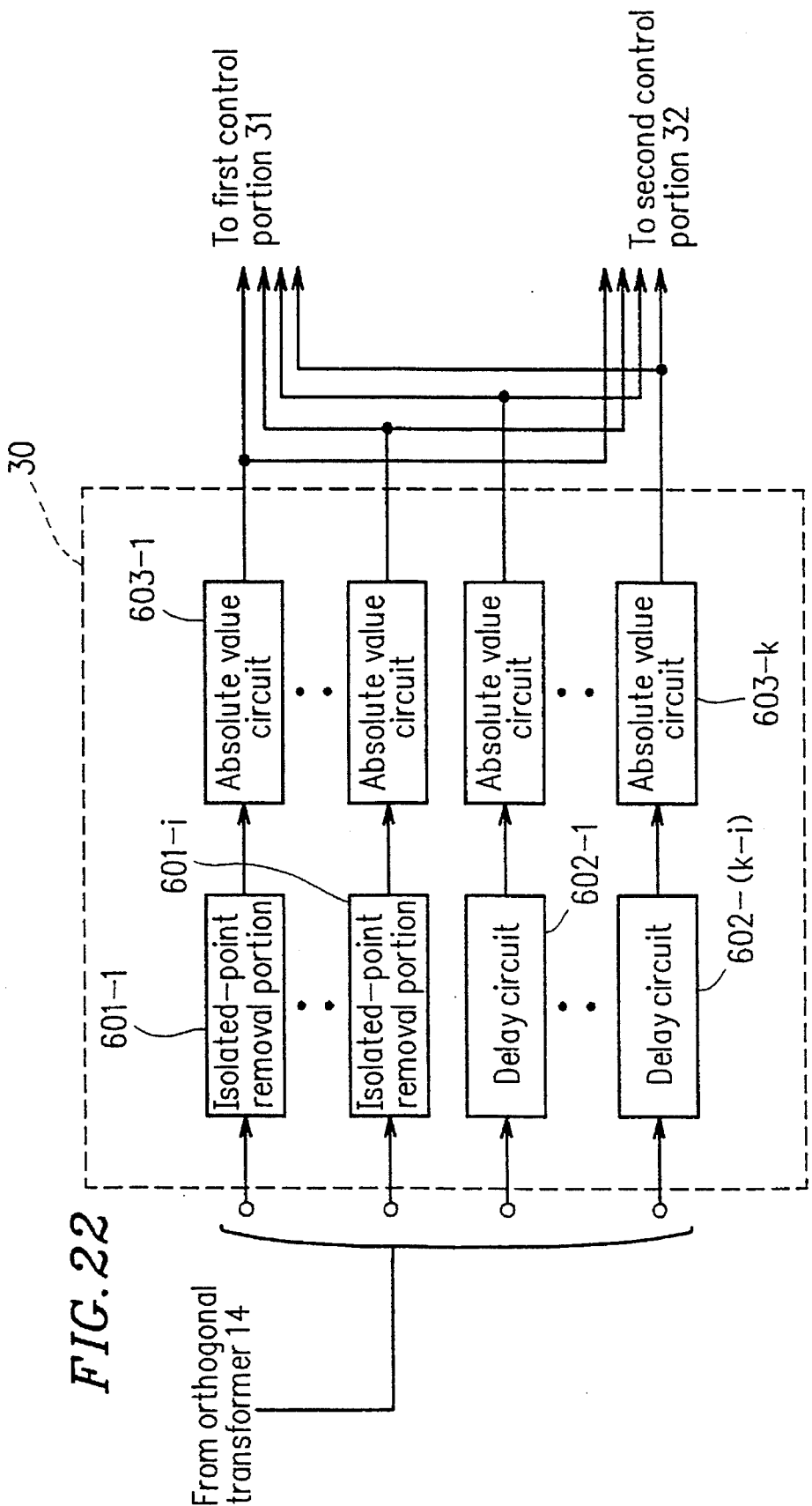
FIG. 22 is a block diagram of a motion amount determination portion of a noise reducer of the fourth example according to the present invention.

FIG. 22 shows the configuration of the motion amount determination portion 30 of the fourth example according to the present invention. In Example 4, the absolute values of the i components (i=natural number less than k) which have been subjected to an operation of removing isolated points (an isolated-point removal) and the absolute values of (k−i) components which have not been subjected to the isolated-point removal are used as the motion amount. In this example, one pixel block is composed of k=m sample(s)×n line(s) is used.

Referring to FIG. 22, the motion amount determination portion 30 includes i isolated-point removal portions 601-1 to 601-i connected to the orthogonal transformer 14, (k−i) delay circuits 602-1 to 602-(k−i) connected to the orthogonal transformer 14, and k absolute value circuits 603-1 to 603-k connected to the isolated-point removal portions 601-1 to 601-i and the delay circuits 602-1 to 602-(k−i). The delay time at the delay circuits 602-1 to 602-(k−i) is the same as the time delayed at the isolated-point removal portions 601-1 to 601-i. Hereinafter, the isolated-point removal portions 601-1 to 601-i are collectively referred to as the isolated-point removal portion 601 unless this causes misunderstanding.

Figure 23:
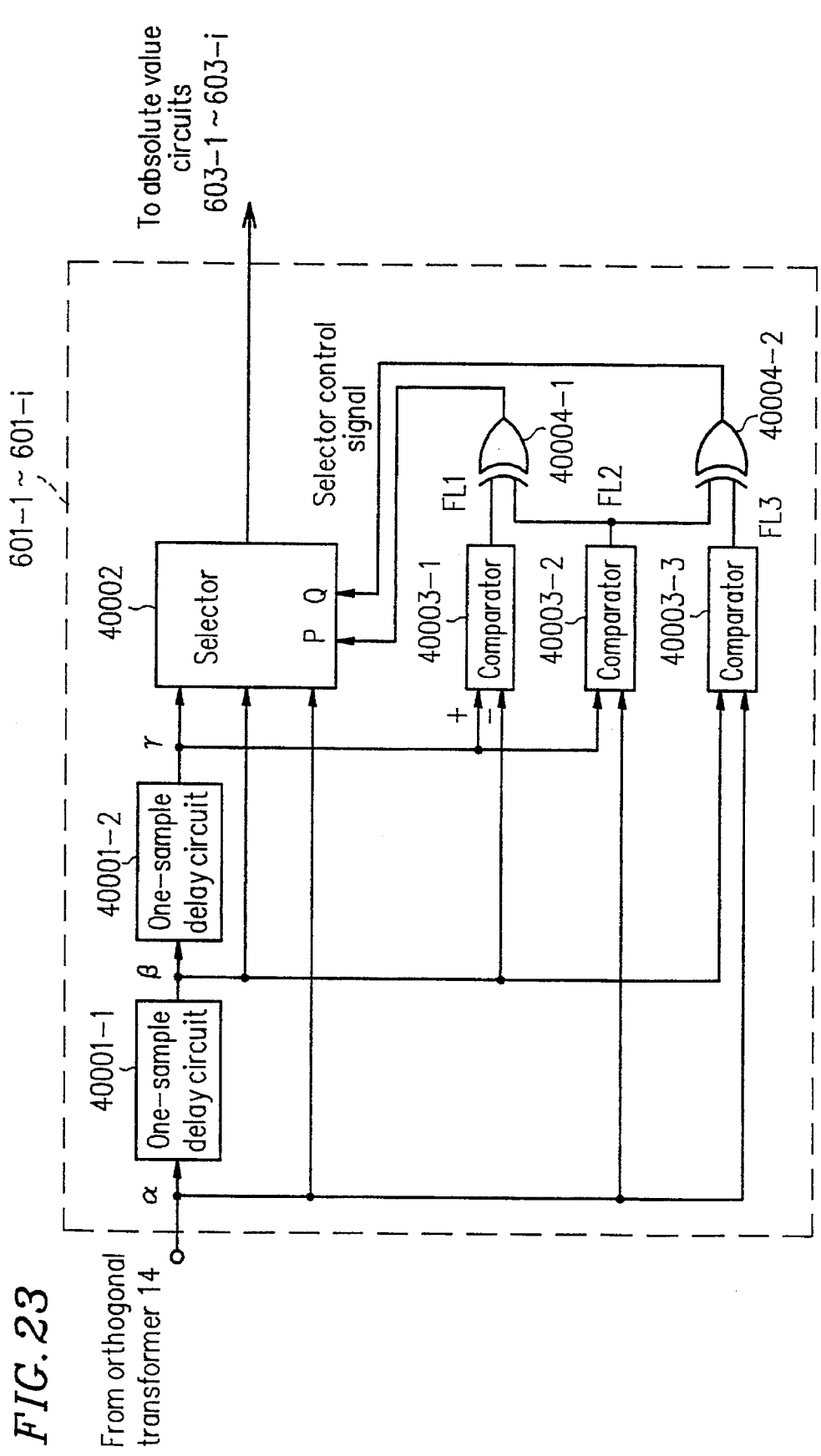
FIG. 23 is a block diagram of an isolated-point removal portion according to the fourth example.
Figure 24:
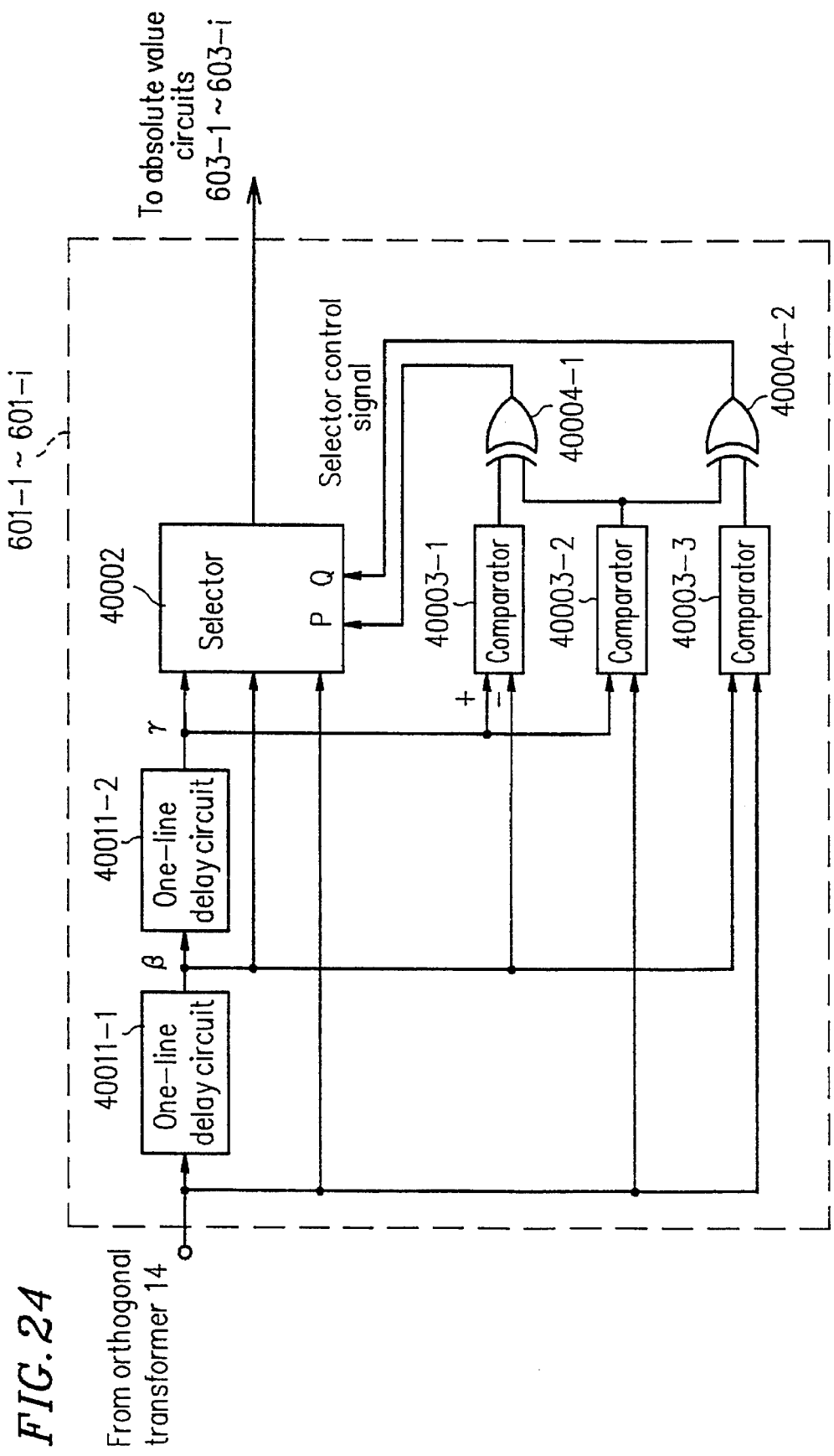
FIG. 24 is a block diagram of another isolated-point removal portion according to the fourth example.
Figure 25:
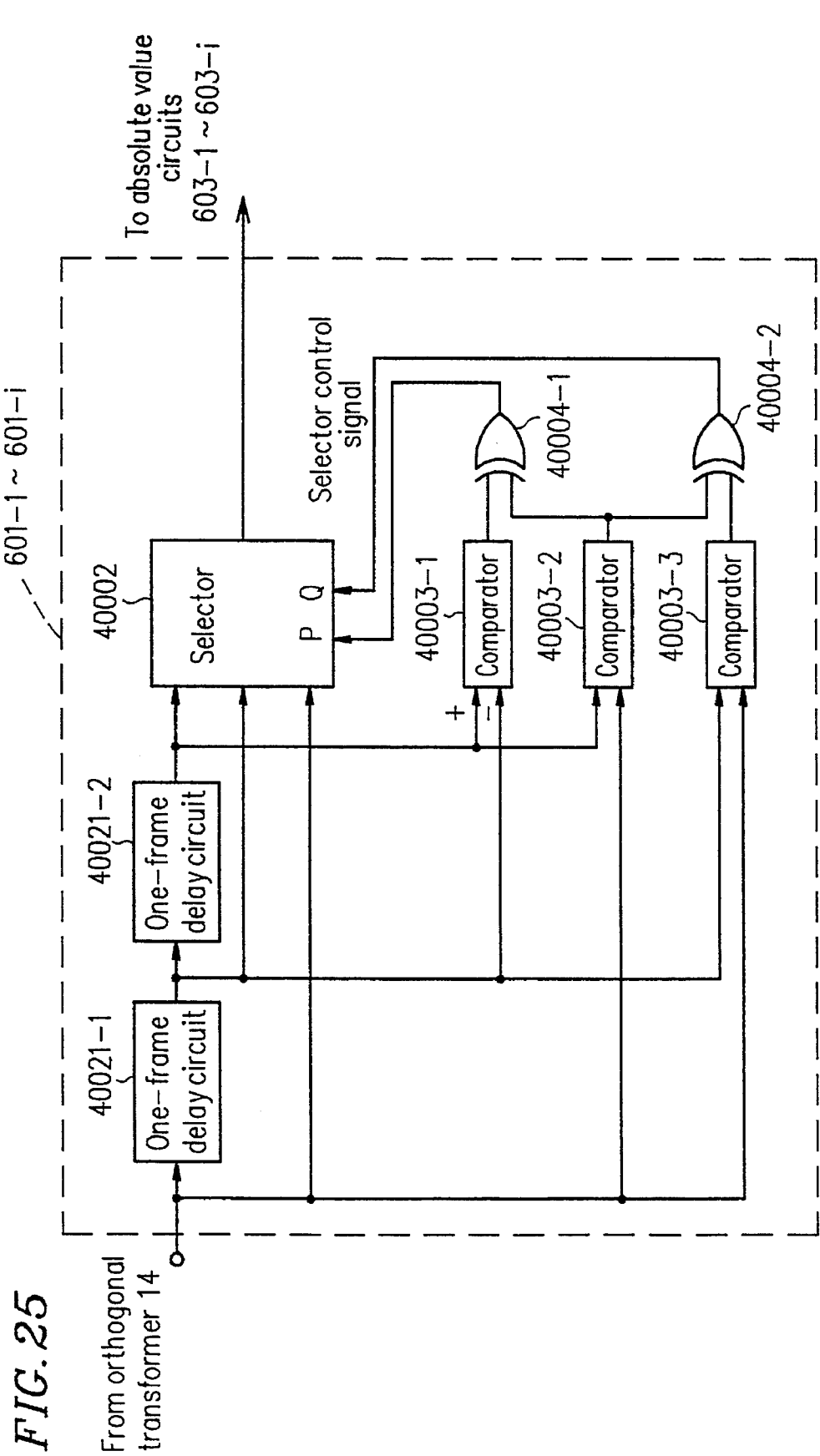
FIG. 25 is a block diagram of yet another isolated-point removal portion according to the fourth example.

FIGS. 23, 24, and 25 show examples of the isolated-point removal portion 601. The isolated-point removal portion 601 shown in FIG. 23 includes a one-sample delay circuit 40001-1 connected to the orthogonal transformer 14, another one-sample delay circuit 40001-2 connected to the one-sample delay circuit 40001-1, and a selector 40002 connected to the orthogonal transformer 14 and the one-sample delay circuits 40001-1 and 40001-2. The isolated-point removal portion 601 further includes a comparator 40003-1 connected to the one-sample delay circuits 40001-1 and 40001-2, another comparator 40003-2 connected to the orthogonal transformer 14 and the one-sample delay circuit 40001-2, yet another comparator 40003-3 connected to the orthogonal transformer 14 and the one-sample delay circuit 40001-1, an exclusive OR (EXOR) gate 40004-1 connected to the comparators 40003-1 and 40003-2 and the selector 40002; and another EXOR gate 40004-2 connected to the comparators 40003-2 and 40003-3 and the selector 40002. The selector 40002 selects one of three inputs based on a control signal P or Q respectively supplied from the EXOR gates 40004-1 and 40004-2 and outputs the selected input. The output of the selector 40002 is connected to the corresponding absolute value circuits 603-1 to 603-k.

The isolated-point removal portion 601 shown in FIG. 24 is different from that of FIG. 23 in that one-line delay circuits 40011-1 and 40011-2 are used in place of the one-sample delay circuits 40001-1 and 40001-2 in FIG. 23.

Likewise, the isolated-point removal portion 601 shown in FIG. 25 is different from that of FIG. 23 in that one-frame delay circuits 40021-1 and 40021-2 are used in place of the one-sample delay circuits 40001-1 and 40001-2 in FIG. 23.

The operation of the adaptive control portion 20 of the noise reducer of Example 4 with the above configuration will be described. In this example, the motion amount is determined by the absolute values of the i components subjected to the isolated-point removal and the absolute values of (k−i) components not subjected to the isolated-point removal. In this example, the case where k=4×2=8 will be described.

First, the isolated-point removal will be described. Removal of an isolated point is performed by selecting a median of the adjacent three sample points. By this operation, it is possible to remove a sample point having an irregular value. In the case of the motion component signal including the edge components, the motion component is retained after the isolated-point removal, since a sample point of the motion component seldom has a singular value. In the case of noise, however, a sample point often has a singular value. Accordingly, such noise having a singular value can be removed by conducting an isolated-point removal. This isolated-point removal makes it possible to prevent such a singular value of a signal generated by noise from being mistaken as a motion component of the signal. As a result, a higher level of distinction between the noise and the motion component can be obtained, compared with the case where no isolated-point removal is conducted (see Example 3).

The three adjacent sample points for the isolated-point removal can be taken in the horizontal direction (samples), in the vertical direction (lines), or along the temporal axis (frames). The examples of the isolated-point removal portion 601 shown in FIGS. 23 to 25 respectively correspond to the horizontal direction, the vertical direction, and the temporal axis, respectively. The isolated-point removal will be described as follows using the isolated-point removal portion 601 of FIG. 23.

The component $y_{00}$ among the Hadamard transformed data $y_{00}$ to $y_{03}$ and $y_{10}$ to $y_{13}$ output from the orthogonal transformer 14 is isolated-point removed by the isolated-point removal portion 601-1. Referring to FIG. 23, the operation at the isolated-point removal portion 601-1 will be described. In the description, the present value of $y_{00}$ is denoted by $\alpha$, the value of $y_{00}$ one sample behind is denoted by $\beta$, and the value of $y_{00}$ two samples behind is denoted by $\gamma$. The comparators 40003-1, 40003-2, and 40003-3 output a flag 1 when the result of the subtraction between two inputs is positive or zero, and output a flag 0 when it is negative. The outputs from the comparators 40003-1, 40003-2, and 40003-3 are referred to as FL1, FL2, and FL3, respectively. The EXOR gate 40004-1 calculates the exclusive OR of FL1 and FL2, while the EXOR gate 40004-2 calculates the exclusive OR of FL2 and FL3. The outputs P and Q from the EXOR gates 40004-1 and 40004-2 are used as a control signal for the selector 40002. Table 1 shows the values of FL1, FL2, and FL3, the values of the selector control signals P and Q, and the value ($\alpha$, $\beta$, or $\gamma$) output from the selector 40002 in response to the selector control signals P and Q for six cases of the relationships among $\alpha$, $\beta$, and $\gamma$. The selector 40002 is set so that $\beta$ is output when P=0 and Q=0, $\alpha$ is output when P=0 and Q=1, and $\gamma$ is output when P=1 and Q=0.

TABLE 1

| Case | FL1 | FL2 | FL3 | P | Q | Selector output |
| --- | --- | --- | --- | --- | --- | --- |
| $\alpha > \beta > \gamma$ | 0 | 0 | 0 | 0 | 0 | $\beta$ |
| $\gamma > \beta > \alpha$ | 1 | 1 | 1 |   |   |   |
| $\beta > \alpha > \gamma$ | 0 | 0 | 1 | 0 | 1 | $\alpha$ |
| $\gamma > \alpha > \beta$ | 1 | 1 | 0 |   |   |   |
| $\alpha > \gamma > \beta$ | 1 | 0 | 0 | 1 | 0 | $\gamma$ |
| $\beta > \gamma > \alpha$ | 0 | 1 | 1 |   |   |   |

Then, the absolute value of the $y_{00}$ subjected to the isolated-point removal (hereinafter, referred to as $y_{00}$med) is calculated by the absolute value circuit 603-1. For the other seven components among the Hadamard transformed data other than the component $y_{00}$ which have not been subjected to the isolated-point removal, the absolute values are calculated by the absolute value circuits 603-2 to 603-8.

In this example, as in Example 3, six components $|y_{00}|$, $|y_{02}|$, $|y_{03}|$, $|y_{10}|$, $|y_{12}|$, and $|y_{13}|$ among the eight components of the (4×2)th order Hadamard transformed outputs, for example, are used for calculating the motion amount. Herein, as an example, the first control portion 31 controls the threshold A for the nonlinear processor 15 based on the absolute value $|y_{00}\text{med}|$, while the second control portion 32 controls the feedback coefficient a for the attenuator 18 by using the maximum of the components $|y_{02}|$, $|y_{03}|$, $|y_{10}|$, $|y_{12}|$, and $|y_{13}|$.

Figure 26:
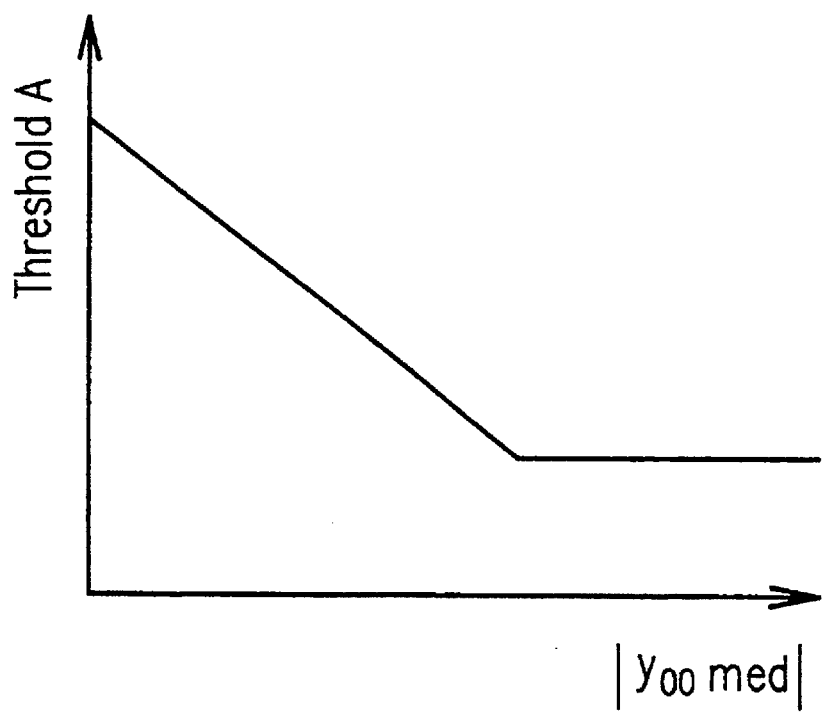
FIG. 26 shows the control characteristic of a first control portion according to the fourth example.
Figure 27:
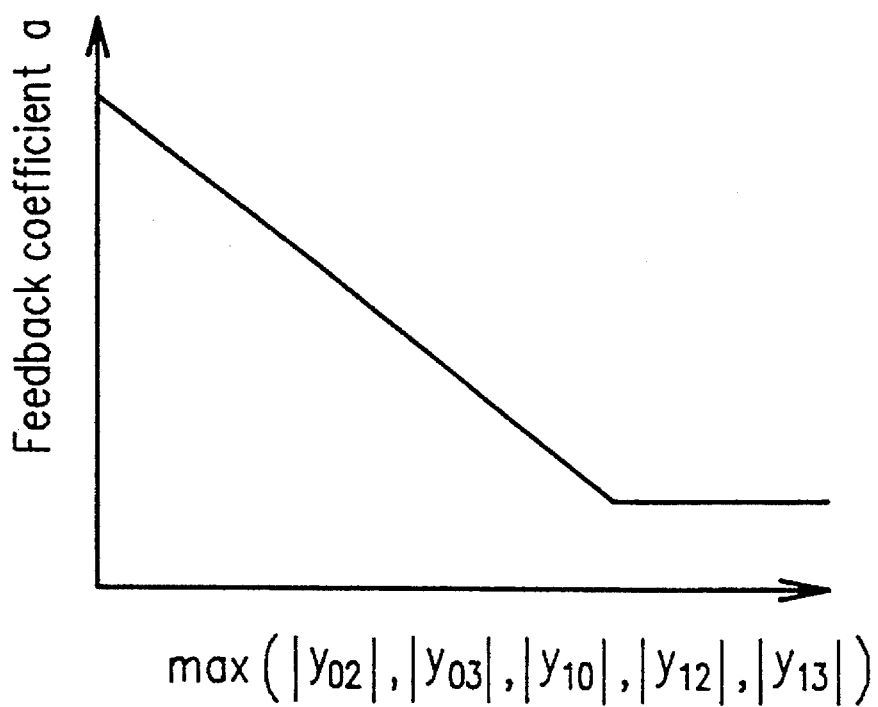
FIG. 27 shows the control characteristic of a second control portion according to the fourth example.

FIGS. 26 and 27 are examples of the control characteristics of the first and second control portions 31 and 32 in Example 4, respectively. As is apparent from FIGS. 26 and 27, the first control portion 31 lowers the threshold A when $|y_{00}\text{med}|$ is large, and the second control portion 32 lowers the feedback coefficient a when the maximum of $|y_{02}|$, $|y_{03}|$, $|y_{10}|$, $|y_{12}|$, and $|y_{13}|$ is large, so as to reduce the feedback amount. By this adjustment, deterioration in the quality of the motion picture portion is prevented. On the contrary, when $|y_{00}\text{med}|$ and the maximum of $|y_{02}|$, $|y_{03}|$, $|y_{10}|$, $|y_{12}|$, and $|y_{13}|$ are small, the threshold A and the feedback coefficient a are made large so as to increase the feedback amount. By this adjustment, noise in the picture portion with small motion and the static picture portion can be effectively reduced.

Thus, according to the noise reducer of this example, where the motion amount determination portion 30 is composed of the isolated-point removal portions 601-1 to 601-i, the delay circuits 602-1 to 602-(k–i), and the absolute value circuits 603-1 to 603-k, noise having a singular value of a sample point will not be mistaken as the motion component. As a result, deterioration in the quality of the motion picture portion can be prevented, and noise in the still picture portion and the picture portion with small motion can be effectively reduced.

In Example 4, only $|y_{00}\text{med}|$ was used for the control of the threshold A for the nonlinear processor 15. Any one of the Hadamard transformed components $y_{ij}$ other than the component $y_{00}$ may also be used for the isolated-point removal. Alternatively, n components (n=natural number equal to or less than 8) among the eight Hadamard transformed components may be subjected to isolated-point removal so as to use the maximum of the absolutes of the n components. For the control of the feedback coefficient a for the attenuator 18, n components (n=natural number equal to or less than 8) other than the six components used in this example among the eight Hadamard transformed components may be subjected to the isolated-point removal so as to use the maximum of the absolutes of the components.

The control of the threshold A and the feedback coefficient a is also possible by combining some characteristics of the Hadamard transformed components. For example, for the control of the threshold A, the component $y_{00}$ which tends to have a large motion component may be used to obtain the motion amount by conducting the isolated-point removal and calculating the absolute value as described above. For the feedback coefficient a, on the other hand, a horizontal edge and a vertical edge are detected by using the horizontal edge components $y_{01}$, $y_{02}$, and $y_{03}$, respectively, so as to obtain an edge component for the signal. The feedback coefficient a can be controlled by the edge components.

In Example 4, the motion amount determination portion 30 with the isolated-point removal portion 601 of FIG. 23 was described. Similar results will be obtained by using the isolated-point removal portion 601 of FIG. 24 or 25 where the direction of the adjacent sample points taken for the isolated-point removal is different. These examples of the isolated-point removal portion 601 may be combined so as to effect the isolated-point removal in a plurality of directions.

EXAMPLE 5

Figure 28:
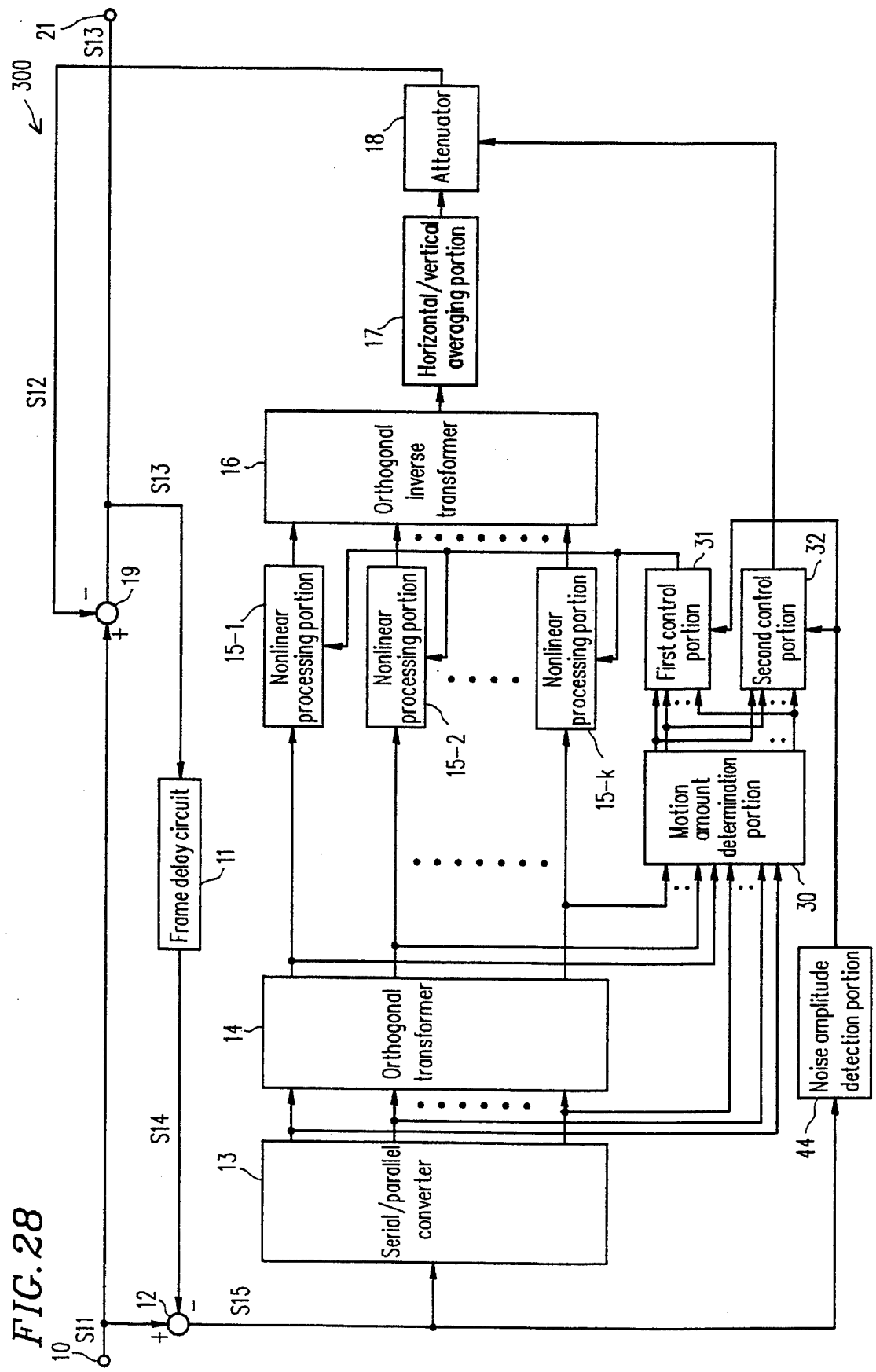
FIG. 28 is a block diagram of a motion amount determination portion of a noise reducer of the fifth example according to the present invention.

FIG. 28 shows a noise reducer 300 of the fifth example according to the present invention. In FIG. 28, components having the same configuration and the operation as those of the noise reducer 200 of FIG. 2 are denoted by the same reference numerals. The configuration of the motion amount determination portion 30 may be that shown in any of Examples 1 to 4. The noise reducer 300 of this example additionally includes a noise amplitude detection portion 44. The noise amplitude detection portion 44 detects the amplitude of noise included in the frame differential signal S15 and outputs a detection signal. This detection signal is used as a parameter for controlling the first and second control portions 31 and 32 together with the output from the motion amount determination portion 30.

Figure 29:
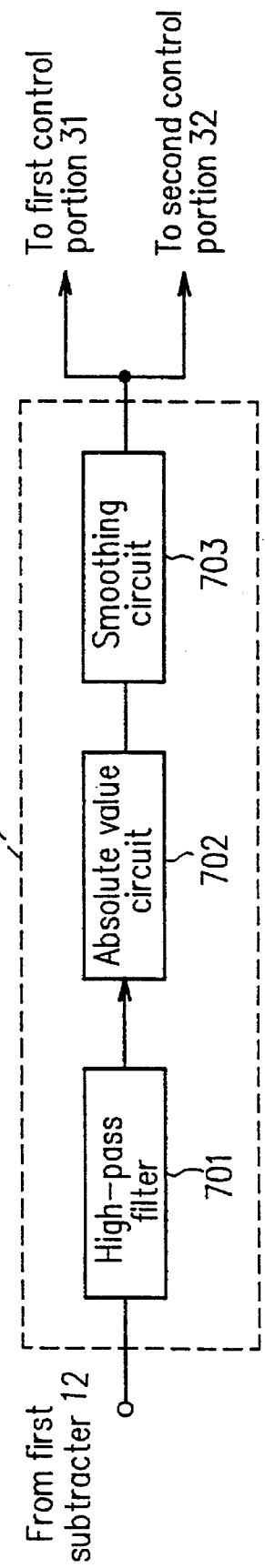
FIG. 29 is a block diagram of a noise amplitude detection portion according to the fifth example.

As shown in FIG. 28, the noise amplitude detection portion 44 is connected to the first subtracter 12, the first control portion 31, and the second control portion 32. FIG. 29 shows the configuration of the noise amplitude detection portion 44. Referring to FIG. 29, the noise amplitude detection portion 44 includes a high-pass filter 701 connected to the first subtracter 12, an absolute value circuit 702 connected to the high-pass filter 701, and a smoothing circuit 703 connected to the absolute value circuit 702. The output of the smoothing circuit 703 is connected to the first and second control portions 31 and 32. The smoothing circuit 703 can be implemented with a low-pass filter, for example.

The operation of the noise reducer 300 of Example 5 will be described. The operations of the components of the noise reducer 300 other than the noise amplitude detection portion 44, the first control portion 31, and the second control portion 32 are the same as those of the noise reducer 200 described in the above examples.

Figure 30A:
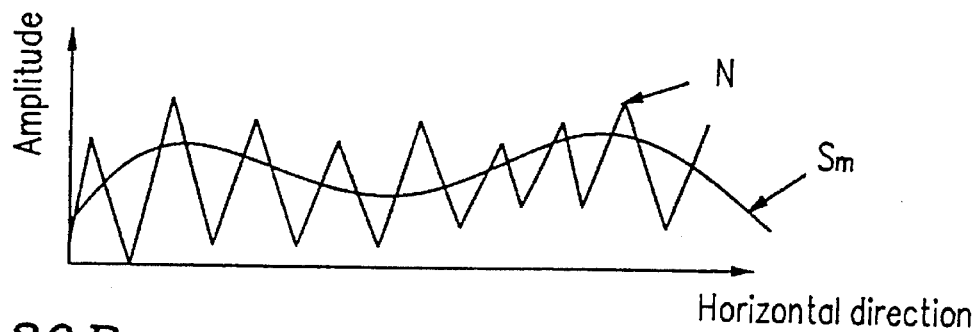
FIGS. 30A to 30D show waveforms of a signal processed by the noise amplitude detection portion according to the fifth example.
Figure 30B:
Figure 30C:
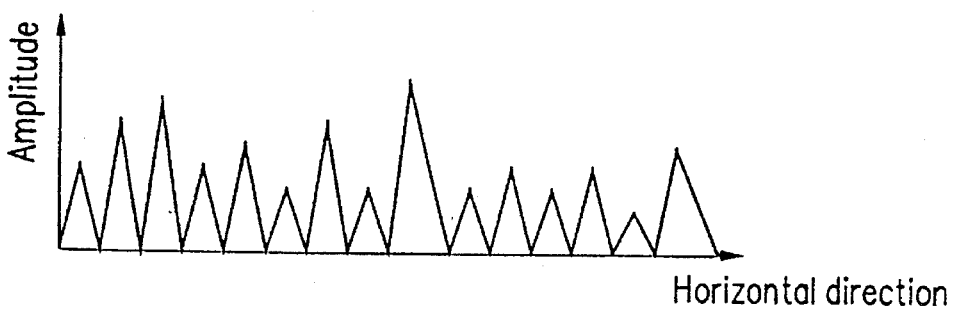
Figure 30D:
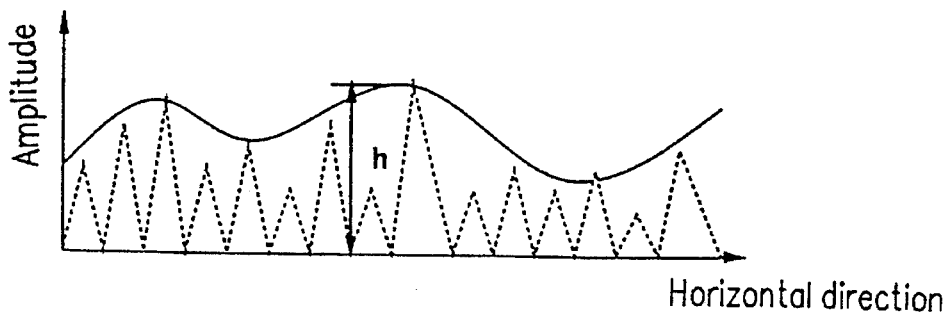

Referring to FIGS. 29 and 30A to 30D, the operation of the noise amplitude detection portion 44 will be first described. FIGS. 30A to 30D show waveforms of a signal to be processed by the noise amplitude detection portion 44 of FIG. 29. First, the high-pass filter 701 of the noise amplitude detection portion 44 extracts a high-frequency noise component from the output from the first subtracter 12 (i.e., the frame differential signal S15). As shown in FIG. 30A, a motion component $S_m$ included in the frame differential signal S15 generally varies slowly, while a noise component N varies abruptly. Accordingly, it is possible to extract only the noise component N by high-pass filtering (see FIG. 30B). The absolute value circuit 702 calculates the absolute value of the noise component N extracted by the high-pass filter 701 (see FIG. 30C). The output from the absolute value circuit 702 is then passed through the smoothing circuit 703 so as to obtain a signal with a waveform as shown in FIG. 30D. The output signal from the smoothing circuit 703 is an output of the noise amplitude detection portion 44 having an amplitude value of h.

Figure 31:
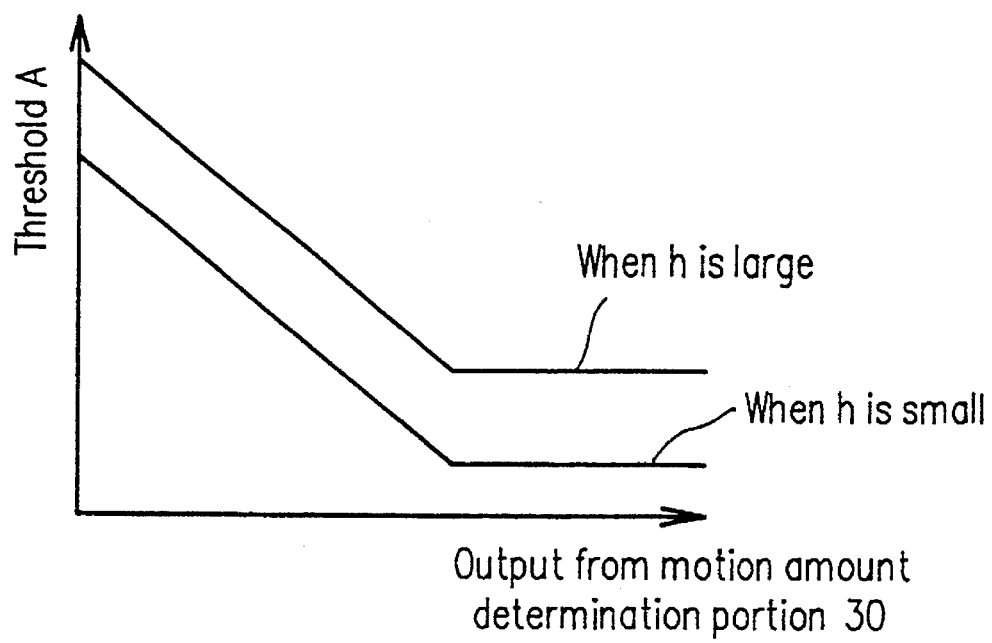
FIG. 31 shows the control characteristics of a first control portion according to the fifth example.
Figure 32:
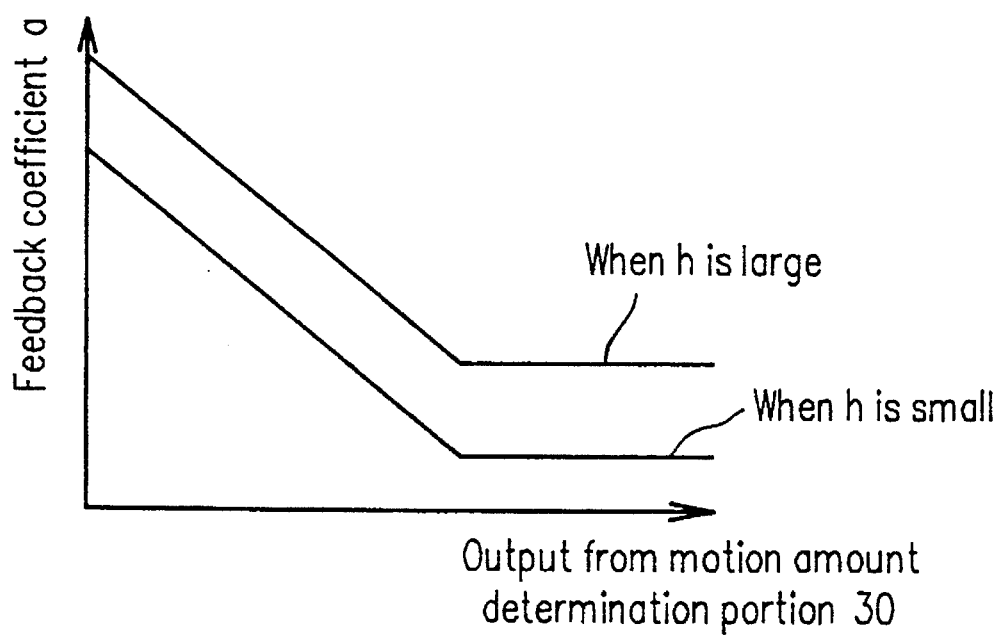
FIG. 32 shows the control characteristics of a second control portion according to the fifth example.

FIGS. 31 and 32 show examples of the control characteristics of the first and second control portions 31 and 32 in Example 5, respectively. In the first and second control portions 31 and 32, when the noise amplitude detection value h is large, the respective characteristic curves are shifted to raise the threshold A and the feedback coefficient a, so as to increase the feedback amount of the noise signal S12. Thus, the noise reduction effect enhances. On the contrary, when the noise amplitude detection value h is small, the respective characteristic curves are shifted to lower the threshold A and the feedback coefficient a, so as to reduce the feedback amount of the noise signal S12. Thus, the noise reduction effect lowers. In this way, the feedback amount of the noise signal S12 is adjusted according to the amplitude of the noise included in the input video signal S11.

As described above, according to the noise reducer 300 of this example, where the noise amplitude detection portion 44 is additionally provided, the feedback amount is adjusted according to the amplitude of the noise included in the input video signal, in addition to the adaptive control described in Example 1 to 4. By this adjustment, the deterioration in the quality of the motion picture portion can be prevented, and noise in the still picture portion and the picture portion with small motion can be reduced more effectively.

EXAMPLE 6

Figure 33:
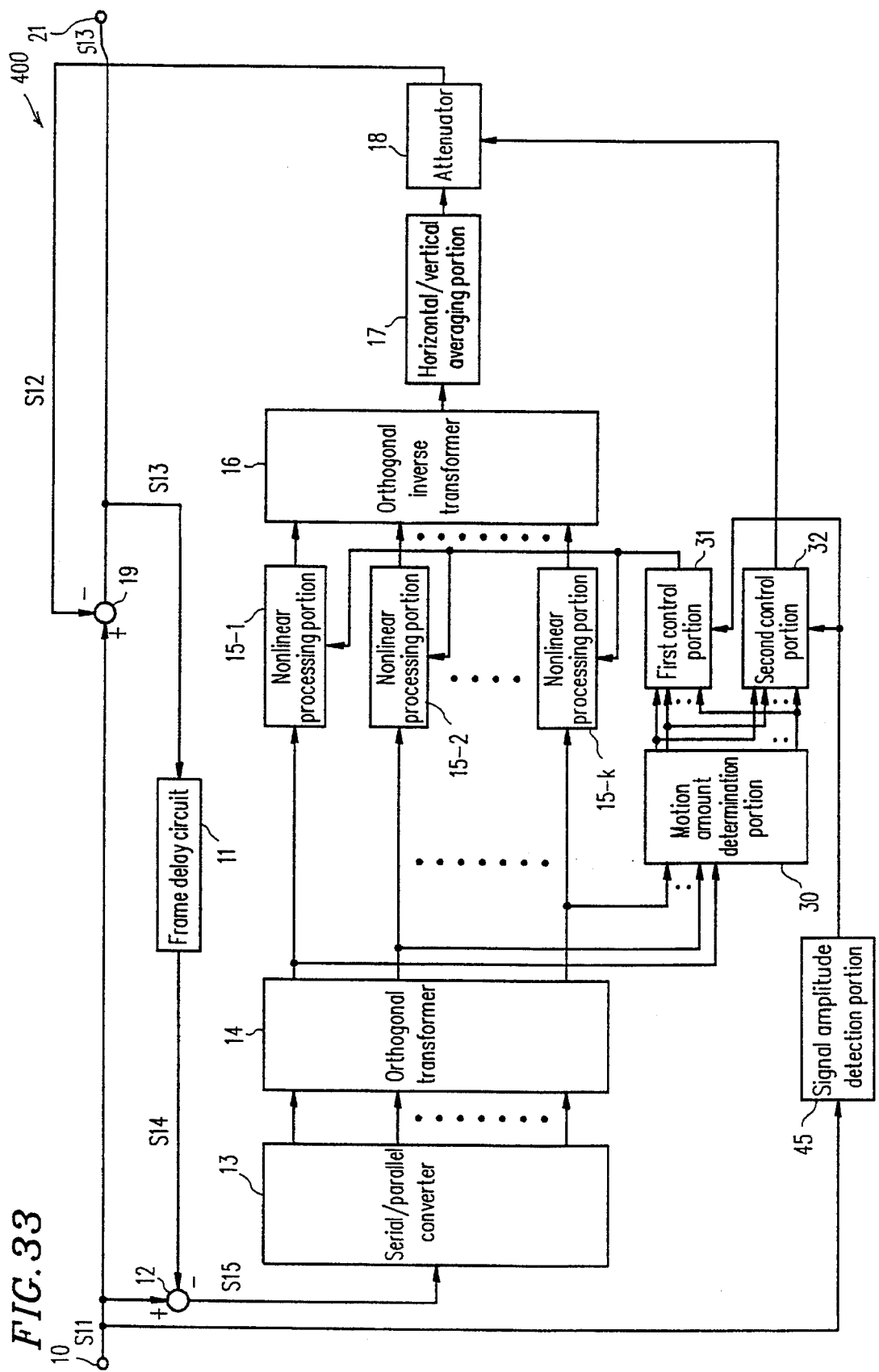
FIG. 33 is a block diagram of a motion amount determination portion of a noise reducer of the sixth example according to the present invention.

FIG. 33 shows a noise reducer 400 of the sixth example according to the present invention. In FIG. 33, components having the same configuration and the operation as those of the noise reducer 200 of FIG. 2 are denoted by the same reference numerals. In this example, as in Example 5, the configuration of the motion amount determination portion 30 may be that shown in any of Examples 1 to 4. The noise reducer 400 of this example additionally includes a signal amplitude detection portion 45. The signal amplitude detection portion 45 detects the amplitude of the input video signal S11, and outputs a detection signal. This detection signal is used as a parameter for controlling the first and second control portions 31 and 32 together with the output from the motion amount determination portion 30.

Figure 34:
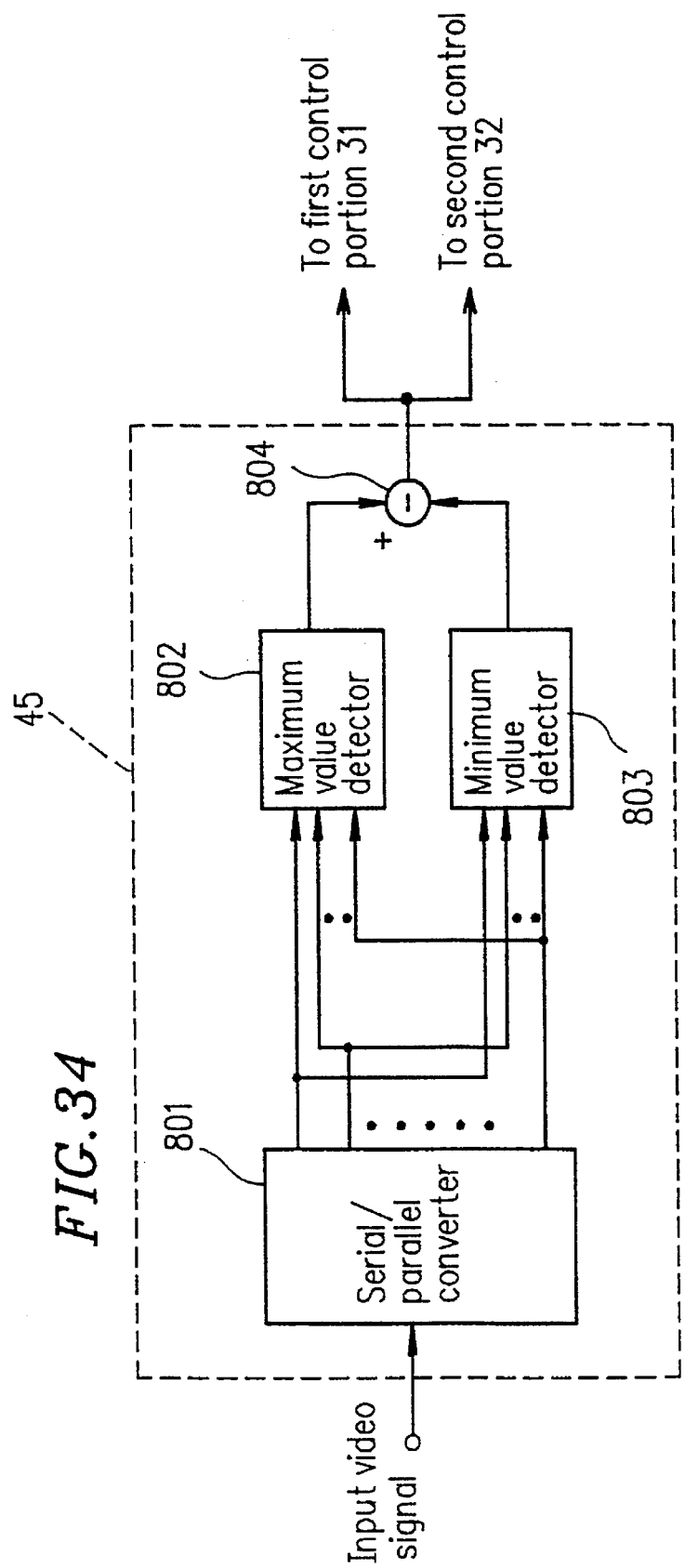
FIG. 34 is a block diagram of a signal amplitude detection portion according to the sixth example.

As shown in FIG. 33, the signal amplitude detection portion 45 is connected to the input terminal 10, the first control portion 31, and the second control portion 32. FIG. 34 shows the configuration of the signal amplitude detection portion 45. Referring to FIG. 34, the signal amplitude detection portion 45 includes a serial/parallel converter 801 connected to the input terminal 10, a maximum value detector 802 and a minimum value detector 803 connected to the serial/parallel converter 801, and a subtracter 804 connected to the maximum value detector 802 and the minimum value detector 803. The output of the subtracter 804 is connected to the first and second control portions 31 and 32. The configuration of the serial/parallel converter 801 is the same as that of the serial/parallel converter 13 shown in FIG. 3.

The operation of the noise reducer 400 of Example 6 will be described. The operations of the components of the noise reducer 400 other than the signal amplitude detection portion 45, the first control portion 31, and the second control portion 32 are the same as those of the noise reducer 200 described in Examples 1 to 4.

Referring to FIG. 34, the operation of the signal amplitude detection portion 45 will be described. The serial/parallel converter 801 converts the input video signal S11 into temporally parallel data of a pixel block. The maximum value detector 802 detects the maximum value of the data of the pixel block, while the minimum value detector 803 detects the minimum value of the data of the pixel block. The subtracter 804 subtracts the output from the minimum value detector 803 from the output from the maximum value detector 802. The output from the subtracter 804 which indicates the amplitude value of the input video signal S11 is supplied to the first control portion 31 and the second control portion 32. This amplitude value represents a characteristic of the pattern of the picture displayed by the input video signal S11. For example, in the case where the input video signal S11 is a luminance signal, a large amplitude value indicates that a pattern with a great variation in the luminance (a gravel road, for example) is displayed, while a small amplitude value indicates that a smooth pattern with a small variation in the luminance (a water surface, for example) is displayed.

Figure 35:
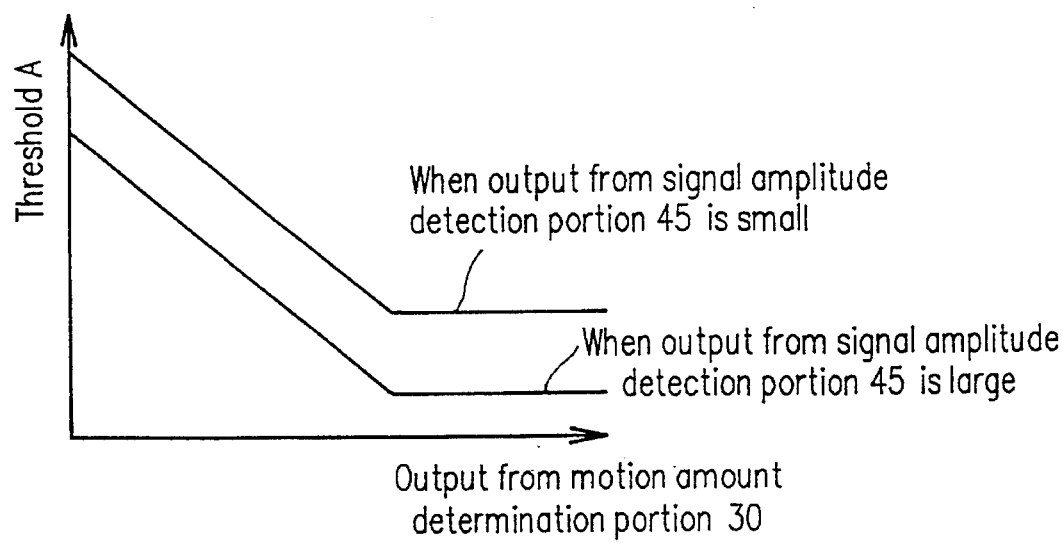
FIG. 35 shows the control characteristics of a first control portion according to the sixth example.
Figure 36:
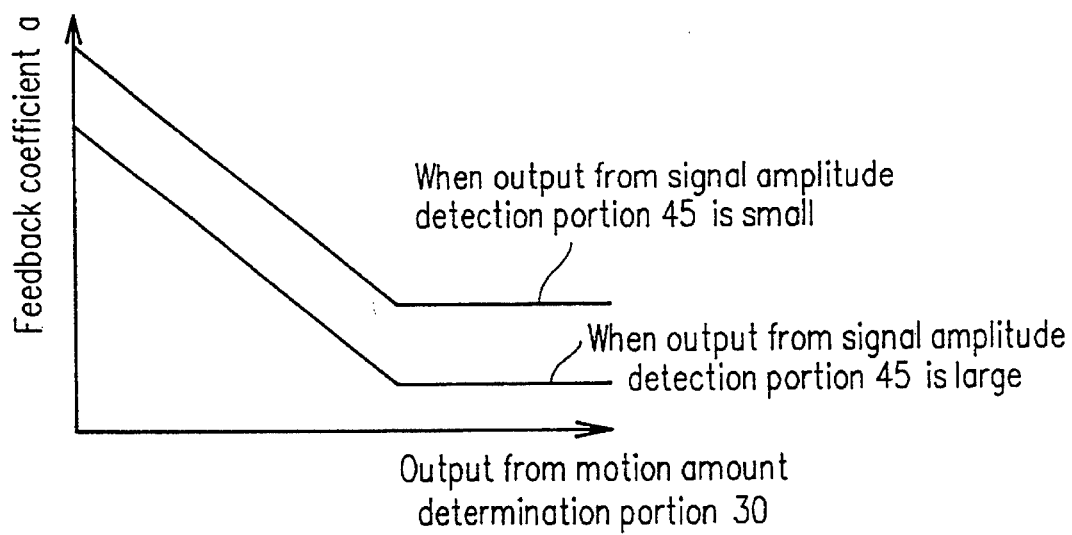
FIG. 36 shows the control characteristics of a second control portion according to the sixth example.

FIGS. 35 and 36 are examples of the control characteristics of the first and second control portions 31 and 32 in Example 6, respectively. When the output from the signal amplitude detection portion 45 is large, the first and second control portions 31 and 32 judge that an image of a largely varying pattern (fine pattern) is displayed, and shift the respective characteristic curves to lower the threshold A and the feedback coefficient a, so as to reduce the feedback amount of the noise signal S12. Thus, deterioration in the quality of an image with a fine pattern is suppressed. On the contrary, when the output from the signal amplitude detection portion 45 is small, the first and second control portions 31 and 32 judge that an image with a smooth pattern is displayed, and shift the respective characteristic curves to raise the threshold A and the feedback coefficient a, so as to increase the feedback amount of the noise signal S12. Thus, the noise reduction effect is enhanced. In this way, the feedback amount of the noise signal S12 is adjusted according to the characteristic of the pattern of the image displayed.

As described above, according to the noise reducer 400 of this example, where the signal amplitude detection portion 45 is additionally provided, the feedback amount is adjusted according to the pattern of the input video signal, in addition to the adaptive control described in Examples 1 to 4. This adjustment makes it possible to prevent deterioration in the quality of an image with a fine pattern having a great variation in the motion picture portion, while reducing noise in the still picture portion and the picture portion with small motion more effectively.

EXAMPLE 7

Figure 37:
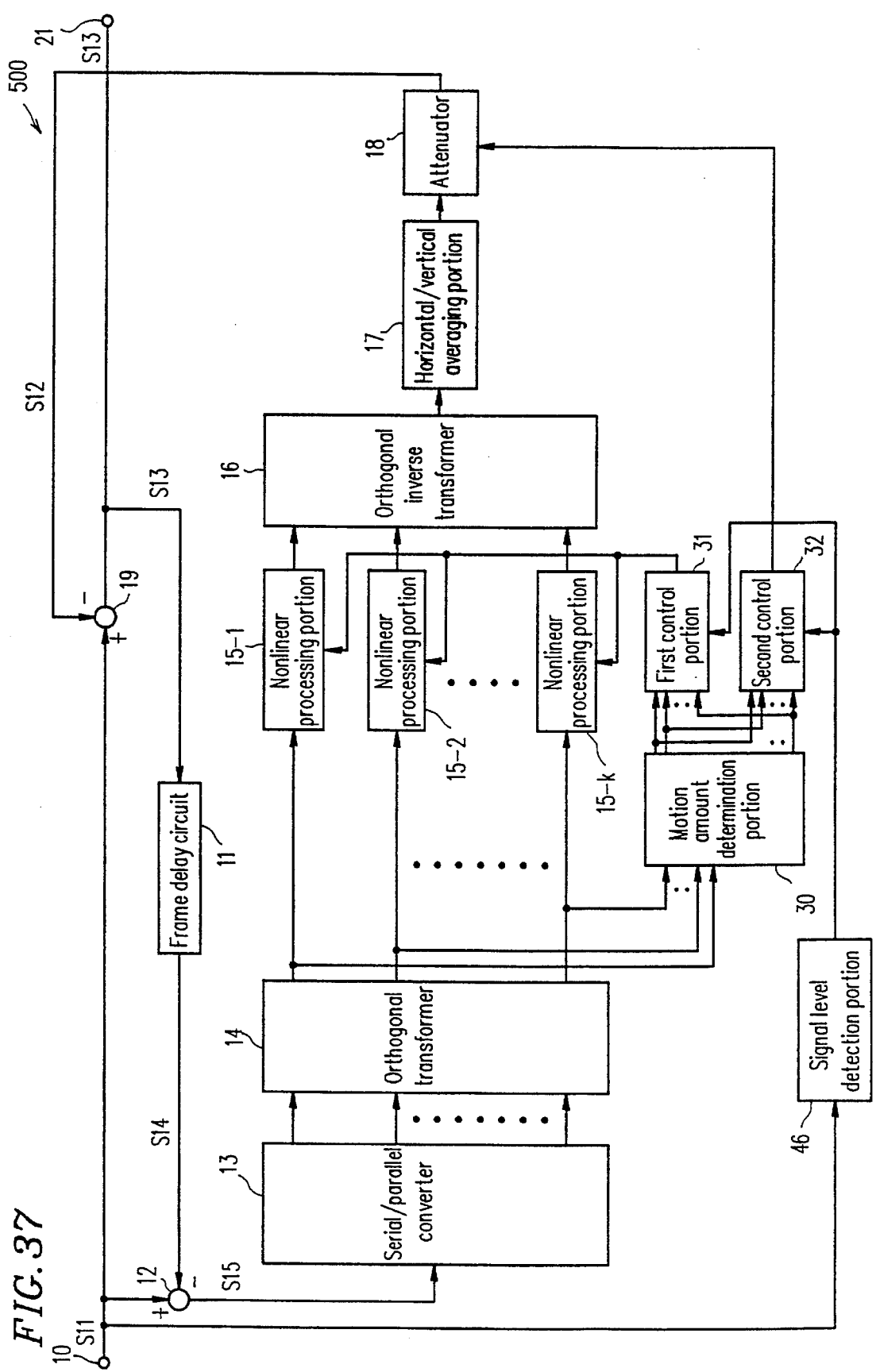
FIG. 37 is a block diagram of a motion amount determination portion of a noise reducer of the seventh example according to the present invention.

FIG. 37 shows a noise reducer 500 of the seventh example according to the present invention. In FIG. 37, components having the same configuration and operation as those of the noise reducer 200 of FIG. 2 are denoted by the same reference numerals. In this example, as in Examples 5 and 6, the configuration of the motion amount determination portion 30 may be that shown in any of Examples 1 to 4. The noise reducer 500 of this example additionally includes a signal level detection portion 46. The signal level detection portion 46 detects the level of the input video signal S11, and outputs a detection signal. This detection signal is used as a parameter for controlling the first and second control portions 31 and 32 together with the output from the motion amount determination portion 30.

Figure 38:
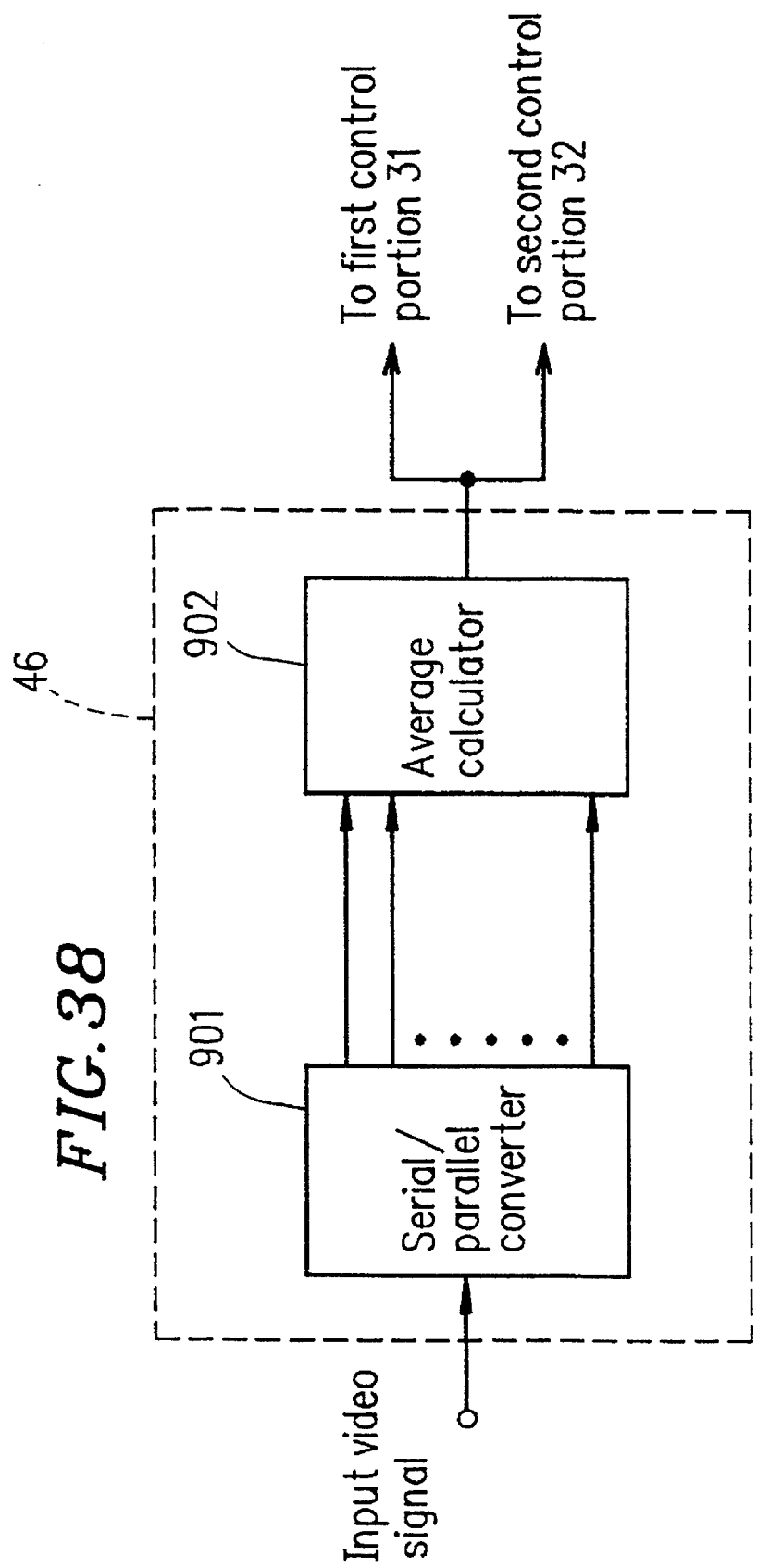
FIG. 38 is a block diagram of a signal level detection portion according to the seventh example.

As shown in FIG. 37, the signal level detection portion 46 is connected to the input terminal 10, the first control portion 31, and the second control portion 32. FIG. 38 shows the configuration of the signal level detection portion 46. Referring to FIG. 38, the signal level detection portion 46 includes a serial/parallel converter 901 connected to the input terminal 10, and an average calculator 902 connected to the serial/parallel converter 901. The output of the average calculator 902 is connected to the first and second control portions 31 and 32. The configuration of the serial/parallel converter 901 is the same as that of the serial/parallel converter 13 of FIG. 3.

The operation of the noise reducer 500 of Example 7 will be described. The operations of the components of the noise reducer 500 other than the signal level detection portion 46, the first control portion 31, and the second control portion 32 are the same as those of the noise reducer 200 described in Examples 1 to 4.

Referring to FIG. 38, the operation of the signal level detection portion 46 will be described. The serial/parallel converter 901 converts the input video signal S11 into temporally parallel data of a pixel block. The average calculator 902 calculates the average of the data of the pixel block. The output from the average calculator 902 is supplied to the first control portion 31 and the second control portion 32. This output from the average value calculator 902 represents an average signal level of the input video signal S11. For example, in the case where the input video signal S11 is a luminance signal a large value of the average indicates a high luminance (i.e., the image is bright). On the contrary, a small value of the average indicates a low luminance (i.e., the image is dark).

Figure 39:
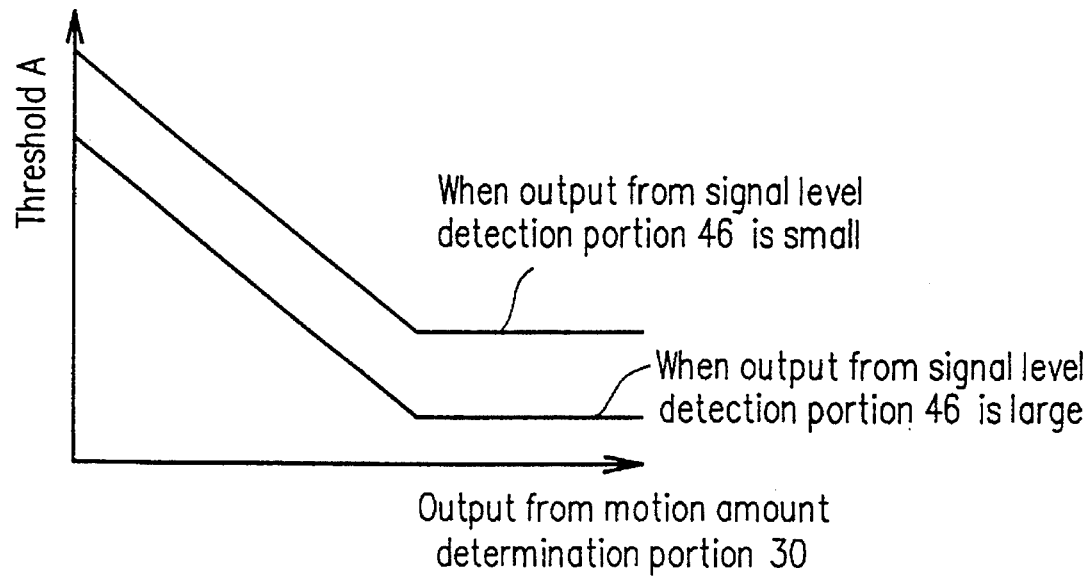
FIG. 39 shows the control characteristics of a first control portion according to the seventh example.
Figure 40:
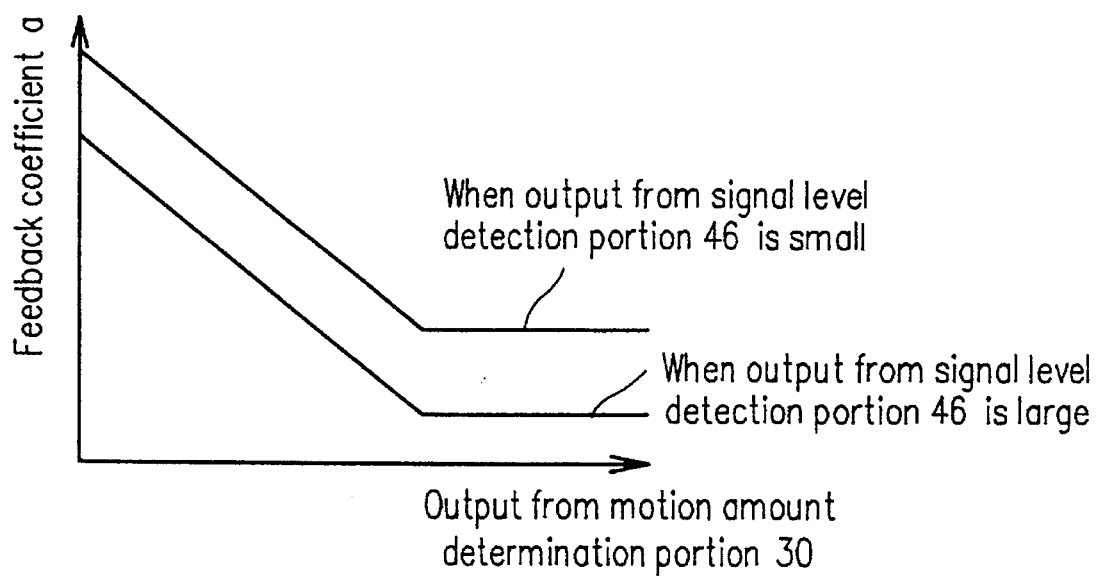
FIG. 40 shows the control characteristics of a second control portion according to the seventh example.

FIGS. 39 and 40 are examples of the control characteristics of the first and second control portions 31 and 32 in Example 7, respectively. When the output from the signal level detection portion 46 is large, the first and second control portions 31 and 32 judge that a high-luminance (bright) video signal is input, and shift the respective characteristic curves to lower the threshold A and the feedback coefficient a, so as to reduce the feedback amount of the noise signal S12. Thus, the noise removal effect on the high-luminance image is suppressed. On the contrary, when the output from the signal level detection portion 46 is small, the first and second control portions 31 and 32 judge that a low-luminance (dark) video signal is input, and shift the respective characteristic curves to raise the threshold A and the feedback coefficient a, so as to increase the feedback amount of the noise signal S12. Thus, the noise reduction effect on the low-luminance image is enhanced. In this way, the feedback amount of the noise signal S12 is adjusted according to the brightness of the image displayed by the input video signal S11.

As described above, according to the noise reducer 500 of this example, where the signal level detection portion 46 is additionally disposed, the feedback amount is adjusted according to the luminance of the input video signal, in addition to the adaptive control described in Examples 1 to 4. This adjustment makes it possible to prevent deterioration in the quality of a bright image in the motion picture portion, while reducing noise in the still picture portion and the picture portion with small motion more effectively.

EXAMPLE 8

Figure 41:
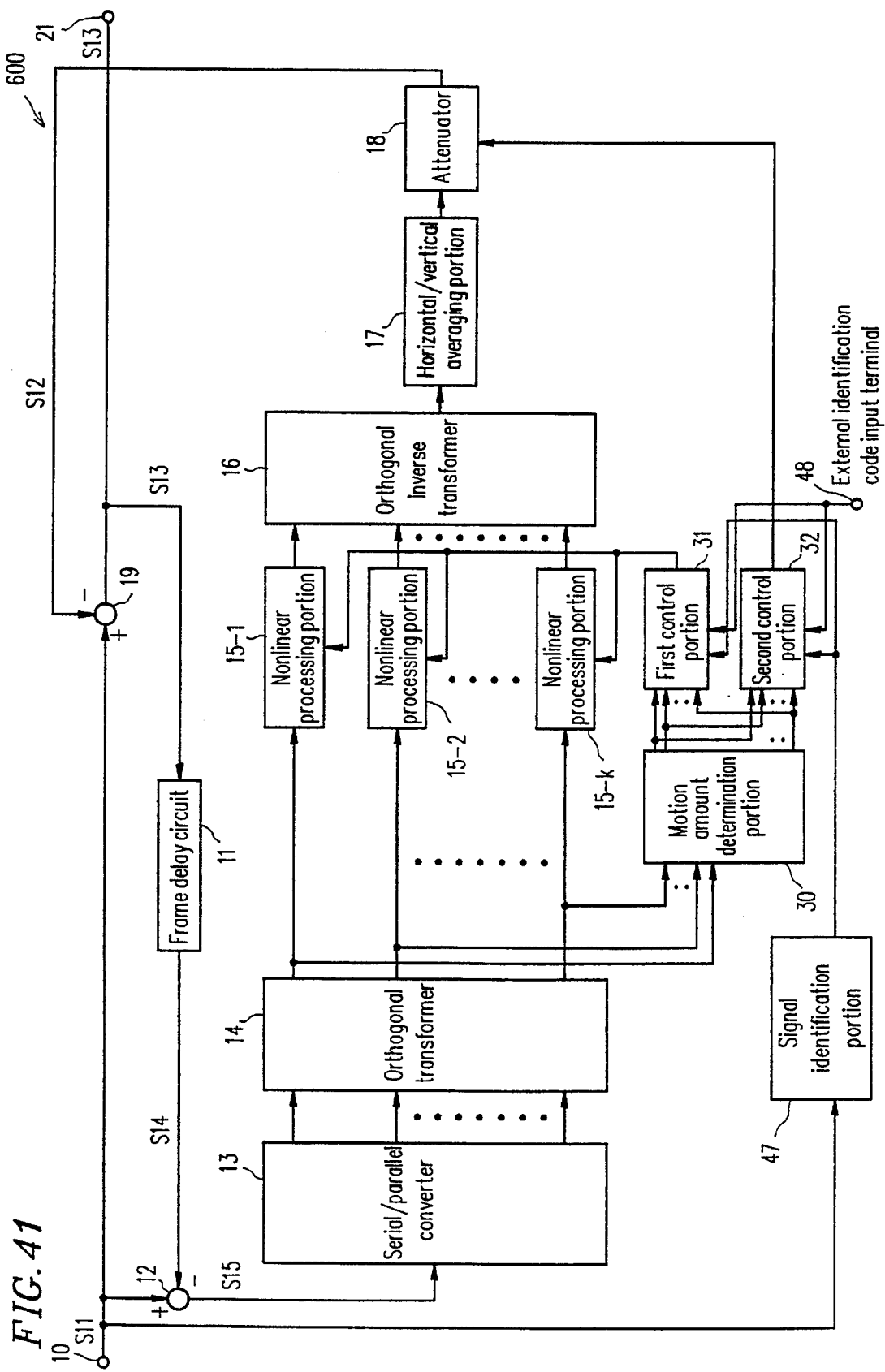
FIG. 41 is a block diagram of a motion amount determination portion of a noise reducer of the eighth example according to the present invention.

FIG. 41 shows a noise reducer 600 of the eighth example according to the present invention. In FIG. 41, components having the same configuration and operation as those of the noise reducer 200 of FIG. 2 are denoted by the same reference numerals. In this example, as in Examples 5 to 7, the configuration of the motion amount determination portion 30 may be that shown in any of Examples 1 to 4. The noise reducer 500 of this example additionally includes a signal identification portion 47. The signal identification portion 47 identifies the type of input video signal S11, and outputs an identification code. Alternatively, the type of input video signal S11 is identified by a signal identification code input from an external identification code input terminal 48. This identification code is used as a parameter for controlling the first and second control portions 31 and 32 together with the output from the motion amount determination portion 30.

As shown in FIG. 41, the signal identification portion 47 is connected to the input terminal 10, the first control portion 31, and the second control portion 32. Alternatively, the external identification code input terminal 48 is connected to the first control portion 31 and the second control portion 32.

The operation of the noise reducer 600 of Example 8 will be described. The operations of the components of the noise reducer 600 other than the signal identification portion 47, the first control portion 31, and the second control portion 32 are the same as those of the noise reducer 200 described in Examples 1 to 4.

The operation of the signal identification portion 47 will be first described. The video signal S11 input into the input terminal 10 may be an NTSC signal or a PAL signal. Otherwise, a plurality of different video signals (such as a color signal and a luminance signal) may be input into the input terminal 10 in one horizontal period. The signal identification portion 47 identifies the type of the input video signal and outputs the identification code corresponding to the type of input video signal. For example, when an NTSC signal is input as the video signal, '0' is output as the identification code. When an PAL signal is input, '1' is output as the identification code. In the case where such an identification code is supplied externally, the identification code is input through the external identification code input terminal 48.

Figure 42:
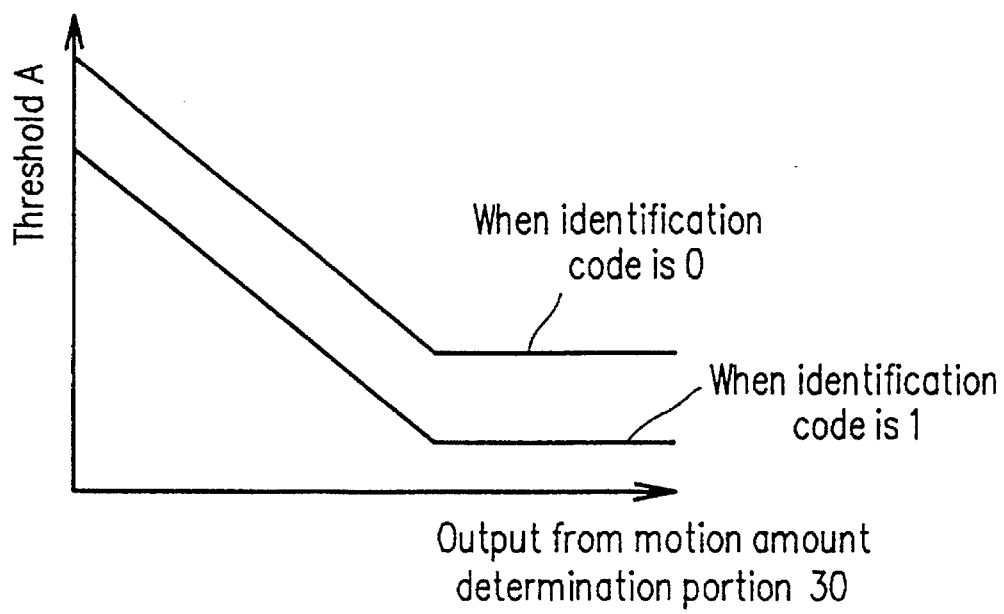
FIG. 42 shows the control characteristics of a first control portion according to the eighth example.
Figure 43:
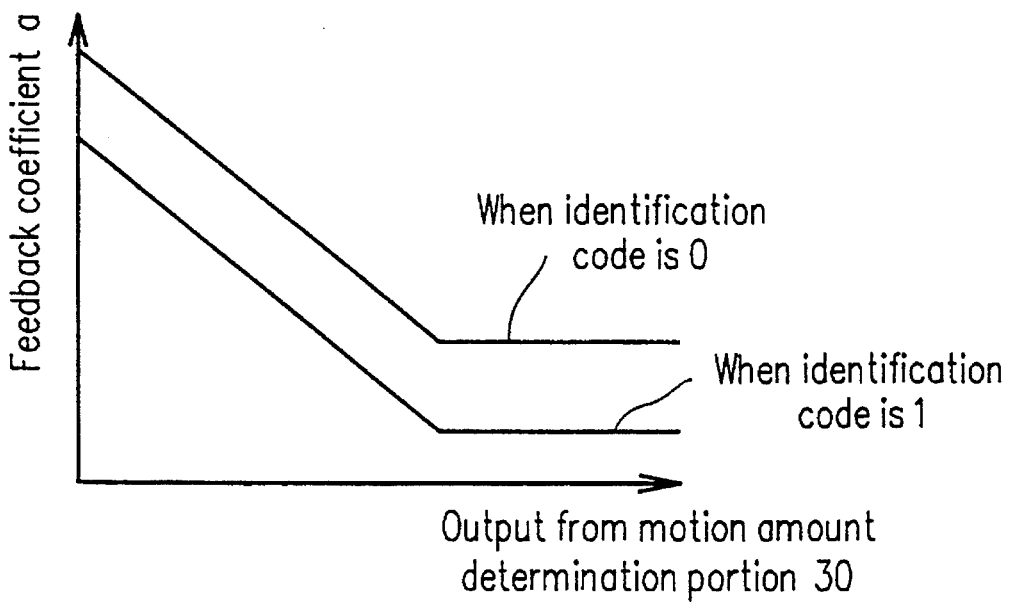
FIG. 43 shows the control characteristics of a second control portion according to the eighth example.

FIGS. 42 and 43 are examples of the control characteristics of the first and second control portions 31 and 32 in Example 8, respectively. When the identification code output from the signal identification portion 47 is '1', the first and second control portions 31 and 32 shift the respective characteristic curves to lower the threshold A and the feedback coefficient a, so as to reduce the feedback amount of the noise signal S12. Thus, the noise removal effect is suppressed. On the contrary, when the identification code is '0', the first and second control portions 31 and 32 shift the respective characteristic curves to raise the threshold A and the feedback coefficient a, so as to increase the feedback amount of the noise signal S12. Thus, the noise reduction effect is enhanced. In this way, the feedback amount of the noise signal S12 is adjusted according to the type of input video signal S11.

As described above, according to the noise reducer 600 of this example, where the signal identification portion 47 or the external identification code input terminal 48 is additionally provided, the feedback amount is adjusted according to the type of input video signal, in addition to the adaptive control described in Examples 1 to 4. This adjustment makes it possible to prevent deterioration in the quality of an image in the motion picture portion, while reducing noise in the still picture portion and the picture portion with small motion more effectively.

EXAMPLE 9

Figure 44:
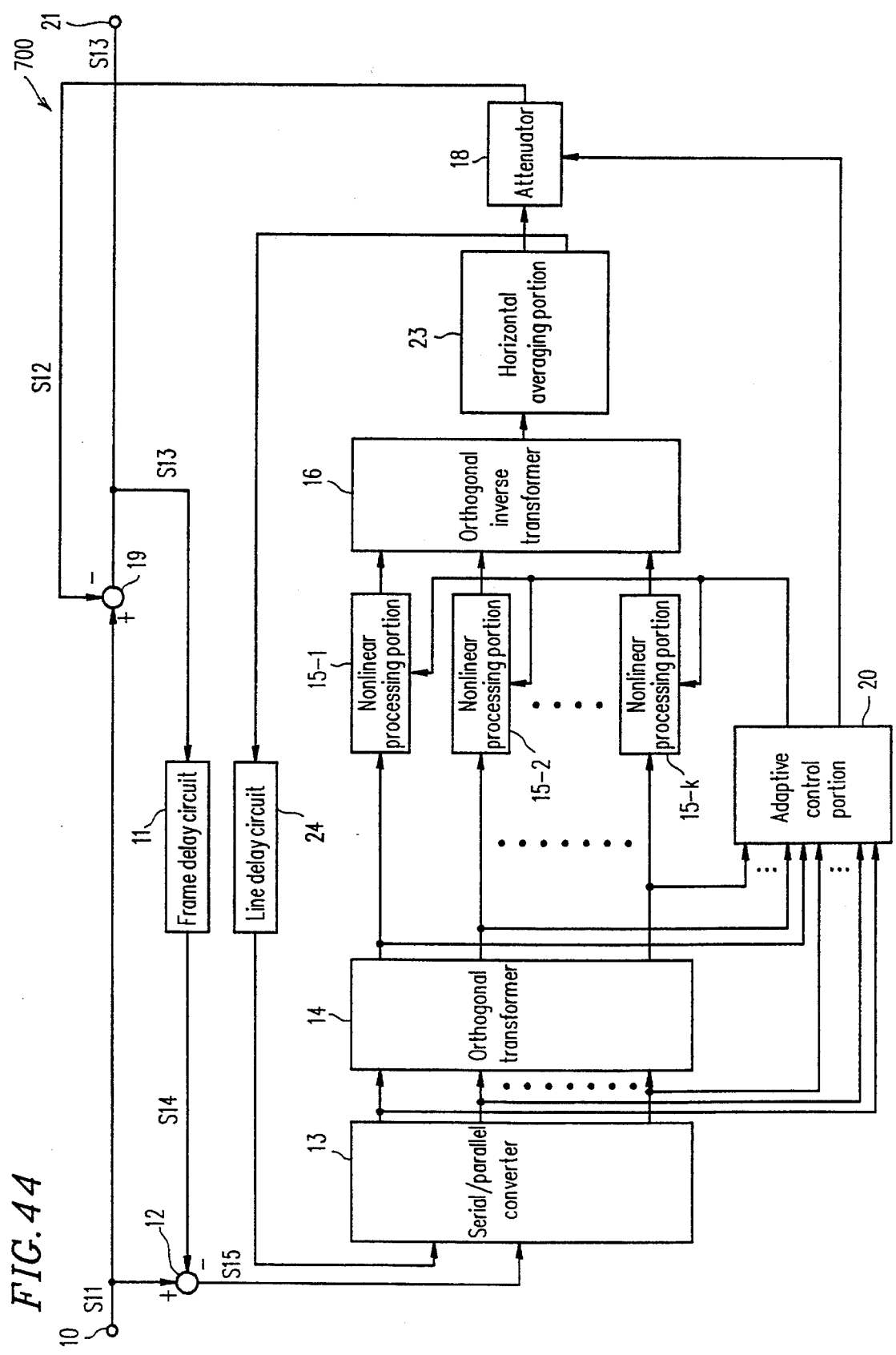
FIG. 44 is a block diagram of a noise reducer of the ninth example according to the present invention.
Figure 45:
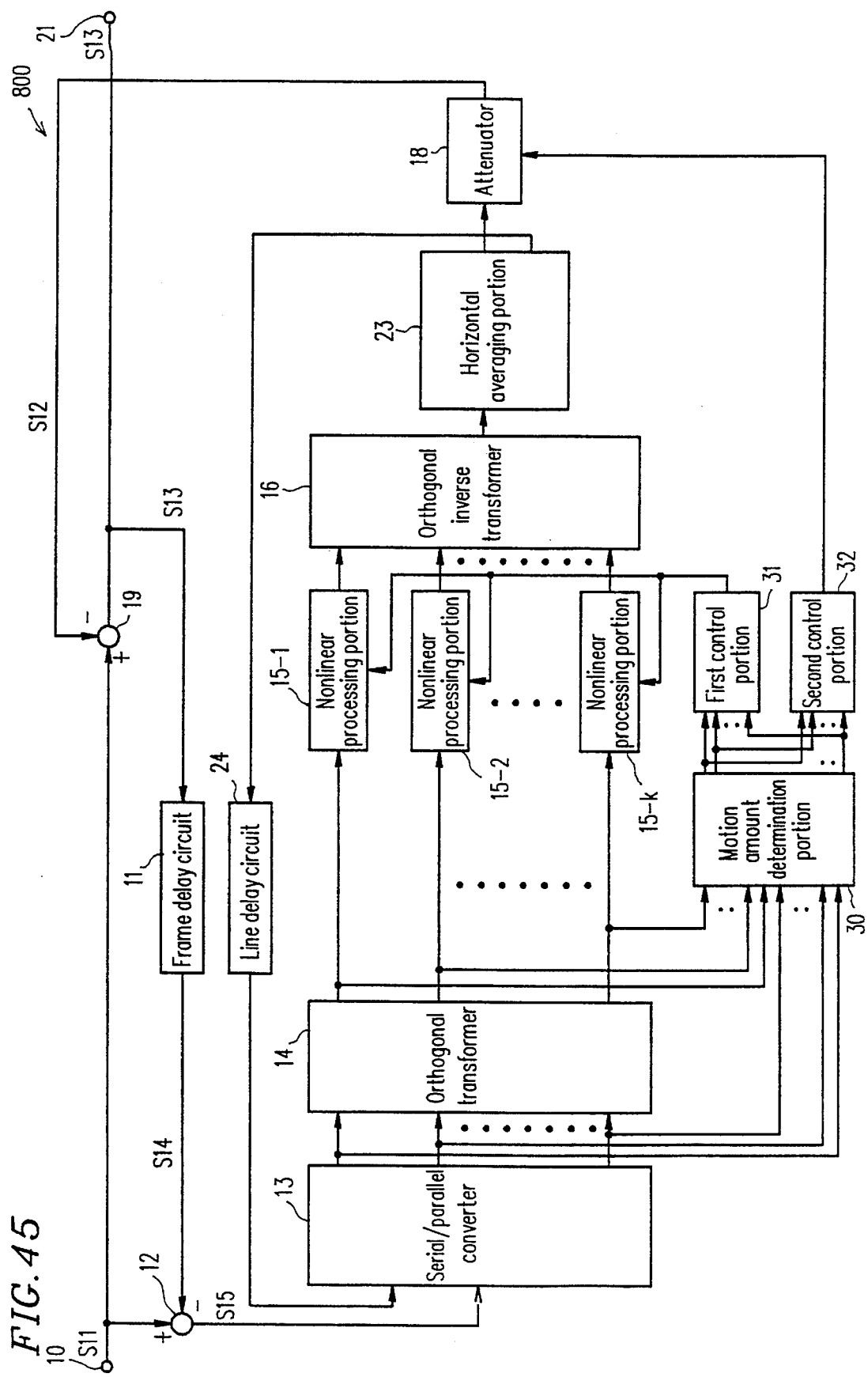
FIG. 45 is a block diagram of the noise reducer of the ninth example shown in more detail.

FIGS. 44 and 45 show noise reducers 700 and 800 of the ninth example according to the present invention. In FIG. 44, Components having the same configuration and operation as those of the noise reducer 100 of FIG. 1 are denoted by the same reference numerals. FIG. 45 shows the adaptive control portion 20 of FIG. 44 more specifically. In FIG. 45, components having the same configuration and operation as those of the noise reducer 200 of FIG. 2 are denoted by the same reference numerals. The noise reducers 700 and 800 of this example include a horizontal averaging portion 23 in place of the horizontal/vertical averaging portion 17 of the noise reducers 100 and 200, and additionally includes a line delay circuit 24.

The noise reducer of Example 9 will be described with reference to FIG. 45 showing the noise reducer 800. In the noise reducer 800, the horizontal averaging portion 23 averages the output from the orthogonal inverse transformer 16 only in the horizontal direction. Also, a portion of the output from the horizontal averaging portion 23 is returned to the serial/parallel converter 13 through the line delay circuit 24.

Figure 46:
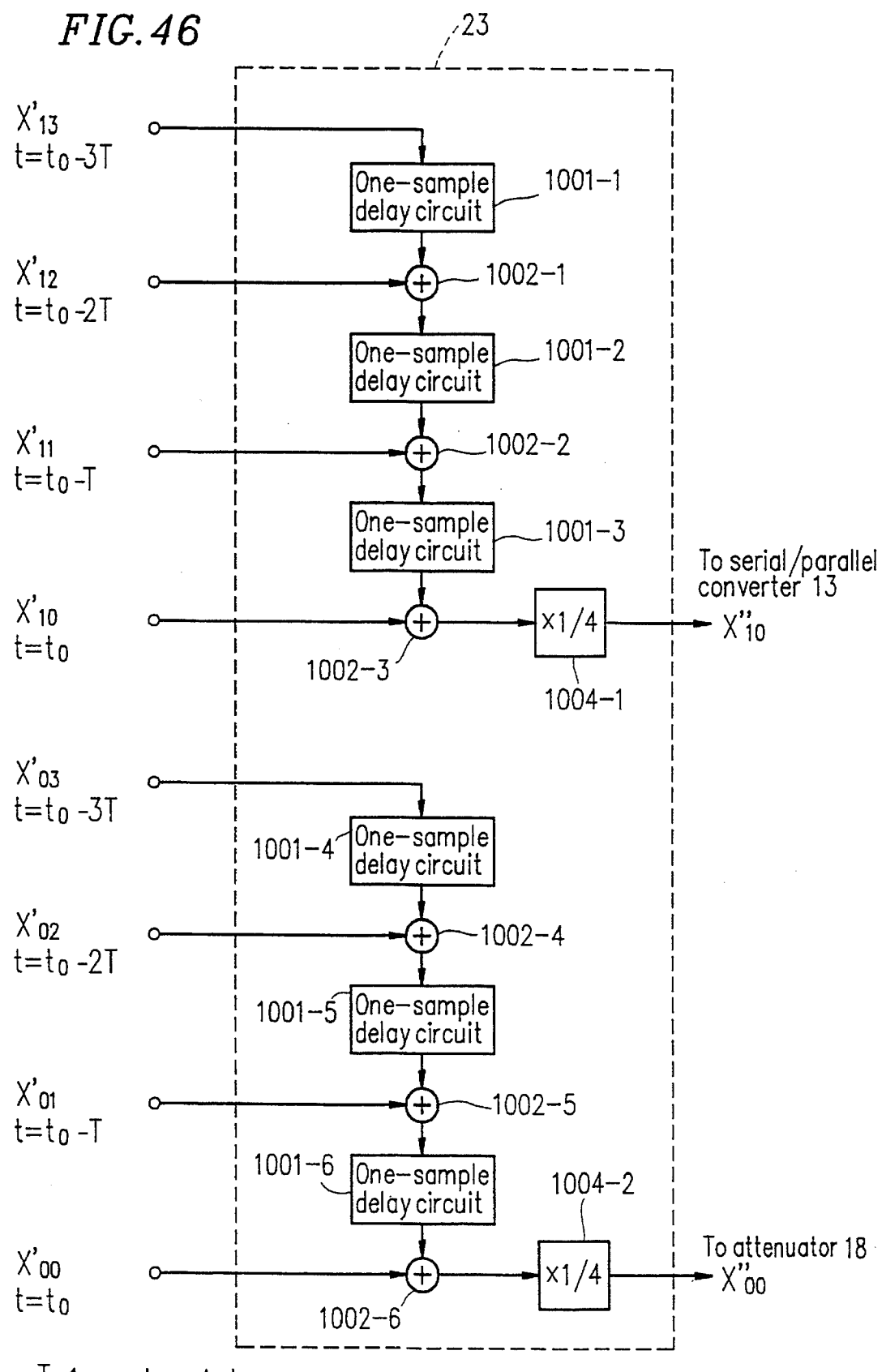
FIG. 46 is a block diagram of a horizontal averaging portion according to the ninth example.

FIG. 46 shows the configuration of the horizontal averaging portion 23, where the function of the vertical averaging is not included, as compared with the configuration of the horizontal/vertical averaging portion 17.

The operation of the noise reducer 800 with the above configuration will be described with reference to FIG. 45. In this example, only the points different from the operation of the noise reducer 200 of FIG. 2 will be described.

The horizontal averaging portion 23 averages the data $x_{ij}$ output from the orthogonal inverse transformer 16 in a horizontal direction. The data $x_{ij}$ to be averaged are those at different sample points of different pixel blocks in the horizontal direction, but corresponds to a physically identical pixel position of the image. For example, when the case described with reference to FIG. 8 is used, four different data (orthogonally inverse-transformed data) in the horizontal direction corresponding to an identical pixel position are averaged. Hereinbelow, the case of the pixel block of 4×2 data will be described with reference to FIG. 47.

Figure 47:
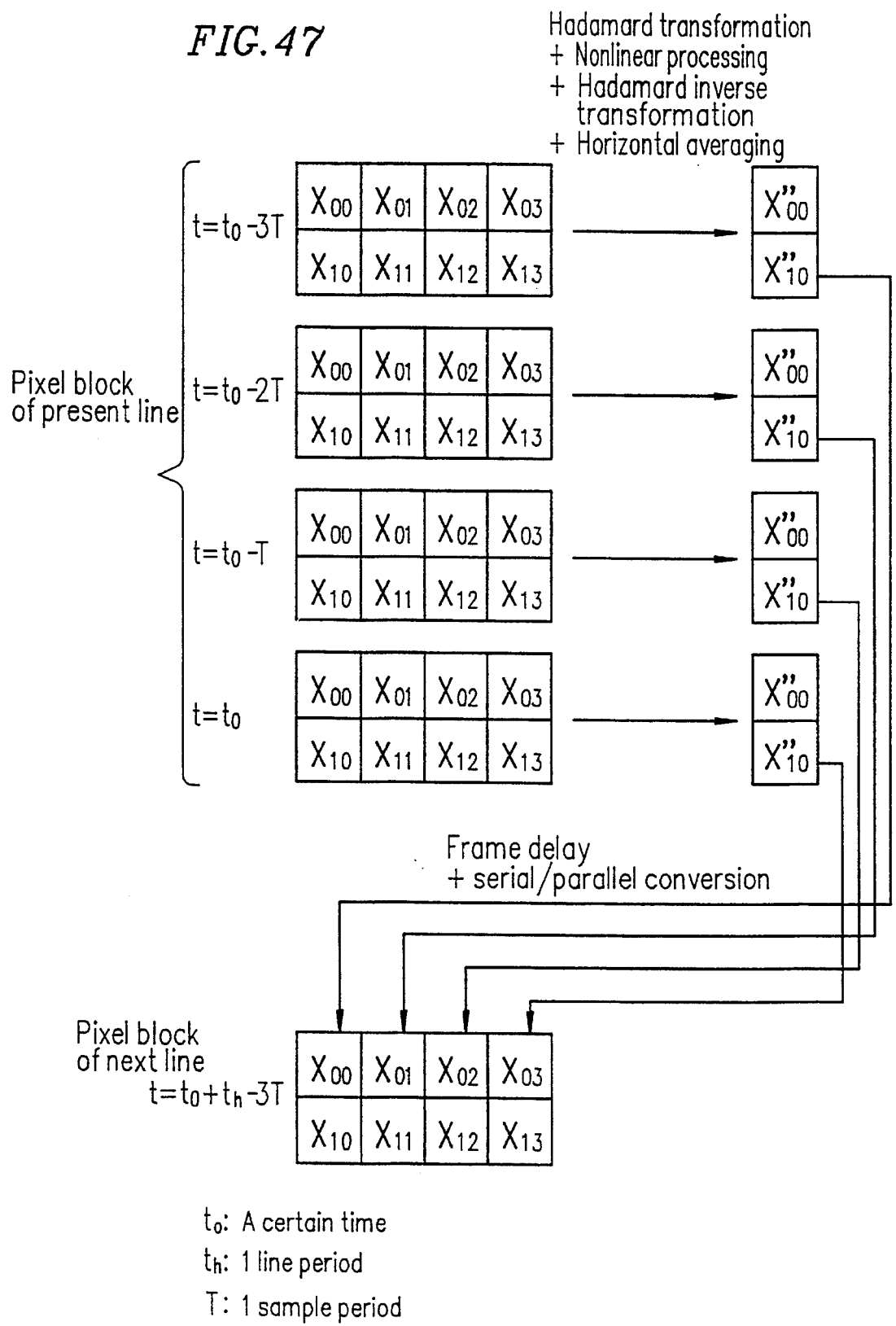
FIG. 47 illustrates a process of producing a pixel block using a signal output from the horizontal averaging portion and a frame differential signal.
Figure 48:
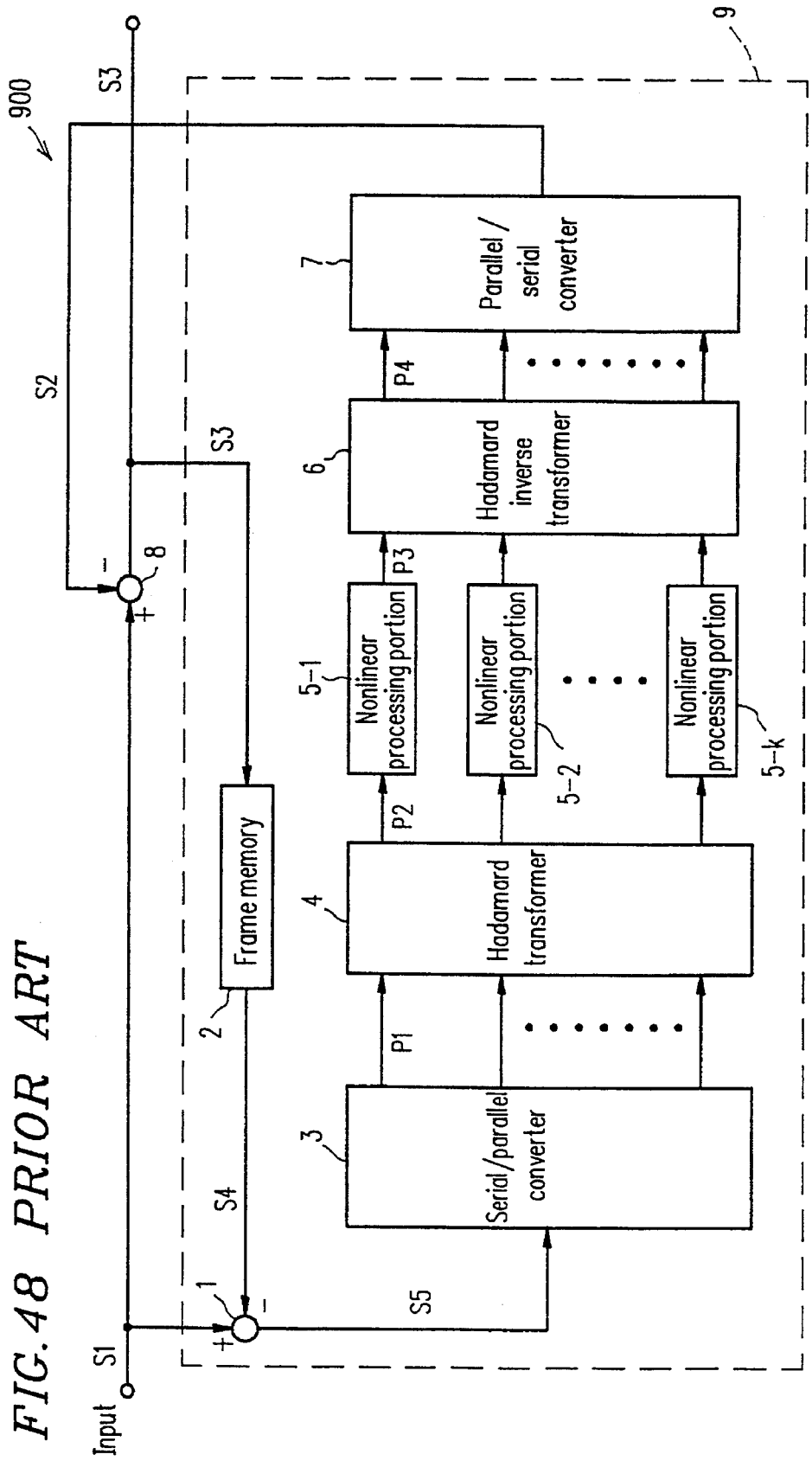
FIG. 48 is a block diagram of a conventional noise reducer.
Figure 49:
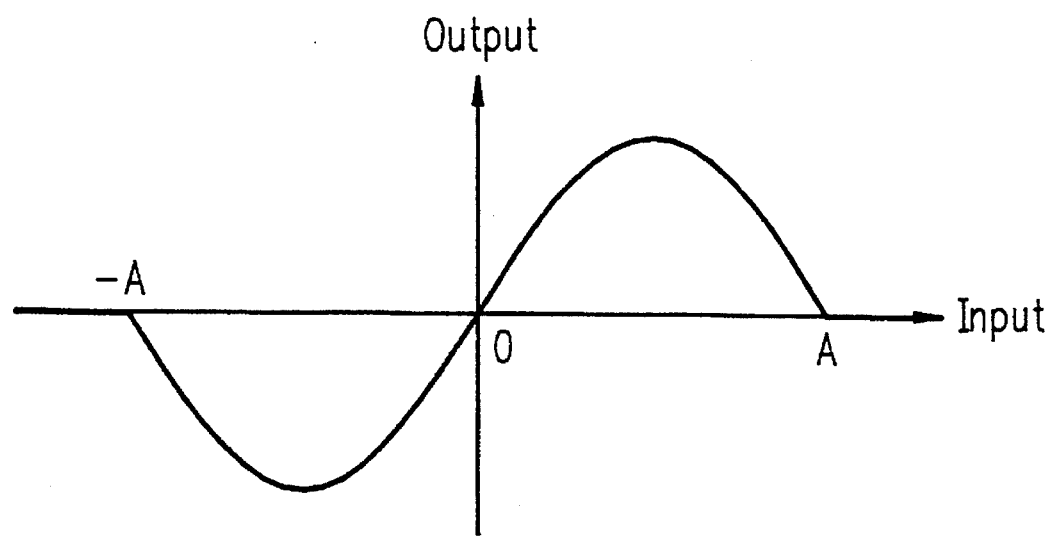
FIG. 49 shows the input/output characteristic of a nonlinear processor of a conventional noise reducer.

The data obtained by averaging the four data in the upper portion (row) of the pixel block in the horizontal direction is preferred to as $x''_{00}$, and the data obtained by averaging the four data in the lower portion (row) of the pixel block in the horizontal direction is referred to as $x''_{10}$. Sequentially, four samplings (at a sampling period T) provide four horizontally different sampling points corresponding to an identical pixel position on the screen (each sampling point belongs to a different pixel block). The four sampling points are averaged to obtain a horizontal average value corresponding to one pixel position (refer to FIG. 8). The above operation is conducted for the four pixel positions corresponding to the upper portion of the pixel block so as to obtain four horizontally averaged data $x''_{00}$. Likewise, the operation is conducted for the four pixel positions corresponding to the lower portion of the pixel block so as to obtain four horizontally averaged data $x''_{10}$. The four data $x''_{10}$ sampled at different sampling times are delayed by the line delay circuit 24 and input into the serial/parallel converter 13. The serial/parallel converter 13 outputs the four data $x''_{10}$ as the data $x_{00}$ to $x_{03}$ in the upper portion of the "next" pixel block. The "next" block is located just below an "original" pixel block by one line. More specifically, the data $x''_{10}$ obtained at a certain sampling time ($t=t_0-3T$) is used as the data $x_{00}$ of the "next" pixel block. The data $x''_{10}$ obtained at the second sampling time ($t=t_0-2T$) is used as the data $x_{01}$ of the "next" pixel block. The data $x''_{10}$ obtained at the third sampling time ($t=t_0-T$) is used as the data $x_{02}$ of the "next" pixel block. And, finally, the data $x''_{10}$ obtained at the fourth sampling time ($t=t_0$) is used as the data $x_{03}$ of the "next" pixel block. In this way, the "next" pixel block located just below by one line is produced by using the thus-obtained $x_{00}$ to $x_{03}$ and the data $x_{10}$ and $x_{13}$ obtained from the frame differential signal of the next line. This operation is shown in FIG. 47. The data in the upper portion of the "next" pixel block have a much lower probability of including a motion component in the data, since they are those once extracted as noise. Accordingly, the image quality of the motion picture portion is less deteriorated compared with the case where the upper portion of the pixel block is produced directly by the frame differential signal.

The horizontally averaged data $x''_{00}$ in the upper portion of the original pixel block is output to the attenuator 18, where they are multiplied by the feedback coefficient a. The subsequent operation is the same as that described with reference to the noise reducer 200 of FIG. 2, and thus the description thereof is omitted here.

Thus, according to this example, the horizontal/vertical averaging portion 17 of the noise reducer 200 is replaced with the horizontal averaging portion 23, and part of the output from the horizontal averaging portion 23 is returned and input into the serial/parallel converter 13 through the line delay circuit 24. This configuration reduces the probability of including a motion component in the noise signal S12. This makes it possible to prevent deterioration in the quality of an image in the motion picture portion, while reducing noise in the still picture portion and the picture portion with small motion more effectively.

Though, in the above examples, the pixel block including m=4 samples in the horizontal direction and n=2 lines in the Vertical direction was adopted, m and n can be other natural numbers. The pixels may be sampled every r samples and every s lines (r, s=natural numbers) in the pixel block. The input/output characteristic of the nonlinear processor 15 is not limited to that shown in FIG. 6A, but a limiter characteristic where a fixed value is output when the input exceeds a predetermined value (FIG. 6B), a characteristic having a trapezoid shape (FIG. 6C) or a curved shape (FIG. 6D), instead of the triangle shape as in FIG. 6A may also be adopted. The control characteristics of the first and second control portions 31 and 32 may be curved instead of the polygonal line in the above examples.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A noise reducer for outputting a noise-reduced signal by extracting noise included in an input video signal so as to produce a noise signal and by subtracting the noise signal from the input video signal, the noise reducer comprising:

a signal processing portion including:
  delay means for delaying the noise-reduced signal by a predetermined time period so as to output a delayed signal;
  first subtraction means for subtracting the delayed signal from the input video signal so as to output a differential signal;
  transformation means for receiving the differential signal and conducting orthogonal transformation on the differential signal, each of pixel blocks of the differential signal being transformed as a unit, so as to output an orthogonally transformed signal;
  processing means for receiving the orthogonally transformed signal and conducting nonlinear processing on the orthogonally transformed signal based on a predetermined threshold so as to output a nonlinear processed signal;
  inverse transformation means for receiving the nonlinear processed signal and conducting an inverse transformation of the orthogonal transformation on the nonlinear processed signal so as to output an inversely transformed signal; and
  attenuation means for receiving the inversely transformed signal and attenuating the inversely transformed signal by a predetermined coefficient so as to output the noise signal;
  second subtraction means for subtracting the noise signal from the input video signal so as to output said noise-reduced signal; and adaptive control means for controlling at least one of the predetermined threshold and the predetermined coefficient based on the differential signal and/or the orthogonally transformed signal.

2. A noise reducer according to claim 1, wherein the input video signal is serial data, and the signal processing portion further includes:

a serial/parallel conversion means for converting the differential signal into a parallel signal and outputting the parallel signal to the orthogonal transformation means, each of the pixel blocks being output as a unit; and averaging means for averaging the inversely transformed signal based on the predetermined time period so as to convert the inversely transformed signal into serial data and outputting the serial data of the inversely transformed signal to the attenuation means.

3. A noise reducer according to claim 1, wherein the adaptive control means includes:

means for determining the amount of motion for at least one motion component included in the input video signal in the predetermined time period based on at least one of the differential signal and/or the orthogonally transformed signal; and parameter control means for controlling at least one of the predetermined threshold and/or the predetermined coefficient based on the amount of motion.

4. A noise reducer according to claim 3, wherein the means for determining the amount of the motion includes absolute value calculation means for receiving the differential signal for each of the pixel blocks composed of m samples in a horizontal direction and n lines in a vertical direction (m, n=natural numbers) and calculating the absolute value of data of the differential signal at each sample point of the pixel block, and average calculation means for calculating the average of the absolute values, and the parameter control means includes first control means for controlling the predetermined threshold for the nonlinear processing means based on an output from the average calculation means, and second control means for controlling the predetermined coefficient for the attenuation means based on the output from the average calculation means.

5. A noise reducer according to claim 3, wherein the means for determining the amount of the motion includes absolute value calculation means for receiving the orthogonally transformed signal and calculating the absolute value of each component of the orthogonally transformed signal, and dispersion parameter calculation means for calculating a dispersion parameter representing the degree of dispersion of the absolute value, and the parameter control means includes first control means for controlling the predetermined threshold for the nonlinear processing means based on an output from the dispersion parameter calculation means, and second control means for controlling the predetermined coefficient for the attenuation means based on the output from the dispersion parameter calculation means.

6. A noise reducer according to claim 3, wherein the means for determining the amount of the motion includes absolute value calculation means for receiving the orthogonally transformed signal and calculating the absolute values of the components (k=natural number) of the orthogonally transformed signal, and the parameter control means includes first control means for controlling the predetermined threshold for the nonlinear processing means based on at least one of the outputs from the absolute value calculation means, and second control means for controlling the predetermined coefficient for the attenuation means based on at least one of the outputs from the absolute calculation means.

7. A noise reducer according to claim 3, wherein the means for determining the amount of the motion includes isolated-point removal means for receiving the orthogonally transformed signal and removing isolated points from the i components among the k components (i=natural number less than k, k=natural number equal to or greater than 2) of the orthogonally transformed signal, first absolute value calculation means for calculating absolute values of the i components output from the isolated-point removal means, and second absolute value calculation means for calculating absolute values of the (k–i) components on which isolated-point removal is not conducted, and the parameter control means includes first control means for controlling the predetermined threshold for the nonlinear processing means based on an output from the first absolute value calculation means and/or the second absolute value calculation means, and second control means for controlling the predetermined coefficient for the attenuation means based on the output from the first absolute value calculation means and/or the second absolute value calculation means.

8. A noise reducer according to claim 7, wherein the isolated-point removal means includes filter means for determining whether or not each of the i component of the orthogonally transformed signal is isolated in at least one of three directions corresponding to a horizontal direction, a vertical direction, and a temporal direction of the pixel block, and outputting a modified value for the component when the component is determined as being isolated.

9. A noise reducer according to claim 1, further comprising additional control means for receiving the differential signal, detecting the amplitude of noise included in the differential signal, and outputting the amplitude of the noise to the adaptive control means as an additional control signal for further adjusting at least one of the predetermined threshold and the predetermined coefficient.

10. A noise reducer according to claim 1, further comprising additional control means for receiving the input video signal, extracting a predetermined parameter from the input video signal, and outputting the extracted parameter to the adaptive control means as an additional control signal for further adjusting the predetermined threshold and/or the predetermined coefficient.

11. A noise reducer according to claim 10, wherein the parameter extracted by the additional control means is one of the type, amplitude, and level of the input video signal.

12. A noise reducer for outputting a noise-reduced signal by extracting noise included in an input video signal so as to produce a noise signal and by subtracting the noise signal from the input video signal, the noise reducer comprising:

a signal processing portion including:
first delay means for delaying the noise-reduced signal by a predetermined time period so as to output a first delayed signal;
first subtraction means for subtracting the first delayed signal from the input video signal to output a differential signal;
transformation means for receiving the differential signal and a second delayed signal and conducting an orthogonal transformation on the differential signal and the second delayed signal, each of pixel blocks of the differential signal and the second delayed signal being transformed as a unit, so as to output an orthogonally transformed signal;
nonlinear processing means for receiving the orthogonally transformed signal and conducting nonlinear processing on the orthogonally transformed signal based on a predetermined threshold so as to output a nonlinear processed signal;
inverse transformation means for receiving the nonlinear processed signal and conducting inverse transformation of the orthogonal transformation on the nonlinear processed signal so as to output an inversely transformed signal;
attenuation means for receiving the inversely transformed signal and attenuating the inversely transformed signal by a predetermined coefficient to output the noise signal; and
second delay means for delaying the inversely transformed signal by another predetermined time period to output the second delayed signal;
second subtraction means for subtracting the noise signal from the input video signal to output the noise-reduced signal; and
adaptive control means for controlling at least one of the predetermined threshold and the predetermined coefficient based on the differential signal and/or the orthogonally transformed signal.

13. A noise reducer according to claim 12, wherein the input video signal and the second delayed signal are serial data, and the signal processing portion further includes:

a serial/parallel conversion means for converting the differential signal and the second delayed signal into a parallel signal and outputting the parallel signal to the orthogonal transformation means, each of the pixel blocks being output as a unit; and averaging means for averaging the inversely transformed signal based on the predetermined time period so as to convert the inversely transformed signal into serial data and outputting the serial data of the inversely transformed signal to the attenuation means and the second delay means.

14. A noise reducer according to claim 12, wherein the adaptive control means includes:

means for determining the amount of motion for at least one motion component included in the input video signal in the predetermined time period based on at least one of the combination of the differential signal and the second delayed signal and the orthogonally transformed signal; and parameter control means for controlling the predetermined threshold and/or the predetermined coefficient based on the amount of motion.

15. A noise reducer according to claim 14, wherein the means for determining the amount of the motion includes absolute value calculation means for receiving the differential signal and the second delayed signal for each of the pixel blocks composed of m samples in a horizontal direction and n lines in a vertical direction (m, n=natural numbers) and calculating the absolute value of data of the differential signal at each sample point of the pixel block, and average calculation means for calculating the average of the absolute values, and the parameter control means includes first control means for controlling the predetermined threshold for the nonlinear processing means based on an output from the average calculation means, and second control means for controlling the predetermined coefficient for the attenuation means based on the output from the average calculation means.

16. A noise reducer according to claim 14, wherein the motion amount determination means includes absolute value calculation means for receiving the orthogonally transformed signal and calculating the absolute value of each component of the orthogonally transformed signal, and dispersion parameter calculation means for calculating a dispersion parameter representing the degree of dispersion of the absolute value, and the parameter control means includes first control means for controlling the predetermined threshold for the nonlinear processing means based on an output from the dispersion parameter calculation means, and second control means for controlling the predetermined coefficient for the attenuation means based on the output from the dispersion parameter calculation means.

17. A noise reducer according to claim 14, wherein the means for determining the amount of the motion includes absolute value calculation means for receiving the orthogonally transformed signal and calculating the absolute values of k components (k=natural number) of the orthogonally transformed signal, and the parameter control means includes first control means for controlling the predetermined threshold for the nonlinear processing means based on at least one of outputs from the k absolute value calculation means, and second control means for controlling the predetermined coefficient for the attenuation means based on at least one of the outputs from the k absolute calculation means.

18. A noise reducer according to claim 14, wherein the means for determining the amount of the motion includes isolated-point removal means for receiving the orthogonally transformed signal and removing isolated points from the components among the k components (i=natural numberless than k, k=natural number equal to or greater than 2) of the orthogonally transformed signal, first absolute value calculation means for calculating absolute values of the i components output from the isolated-point removal means, and second absolute value calculation means for calculating absolute values of the (k–i) components on which isolated-point removal is not conducted, and the parameter control means includes first control means for controlling the predetermined threshold for the nonlinear processing means based on an output from the first absolute value calculation means and/or the second absolute value calculation means, and second control means for controlling the predetermined coefficient for the attenuation means based on the output from the first absolute value calculation means and/or the second absolute value calculation means.

19. A noise reducer according to claim 18, wherein the isolated-point removal means includes filter means for determining whether or not each of the i components of the orthogonally transformed signal is isolated in at least one of three directions corresponding to a horizontal direction, a vertical direction, and a temporal direction of the pixel block, and outputting a modified value for the component when the component is determined as being isolated.

20. A noise reducer according to claim 12, further comprising additional control means for receiving the differential signal, detecting the amplitude of noise included in the differential signal, and outputting the amplitude of the noise to the adaptive control means as an additional control signal for further adjusting at least one of the predetermined threshold and the predetermined coefficient.

21. A noise reducer according to claim 12, further comprising additional control means for receiving the input video signal, extracting a predetermined parameter from the input video signal, and outputting the extracted parameter to the adaptive control means as an additional control signal for further adjusting the predetermined threshold and/or the predetermined coefficient.

22. A noise reducer according to claim 21, wherein the parameter extracted by the additional control means is one of the type, amplitude, and level of the input video signal.

* * * * *

UNITED STATES PATENT AND TRADEMARK OFFICE
CERTIFICATE OF CORRECTION

PATENT NO.  : 5,495,299
DATED       : February 27, 1996
INVENTOR(S) : Hidekazu Suzuki, et. al.

It is certified that error appears in the above-indentified patent and that said Letters Patent is hereby corrected as shown below:

Column 28, claim 6, line 64, before "components" insert --k--.

Column 31, claim 18, line 36, before "components among" insert --i--.

Column 31, claim 18, line 36, delete "numberless" and insert --number less--.

Signed and Sealed this

Twenty-second Day of October, 1996

Attest:

BRUCE LEHMAN

Attesting Officer  Commissioner of Patents and Trademarks